United States Patent
Gopalan et al.

(10) Patent No.: US 11,377,514 B2
(45) Date of Patent: Jul. 5, 2022

(54) COMBINED SEALS, COMPOSITIONS, AND METHODS OF MAKING THE SAME

(71) Applicant: Cooper-Standard Automotive Inc., Novi, MI (US)

(72) Inventors: Krishnamachari Gopalan, Troy, MI (US); Robert J. Lenhart, Fort Wayne, IN (US); Gending Ji, Canton, MI (US); Roland Herd-Smith, Brignancourt (FR)

(73) Assignee: COOPER-STANDARD AUTOMOTIVE, INC., Northville, MI (US)

( * ) Notice: Subject to any disclaimer, the term of this patent is extended or adjusted under 35 U.S.C. 154(b) by 370 days.

(21) Appl. No.: 16/797,844

(22) Filed: Feb. 21, 2020

(65) Prior Publication Data

US 2020/0199279 A1    Jun. 25, 2020

Related U.S. Application Data

(63) Continuation of application No. 15/836,490, filed on Dec. 8, 2017, now Pat. No. 10,570,236.

(60) Provisional application No. 62/497,954, filed on Dec. 10, 2016.

(51) Int. Cl.

| | |
|---|---|
| *C08F 255/02* | (2006.01) |
| *C08J 9/228* | (2006.01) |
| *C08L 23/08* | (2006.01) |
| *C08J 3/24* | (2006.01) |
| *C09K 3/10* | (2006.01) |
| *C08K 3/011* | (2018.01) |
| *C08K 3/36* | (2006.01) |
| *C08L 23/12* | (2006.01) |
| *C08K 5/00* | (2006.01) |
| *C08L 23/14* | (2006.01) |
| *C08L 23/16* | (2006.01) |
| *C08J 9/00* | (2006.01) |

(52) U.S. Cl.
CPC .............. *C08F 255/02* (2013.01); *C08J 3/24* (2013.01); *C08J 9/0061* (2013.01); *C08J 9/228* (2013.01); *C08K 3/011* (2018.01); *C08K 3/36* (2013.01); *C08K 5/0025* (2013.01); *C08L 23/0815* (2013.01); *C08L 23/12* (2013.01); *C08L 23/14* (2013.01); *C08L 23/142* (2013.01); *C08L 23/16* (2013.01); *C09K 3/10* (2013.01); *C08F 2500/21* (2013.01); *C08J 2351/06* (2013.01); *C08J 2423/08* (2013.01); *C08J 2423/12* (2013.01); *C08J 2423/14* (2013.01); *C08L 2205/025* (2013.01); *C08L 2312/08* (2013.01); *C09K 2003/1068* (2013.01); *C09K 2200/0494* (2013.01); *C09K 2200/062* (2013.01)

(58) Field of Classification Search
CPC .............. C08G 18/3206; C08G 18/673; C08G 18/675; C08G 18/722; C08G 18/73; C08G 18/758; C08G 18/83; C08G 63/52; C08G 2101/00; C08G 2280/00; B29C 45/0001; B29C 48/03; B29C 61/06; B29C 67/20; B29C 71/02; B29C 71/04; B29C 48/00; B29C 51/00; B29C 51/002; B29K 2075/00; B29K 2105/04
See application file for complete search history.

(56) References Cited

U.S. PATENT DOCUMENTS

| | | | |
|---|---|---|---|
| 2,788,804 | A | 4/1957 | Larkin |
| 3,644,315 | A | 2/1972 | Gardner et al. |
| 3,682,201 | A | 8/1972 | Atwell et al. |
| 4,076,698 | A | 2/1978 | Anderson et al. |
| 4,247,667 | A | 1/1981 | Nojiri et al. |
| 4,412,042 | A | 10/1983 | Matsuura et al. |
| 4,412,942 | A | 11/1983 | Naarmann et al. |
| 4,419,844 | A | 12/1983 | Kreisfeld |
| 4,446,283 | A | 5/1984 | Doi et al. |
| 4,515,210 | A | 5/1985 | Smith et al. |
| 4,528,155 | A | 7/1985 | Elder |
| 4,591,606 | A | 5/1986 | Bergstrom |
| 4,614,208 | A | 9/1986 | Skarelius |
| 4,618,654 | A | 10/1986 | Schmidtchen et al. |
| 4,627,472 | A | 12/1986 | Goettler |
| 4,798,864 | A | 1/1989 | Topcik |
| 4,803,244 | A | 2/1989 | Umpleby |
| 4,806,594 | A | 2/1989 | Gross et al. |
| 4,818,789 | A | 4/1989 | Tomko et al. |

(Continued)

FOREIGN PATENT DOCUMENTS

| | | |
|---|---|---|
| EP | 913427 A1 | 6/1999 |
| EP | 920876 A2 | 6/1999 |

(Continued)

OTHER PUBLICATIONS

State Intellectual Property Office of The P.R.C., "First Office Action in Application No. 201580046407.0", dated Jul. 19, 2018, p. 7 pp., Published in: Beijing, China.

(Continued)

*Primary Examiner* — Irina S Zemel
(74) *Attorney, Agent, or Firm* — Paschall & Associates, LLC; Mary Jo Boldingh

(57) ABSTRACT

A combined sealing member is provided that includes a composition comprising two or more polyolefin elastomers selected from the group consisting of a dense, a micro-dense and a dynamic silane-crosslinked polyolefin elastomer having a respective density of less than 0.90 g/cm$^3$, less than 0.70 g/cm$^3$, and less than 0.60 g/cm$^3$. The combined sealing member exhibits a compression set of from about 5.0% to about 35.0%, as measured according to ASTM D 395 (22 hrs @ 70° C.).

18 Claims, 22 Drawing Sheets

(56) References Cited

U.S. PATENT DOCUMENTS

| | | |
|---|---|---|
| 4,870,136 A | 9/1989 | Yagi et al. |
| 4,894,281 A | 1/1990 | Yagi et al. |
| 4,927,184 A | 5/1990 | Bourjot et al. |
| 4,927,871 A | 5/1990 | Ohori et al. |
| 5,145,628 A | 9/1992 | Karg et al. |
| 5,252,660 A | 10/1993 | Hazan et al. |
| 5,266,627 A | 11/1993 | Meverden et al. |
| 5,272,236 A | 12/1993 | Lai et al. |
| 5,278,272 A | 1/1994 | Lai et al. |
| 5,326,824 A | 7/1994 | Asanuma |
| 5,380,385 A | 1/1995 | Derroire |
| 5,472,746 A | 12/1995 | Miyajima |
| 5,532,066 A | 7/1996 | Latiolais et al. |
| 5,741,858 A | 4/1998 | Brann |
| 5,776,570 A | 7/1998 | Murakami |
| 5,814,254 A | 9/1998 | Bisconti |
| 5,824,718 A | 10/1998 | Penfold et al. |
| 5,837,174 A | 11/1998 | Bisconti |
| 5,868,981 A | 2/1999 | Bisconti |
| 5,880,192 A | 3/1999 | Brown et al. |
| 5,883,144 A | 3/1999 | Bambara et al. |
| 5,911,940 A | 6/1999 | Walton |
| 5,974,694 A | 11/1999 | Vecchiola |
| 5,986,002 A | 11/1999 | Hwang et al. |
| 5,994,474 A | 11/1999 | Wey et al. |
| 6,005,055 A | 12/1999 | Dammert et al. |
| 6,048,935 A | 4/2000 | Penfold et al. |
| 6,068,026 A | 5/2000 | Garois |
| 6,124,370 A | 9/2000 | Walton |
| 6,235,848 B1 | 5/2001 | Bickert et al. |
| 6,316,512 B1 | 11/2001 | Bambara et al. |
| 6,339,123 B1 | 1/2002 | Raetzsch |
| 6,361,842 B1 | 3/2002 | Stachowiak |
| 6,395,791 B1 | 5/2002 | Chaudhary et al. |
| 6,399,708 B2 | 6/2002 | Valligny et al. |
| 6,455,637 B1 | 9/2002 | Jackson |
| 6,465,547 B1 | 10/2002 | Jackson |
| 6,476,132 B1 | 11/2002 | Abdou-Sabet et al. |
| 6,629,547 B1 | 10/2003 | Yamaguchi |
| 6,652,937 B1 | 11/2003 | Guo et al. |
| 6,794,453 B2 | 9/2004 | Jackson et al. |
| 6,828,011 B2 | 12/2004 | Yu et al. |
| 6,864,315 B1 | 3/2005 | Hakuta et al. |
| 7,041,744 B2 | 5/2006 | Palmolf et al. |
| 7,279,529 B2 | 10/2007 | Hogge et al. |
| 7,281,547 B2 | 10/2007 | Cleveland et al. |
| 7,524,911 B2 | 4/2009 | Karjala |
| 7,834,115 B2 | 11/2010 | Johansson et al. |
| 8,017,710 B2 | 9/2011 | Sultan et al. |
| 8,205,391 B2 | 6/2012 | Aritake et al. |
| 8,210,213 B2 | 7/2012 | Miyamoto |
| 8,288,470 B2 | 10/2012 | Ansems et al. |
| 8,299,166 B2 | 10/2012 | Carlsson |
| 8,318,864 B2 | 11/2012 | Harris et al. |
| 8,387,625 B2 | 3/2013 | Kawata et al. |
| 8,728,600 B1 | 5/2014 | Hayes |
| 8,835,548 B2 | 9/2014 | Esseghir et al. |
| 9,023,939 B2 | 5/2015 | Ansems et al. |
| 9,115,620 B2 | 8/2015 | Doneva et al. |
| 9,127,110 B2 | 9/2015 | Sugita et al. |
| 9,387,625 B2 | 7/2016 | Esseghir et al. |
| 10,040,888 B1 | 8/2018 | Gopalan |
| 10,100,139 B2 | 10/2018 | Gopalan |
| 10,253,127 B2 | 4/2019 | Gopalan |
| 2002/0100516 A1 | 8/2002 | Powell |
| 2002/0177659 A1 | 11/2002 | Morikawa |
| 2004/0006179 A1 | 1/2004 | Graf |
| 2004/0045619 A1 | 3/2004 | Backman et al. |
| 2004/0103948 A1 | 6/2004 | Scheelen et al. |
| 2004/0157053 A1 | 8/2004 | Yu et al. |
| 2004/0265524 A1 | 12/2004 | Wideman et al. |
| 2004/0265563 A1 | 12/2004 | Sakai et al. |
| 2005/0095374 A1 | 5/2005 | Cothran et al. |
| 2005/0100747 A1 | 5/2005 | Gopalan et al. |
| 2005/0268979 A1 | 12/2005 | Hibino |
| 2005/0269737 A1 | 12/2005 | Hogge |
| 2006/0185750 A1 | 8/2006 | Mestemacher |
| 2007/0027250 A1 | 2/2007 | Joseph et al. |
| 2007/0122570 A1 | 3/2007 | Honda et al. |
| 2007/0219334 A1 | 9/2007 | Li Pi Shan |
| 2008/0023215 A1 | 1/2008 | Uehara et al. |
| 2008/0053551 A1 | 3/2008 | Hatchett |
| 2008/0097038 A1 | 4/2008 | Biscoglio et al. |
| 2008/0167421 A1 | 7/2008 | Yalvac |
| 2008/0306217 A1 | 12/2008 | Karjala et al. |
| 2008/0314470 A1 | 12/2008 | Trace et al. |
| 2009/0143531 A1 | 6/2009 | Ouhadi et al. |
| 2010/0029827 A1 | 2/2010 | Ansems |
| 2010/0209705 A1 | 8/2010 | Lin et al. |
| 2010/0249256 A1 | 9/2010 | Moscardi et al. |
| 2011/0009514 A1 | 1/2011 | Chaudhary |
| 2011/0021103 A1 | 1/2011 | Alper |
| 2011/0060078 A1 | 3/2011 | Becker |
| 2011/0144277 A1 | 6/2011 | Weissenbach et al. |
| 2011/0144278 A1 | 6/2011 | Weissenbach et al. |
| 2011/0146792 A1 | 6/2011 | Wu et al. |
| 2011/0172367 A1 | 7/2011 | Backer et al. |
| 2011/0259464 A1 | 10/2011 | Lacroix et al. |
| 2012/0042980 A1 | 2/2012 | Mezzalira et al. |
| 2012/0145275 A1 | 6/2012 | Seebold et al. |
| 2012/0171496 A1 | 7/2012 | Esseghir et al. |
| 2012/0178867 A1 | 7/2012 | Esseghir et al. |
| 2012/0312581 A1 | 12/2012 | Yasuda et al. |
| 2014/0191161 A1 | 7/2014 | Amako et al. |
| 2014/0200297 A1 | 7/2014 | Kimura |
| 2015/0025165 A1 | 1/2015 | Chen |
| 2015/0047264 A1 | 2/2015 | Kobayashi |
| 2016/0174655 A1 | 6/2016 | Schiller et al. |
| 2016/0208060 A1 | 7/2016 | Nishiguchi et al. |
| 2016/0251535 A1 | 9/2016 | Chaudhary et al. |
| 2017/0130876 A1 | 5/2017 | Gopalan et al. |
| 2017/0204353 A1 | 7/2017 | Lee |
| 2018/0163901 A1 | 6/2018 | Gopalan |
| 2018/0002230 A1 | 8/2018 | Gopalan et al. |
| 2018/0223025 A1 | 8/2018 | Gopalan et al. |
| 2018/0237569 A1 | 8/2018 | Gopalan et al. |
| 2019/0346072 A1 | 11/2019 | Gopalan |

FOREIGN PATENT DOCUMENTS

| | | |
|---|---|---|
| EP | 944670 B1 | 4/2003 |
| EP | 1820821 A1 | 8/2007 |
| EP | 1849816 B1 | 6/2008 |
| EP | 2083047 A1 | 7/2009 |
| EP | 1644439 B1 | 8/2009 |
| EP | 2143984 A1 | 1/2010 |
| EP | 2407496 A1 | 1/2012 |
| EP | 2520422 A1 | 11/2012 |
| EP | 2546291 A1 | 1/2013 |
| EP | 2395878 B1 | 4/2013 |
| JP | 2013119583 A | 6/2013 |
| KR | 20090014439 A | 2/2009 |
| NO | 2004031292 A2 | 4/2004 |
| NO | WO2004031292 A2 | 4/2004 |
| WO | WO9001503 A1 | 2/1990 |
| WO | WO2005005532 A1 | 1/2005 |
| WO | WO2010074916 A1 | 7/2010 |
| WO | WO2010098932 A1 | 9/2010 |
| WO | WO2013134945 A1 | 9/2013 |
| WO | WO2015054893 A1 | 4/2015 |
| WO | WO2015126931 A1 | 8/2015 |
| WO | WO2016004204 A1 | 1/2016 |

OTHER PUBLICATIONS

Adachi et al., "Controllable Silane Water-Cross-Linking Kinetics and Curability of Ethylene-Propylene Copolymer by Amine Compounds, Industrial and Engineering Chemist", 2008, pp. 1812-1819, vol. 47.

Arhart, Richard J., "The Chemistry of Ethylene Propylene Insulation-PartII", 1993, pp. 11-14, vol. 9, No. (6), Publisher: IEEE Electrical Insulation Magazine.

(56) References Cited

OTHER PUBLICATIONS

Dow Corning, "Plastics, Polymerization and Rubber", 2009, p. 5 pp.
Gopalan et al., "U.S. Appl. No. 14/305,918, filed Jun. 16, 2014", Jun. 16, 2014.
Gopalan et al., "U.S. Appl. No. 14/449,702, filed Aug. 1, 2014", Aug. 1, 2014.
Dow, "High Performance Foam Solutions for Sports Shoes", 2013, p. 22 pp.
European Patent Office, "International Search Report and the Written Opinion of the International Searching Authority, PCT Application No. PCT/US2017/065442", dated Mar. 16, 2018, p. 10 pp.
European Patent Office, "International Search Report and the Written Opinion of the International Searching Authority, PCT Application No. PCT/US2017/065451", dated Mar. 16, 2018, p. 10 pp.
European Patent Office, "International Search Report and Written Opinion of the International Searching Authority, PCT Application No. PCT/US2017/065459", dated May 25, 2018, p. 16 pp.
European Patent Office, "International Search Report and the Written Opinion of the International Searching Authority, PCT Application No. PCT/US2017/065463", dated Mar. 16, 2018, p. 10 pp.
European Patent Office, "International Search Report and the Written Opinion of the International Searching Authority, PCT Application No. PCT/US2017/065360", dated Mar. 26, 2018, p. 11 pp.
European Patent Office, "International Search Report and the Written Opinion of the International Searching Authority, PCT Application No. PCT/US2017/065376", dated Feb. 22, 2018, p. 11 pp.
European Patent Office, "International Search Report and the Written Opinion of the International Searching Authority, PCT Application No. PCT/US2017/065386", dated Mar. 22, 2018, p. 11 pp.
European Patent Office, "International Search Report and Written Opion of the International Searching Authority, PCT Application No. PCT/US2017/065404", dated Mar. 16, 2018, p. 10 pp.
International Searching Authority, "International Search Report and Written Opinion for International Application No. PCT/US2015/038830", dated Sep. 23, 2015, p. 12 pp.
Morshedian et al., "Polyethylene Cross-linking by Two-step Silane Method: A Review", 2009, pp. 103-128, vol. 18, No. (2), Publisher: Iranian Polymer Journal.
Morshedian et al., "Silane grafting of polyethylene: effect of molecular structure, physical form, blending, and antioxidants", 2009, pp. 1-17, No. 24, Publisher: e-Polymers.
The Dow Chemical Company, "Material Data Center Datasheet of INFUSE 9107-TPO-", , Publisher: Web address https://www.materialdatacenter.com/ms/en/tradenames/Infuse/The+Dow+Chemical+Company/INFUSE%E2%84%A2+9807/4c8e141f/5862.
The Dow Chemical Company, "Material Data Center Datasheet of INFUSE 9807-TPO-", , Publisher: Web address https://www.materialdatacenter.com/ms/en/tradenames/Infuse/The+Dow+Chemical+Company/INFUSE%E2%84%A2+9107/af4357d6/5862.
Wei Wang et al., "Preparation of Low-Density Polyethylene Foams with High Rebound Resilience by Blending with Polyethylene-Octylene Elastomer", 2013, Publisher: Polymer Engineering and Science, https://doi.org/10.1002/pen.23509.
Sirisinha et al., "The effect of silane carriers on silane grafting of high-desity polyethylene and properties of crosslinked products", 2010, pp. 958-965, vol. 29, Publisher: Polymer Testing.
"Why Use Silane Crosslinking Technology", Jun. 8, 2012, Publisher: https://wenku.baidu.com/view/3454a9a7b0717fd5360cdcb4.
Adachi et al., "Controllable Sllane Water-Cross-Linking Kinetics and Curability of Ethylene-Propylene Copolymer by Amine Compounds, Industrial and Engineering Chemist", 2008, pp. 1812-1819, vol. 47.

Initiation

Propagation

Chain Transfer

Hydrolysis

Condensation/Crosslinking

COMBINED SEALS, COMPOSITIONS, AND METHODS OF MAKING THE SAME

CROSS-REFERENCE TO RELATED APPLICATION

This application is a continuation application that claims priority to and the benefit under 35 U.S.C. § 120 of U.S. patent application Ser. No. 15/836,490, filed on December 8, entitled "COMBINED SEALS, COMPOSITIONS, AND METHODS OF MAKING THE SAME," which claims priority under 35 U.S.C. § 119(e) to U.S. Provisional Patent Application No. 62/497,954 filed Dec. 10, 2016, entitled "WEATHERSTRIP, COMPOSITION INCLUDING SILANE-GRAFTED POLYOLEFIN, AND PROCESS OF MAKING A WEATHERSTRIP," the disclosures of which are expressly incorporated by reference herein in their entirety.

FIELD OF THE DISCLOSURE

The disclosure generally relates to compositions that may be used to form seals, and more particularly, to compositions used to form seals with combinations of silane-crosslinked polyolefin elastomers in vehicles and methods for manufacturing these compositions and seals.

BACKGROUND OF THE DISCLOSURE

The motor vehicle industry is continuously manufacturing and developing sealing elements and sections having low friction and abrasion resistance properties. These elements and sections can be extruded from certain polymeric materials. One example of an extruded abrasion-resistant section is a static seal. Static seals, such as weatherstrips, are mounted on an automobile window to provide a seal between the glass and the automobile body to prevent wind noise, water leaks, and particulate matter from entering the automobile. Another example of an extruded abrasion-resistant seal is a dynamic seal. Dynamic seals, such as weatherstrips, are typically employed to seal parts that are capable of motion relative to one another. According to further examples of these seals, foaming agents can be employed to generate porosity in the seals to offer further weight savings.

Weatherstrip formulations that make contact with various sections of automotive glass doors, and/or other sections of an automotive body traditionally utilize thermoplastic vulcanizates (TPV), styrene-ethylene/butylene-styrene copolymer (SEBS), or ethylene propylene diene monomer (EPDM) rubber to achieve desired sealing performance. Monolithic TPV, SEBS and EPDM materials typically exhibit densities in the range of 0.75 g/cm³ to 1.3 g/cm³, depending on whether foaming agents are employed. While monolithic TPV-, SEBS- and EPDM-based seals offer certain property and density ranges that can suitable for particular sealing applications, various portions of the seals may require differing properties and/or densities relative to other portions of the same seal. Further, TPVs are relatively easy to process, but sealing performance can be limited in terms of resilience or sealing ability over time and material costs tend to be high. Similarly, EPDM rubber formulations often require many ingredients (e.g., carbon black, petroleum-based oil, zinc oxide, miscellaneous fillers such as calcium carbonate or talc, processing aids, curatives, blowing agents, and many other materials to meet performance requirements), which tend to increase their material cost.

EPDM-based seals are also costly from a process standpoint. The EPDM constituent ingredients are typically mixed together in a one- or two-step process prior to shipping to an extrusion facility. At the extrusion facility, the ingredients and rubber compound(s) are extruded together to form a final material, which is subsequently formed into automotive glass contacting weatherstrips. Hence, the extrusion process used to manufacture weatherstrips can include many stages, depending on the type of EPDM or other types of resins, and may additionally require long lengths of curing ovens. For example, extrusion lines of up to 80 yards in length that are powered by natural gas and/or electricity may be required. Much of the natural gas and/or electricity is used to fuel hot air ovens, microwaves, infrared ovens, or other types of equipment used to vulcanize the EPDM rubber compounds. The vulcanization process also produces fumes that must be vented and monitored to comply with environmental requirements. Overall, the processes used to fabricate these traditional EPDM-based seals can be very time consuming, costly, and environmentally unfriendly.

Mindful of the drawbacks associated with current TPV-, SEBS- and EPDM-based sealing technologies, the automotive industry has a need for the development of new compositions and methods for manufacturing seals, such as weatherstrips, that are simpler, lighter in weight, lower in cost, have superior long-term load loss (LLS) (i.e., ability to seal the glass and window for a long term), offer variable properties within a given part, and are more environmentally friendly.

SUMMARY OF THE DISCLOSURE

According to one aspect of the present disclosure, a combined sealing member is provided that includes a composition comprising two or more polyolefin elastomers selected from the group consisting of a dense, a micro-dense and a dynamic silane-crosslinked polyolefin elastomer having a respective density of less than 0.90 g/cm³, less than 0.70 g/cm³, and less than 0.60 g/cm³. The combined sealing member exhibits a compression set of from about 5.0% to about 35.0%, as measured according to ASTM D 395 (22 hrs @ 70° C.).

According to another aspect of the present disclosure, a combined sealing member is provided that includes a composition comprising a first and a second polyolefin elastomer. The first elastomer comprises a microdense silane-crosslinked polyolefin elastomer having a density of less than 0.70 g/cm³. Further, the second elastomer comprises a dense silane-crosslinked polyolefin elastomer having a density of less than 0.90 g/cm³ or a dynamic silane-crosslinked polyolefin elastomer having a density of less than 0.60 g/cm³. In addition, the combined sealing member exhibits a compression set of from about 5.0% to about 35.0%, as measured according to ASTM D 395 (22 hrs @ 70° C.).

According to a further aspect of the present disclosure, a combined sealing member is provided that includes a composition comprising a first and a second polyolefin elastomer. The first elastomer comprises a dense silane-crosslinked polyolefin elastomer having a density of less than 0.90 g/cm³. Further, the second elastomer comprises a dynamic silane-crosslinked polyolefin elastomer having a density of less than 0.60 g/cm³. In addition, the combined sealing member exhibits a compression set of from about 5.0% to about 35.0%, as measured according to ASTM D 395 (22 hrs @ 70° C.).

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
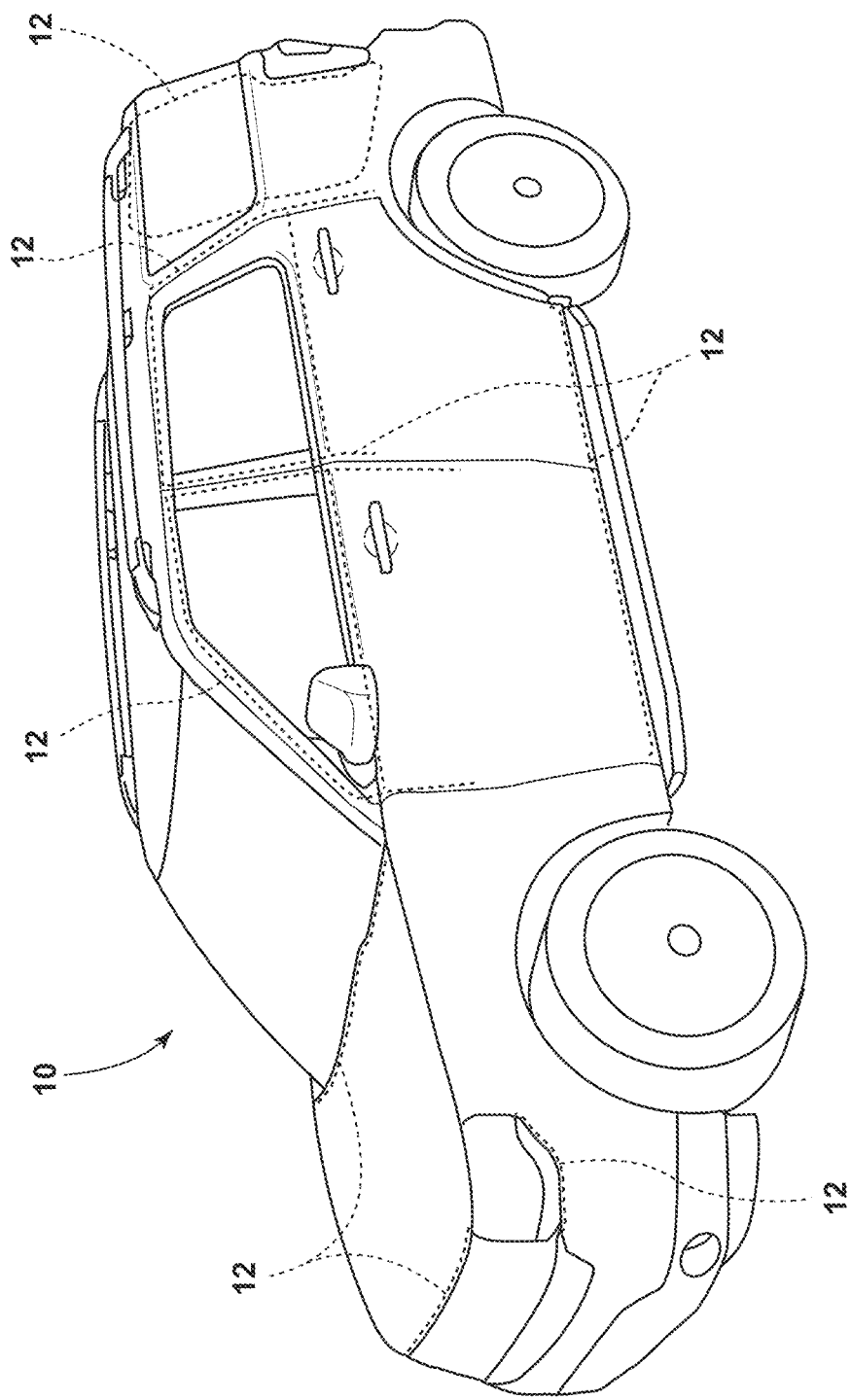
FIG. 1 is a front perspective view of a vehicle having a plurality of weatherstrip static seals according to some aspects of the present disclosure.

For purposes of description herein the terms "upper," "lower," "right," "left," "rear," "front," "vertical," "horizontal," and derivatives thereof shall relate to the combined seals of the disclosure as oriented in the vehicle shown in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

A value modified by a term or terms, such as "about" and "substantially," may not be limited to the precise value specified. The approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-6G, various combined sealing members are provided. In general, the combined sealing members of the disclosure include a composition having two or more dense, micro-dense and dynamic silane-crosslinked polyolefin elastomers, each with a density less than 0.90 g/cm$^3$, less than 0.70 g/cm$^3$, and less than 0.60 g/cm$^3$, respectively. The combined sealing member can exhibit a compression set of from about 5.0% to about 35.0% measured according to ASTM D 395 (22 hrs @ 70° C.). The silane-crosslinked polyolefin elastomer can be a dense elastomer produced from a blend including a first polyolefin having a density less than 0.86 g/cm$^3$, a second polyolefin having a crystallinity less than 40%, a silane crosslinker, a grafting initiator, and a condensation catalyst. The polyolefin elastomer can also be a dynamic or sponge blend including a first polyolefin having a density less than 0.86 g/cm$^3$, a second polyolefin having a crystallinity less than 60%, a silane crosslinker, a grafting initiator, a condensation catalyst, and a foaming agent. The polyolefin elastomer can also be a microdense blend including a first polyolefin having a density less than 0.86 g/cm$^3$, a second polyolefin having a crystallinity less than 60%, a silane crosslinker, a grafting initiator, a condensation catalyst, and a microencapsulated foaming agent.

Referring to FIG. 1, vehicle 10 is provided having a variety of combined sealing members 12 (e.g., weatherstrip seals). The vehicle 10 is shown as a sports utility vehicle (SUV) but the type of vehicle 10 is not meant to be limiting and can include, for example, a car, minivan, truck, commercial vehicle, or any other wheeled motorized vehicle. The vehicle 10 and the combined sealing members 12 described herein are for illustrative purposes only and are not to be construed as limiting to only vehicles 10, for example, the combined sealing members 12 could additionally be used in the building construction industry, the transportation industry, the electronics industry, the footwear industry, and the roofing industry.

Figure 2:
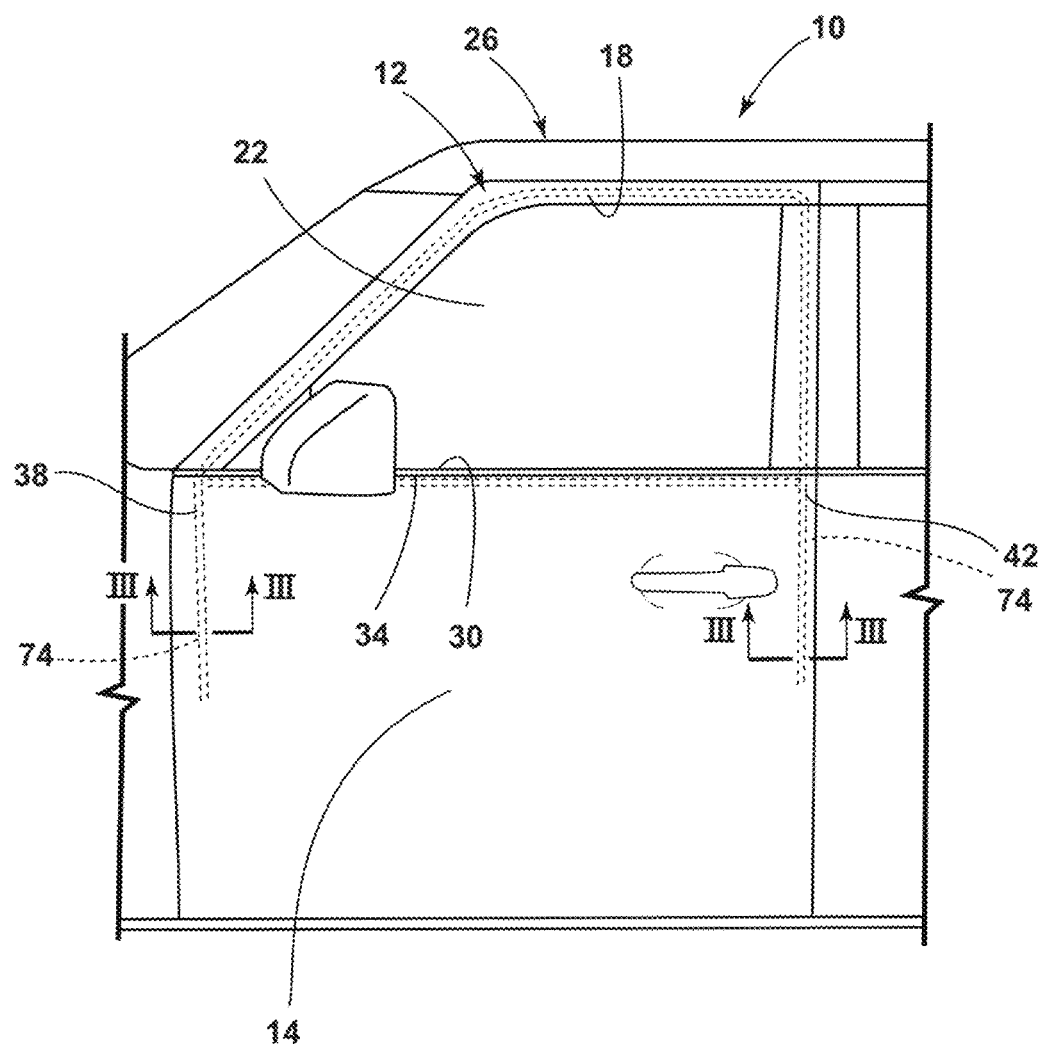
FIG. 2 is a side perspective view of a front door portion of the vehicle presented in FIG. 1.

Referring now to FIG. 2, a portion of the vehicle 10 (see FIG. 1) including a front door 14 is provided. The door 14 includes a window opening 18 and a window 22 that can be selectively raised and lowered relative to the window opening 18. The combined sealing member 12 in the form of a window weatherstrip seal 26 surrounds perimeter portions of the window 22 (e.g., side and upper portions when the window is closed). The window weatherstrip seal 26 may be used to seal portions of the door 14 against the surface and/or edges of the glass window 22. The window weatherstrip seal 26 may be formed using separate weatherstrip portions including a beltline weatherstrip seal 12, 34, and a below-belt weatherstrip seal 12, 74 (see also FIG. 3) positioned in first and second belt portions 38, 42 that engage different perimeter portions of the window 22. The first and second belt portions 38, 42 can be located in an interior cavity of the door 14 and the below-belt weatherstrip seal 74 can be positioned within the first and second belt portions 38, 42. In some aspects, the beltline and below-belt weatherstrip seals 34, 74 can be integrally joined together as a module or the combined window weatherstrip seal 26. An inner edge of the window opening 18, as defined by the door 14, may be referred to as a beltline 30. Extending along the beltline 30 is the beltline weatherstrip seal 34 that joins the window 22 to the surrounding door 14 and makes up a portion of the window weatherstrip seal 26.

The terms "weatherstrip" and "weatherstrip seal", as used herein, are examples of a seal. The term "seal", as used herein, means a device or substance that is used to join two surfaces together. The surfaces used herein may include the various types of surfaces found on, for example, automobiles, structures, windows, roofs, electronic devices, footwear, and/or any other industry or product where seals can be used to help minimize and/or eliminate the transmission of noise, water, or particulate matter through the respective surfaces.

The seals used for the various combined sealing members 12 (e.g., weatherstrip seals 26) disclosed herein are fabricated or manufactured from two or more different silane-crosslinked polyolefin elastomers. In some aspects, the different silane-crosslinked polyolefin elastomers can each make up one or more different strips, gripping portions, bodies, pins, and/or surfaces of the combined seal. As noted earlier, static seals generally have little or no relative motion between the mating surfaces being sealed. In some aspects, the combined seals of the disclosure include one or more portions made from a dense silane-crosslinked polyolefin elastomer. As used herein, a "dense" silane-crosslinked polyolefin elastomer has a density of less than 0.90 g/cm$^3$. The synthesis and processing methods used to produce this dense silane-crosslinked polyolefin elastomer and its specialized material properties are disclosed herein.

In aspects of the disclosure, the combined seals include one or more portions made from a micro-dense silane-crosslinked polyolefin elastomer, as typically used in micro-dense seals. Micro-dense seals are generally used where there is little to moderate motion between the mating surfaces being sealed. As used herein, a "micro-dense" or "microdense" silane-crosslinked polyolefin elastomer includes a microencapsulated foaming agent and has a density less than 0.70 g/cm$^3$ or, more specifically, a density from about 0.60 g/cm$^3$ to about 0.69 g/cm$^3$.

In aspects of the disclosure, the combined seals include one or more portions made from a sponge silane-crosslinked polyolefin elastomer, as typically used in dynamic seals. Dynamic seals are generally used when there is motion between the mating surfaces. As used herein, a "dynamic" or "sponge" silane-crosslinked polyolefin elastomer includes a chemical and/or physical foaming agent and has a density less than 0.60 g/cm$^3$ or, more specifically, a density from about 0.50 g/cm$^3$ to about 0.59 g/cm$^3$.

Figure 3:
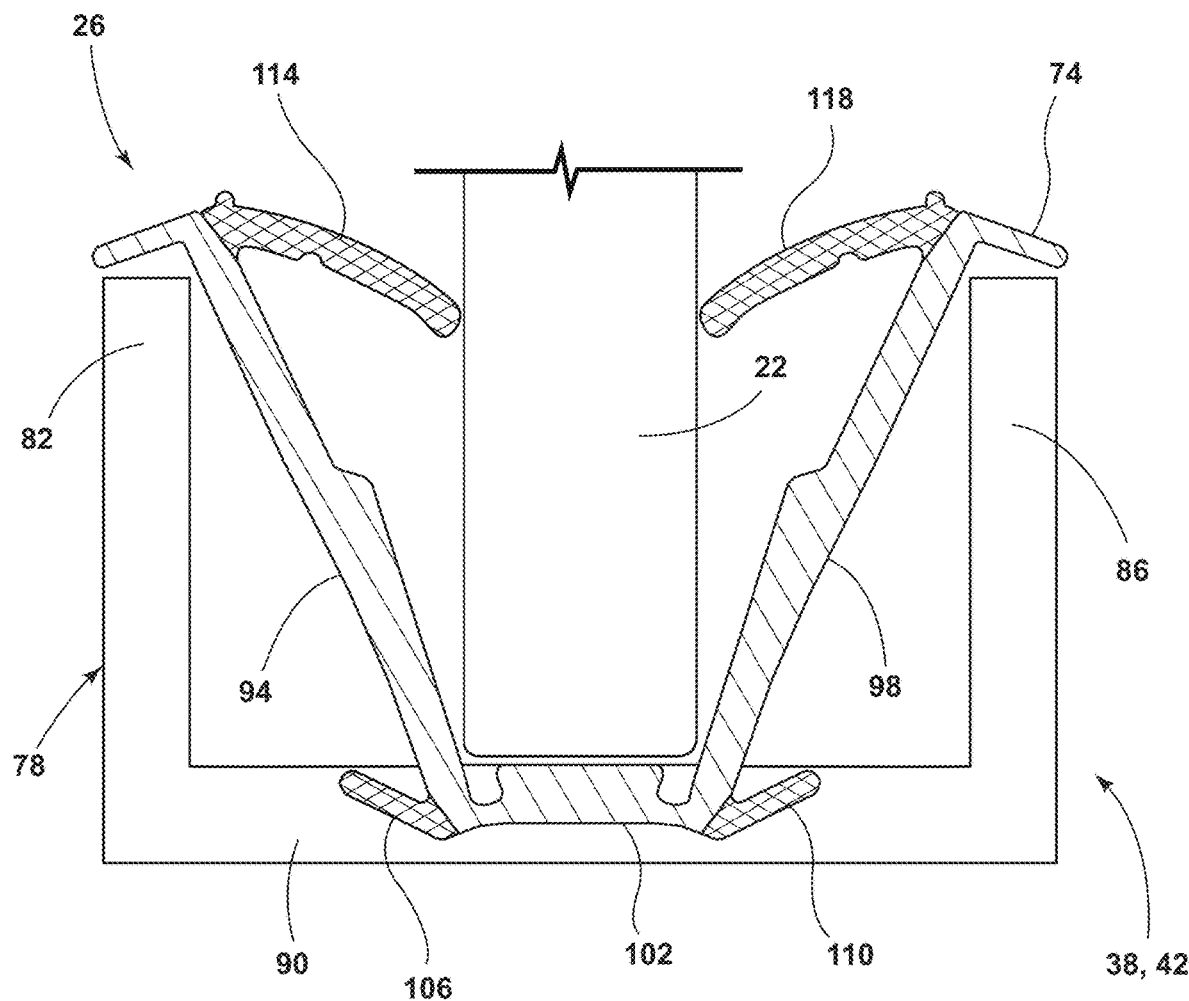
FIG. 3 is a cross-sectional view of a below-belt weatherstrip seal according to some aspects of the present disclosure.

Referring now to FIG. 3, a cross-sectional view of the window weatherstrip seal 26, which is exemplary of the combined sealing members 12 of the disclosure (see FIGS. 1, 2), in the form of the below-belt weatherstrip seal 74 (see also FIG. 2) is provided. In some aspects, the below-belt weatherstrip seal 74 may have an outer rigid support member 78 provided as a generally U-shaped component that receives or supports the below-belt weatherstrip seal 74. The member 78 can include upstanding first and second legs 82, 86 that form a channel base 90 which can receive the below-belt weatherstrip seal 74. The below-belt weatherstrip seal 74 may be unsupported, i.e., in this configuration the below-belt weatherstrip seal 74 does not have a rigid support member encased within the rubber or EPDM extrusion of which it is made. First and second legs 94, 98 of the below-belt weatherstrip seal 74 extend generally upwardly and outwardly from a base portion 102, giving the below-belt weatherstrip seal 74 a generally U-shaped conformation adapted to receive a perimeter edge of the window 22. First and second retaining flanges 106, 110 are provided along outer edges of the base portion 102 while first and second flexible seal lips 114, 118 are flexibly joined at outer ends of the respective first and second legs 94, 98. The first and second flexible seal lips 114, 118 and the first and second retaining flanges 106, 110 may be formed of different polyolefin compounds (e.g., dense, dynamic and/or micro-dense polyolefin blends) than the remaining rubber of the below-belt weatherstrip seal 74 employed in the legs 94, 98. Further, those portions of the below-belt weatherstrip seal 74 including the first and second legs 94, 98 and base portion 102 can be adapted to engage the window 22 using a hardened surface (e.g., metal oxides and carbon allotropes), while the first and second seal lips 114, 118 may have a low friction surface (e.g., graphite powder and polytetrafluoroethylene) to engage the window 22 surface.

Figure 4:
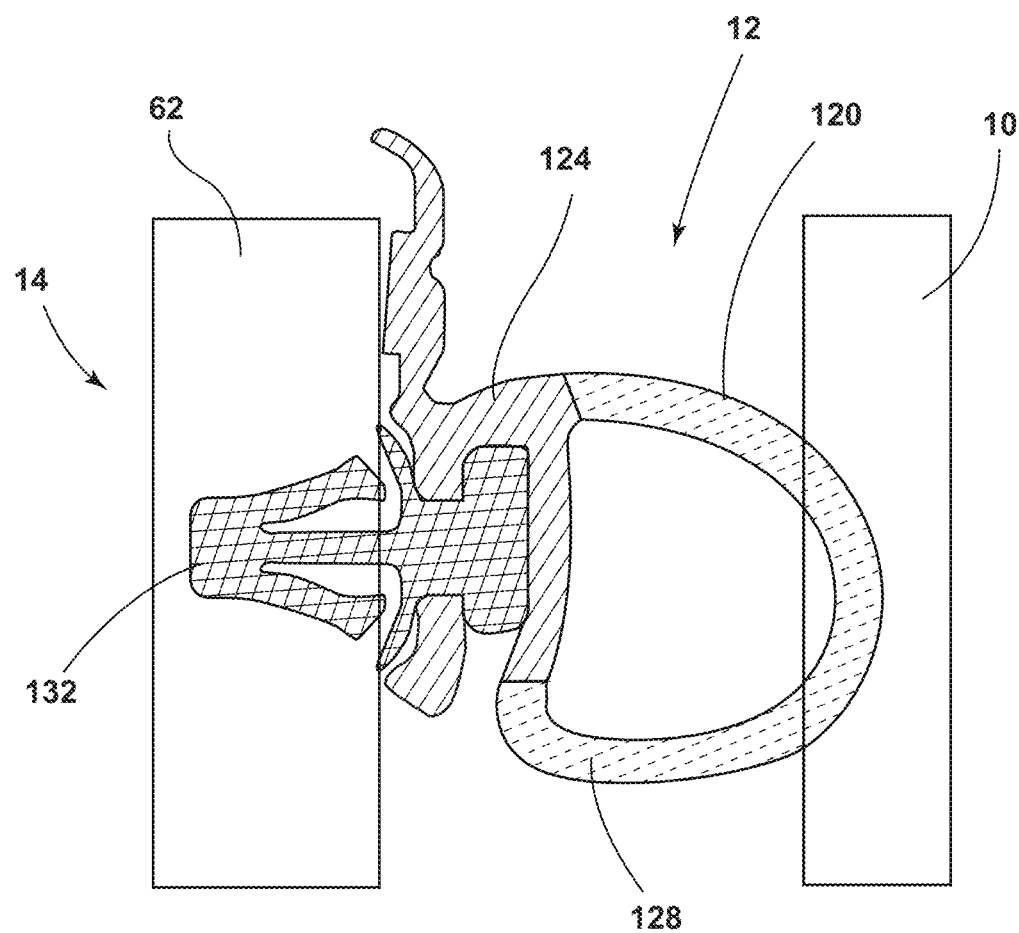
FIG. 4 is a cross-sectional view of a primary weatherstrip seal according to some aspects of the present disclosure.

Referring now to FIG. 4, a cross-sectional representation of a combined sealing member 12 in the form of a primary weatherstrip seal 120 is provided. In particular, the primary weatherstrip seal 120 includes a combination of three types of silane-crosslinked polyolefin elastomers according to the disclosure: a main body member 124 comprising a micro-dense silane-crosslinked polyolefin elastomer, a bulb member 128 comprising a sponge silane-crosslinked polyolefin elastomer, and a retainer pin 132 comprising a dense silane-crosslinked polyolefin elastomer. The main body member 124 can be secured to the door panel 62 or other portion of the door 14 (see FIG. 2) of the vehicle 10 by any conventional or known means for doing so, including but not limited to, for example, the retainer pin 132, though this is not a limiting feature of the disclosure. As such, any means known in the relevant art for securing the primary weatherstrip seal 120 to a surface of the vehicle 10 may be used. The bulb member 128 can provide a seal between the door 14 and other portions of the vehicle 10, for example, when the primary weatherstrip seal 120 is brought into contact and compressed between the two respective surfaces. As will be appreciated by one skilled in the art, the body of the vehicle 10 and the inner portion of the door 14 represented in FIG. 4 may be substituted by any two adjoining surfaces that would benefit from the presence of one or more primary weatherstrip seals 120 impervious to environmental conditions. As such, the body of the vehicle 10 and the inner portion of the door 14 are merely representative of adjoining surfaces and are not considered to be limiting features of the disclosure. Other locations where primary weatherstrip seals 120 could be applied include, for example, door panels, body seals, trunk lid seals, door-to-door seals, rocker seals, and hood seals (e.g., as provided in FIG. 5).

Referring to FIG. 5 and FIGS. 6A-6H, an isolated exploded schematic view of a plurality of combined sealing members 12 in the form of various weatherstrip seals (e.g., seals 122, 126, 130, 146, 150 and 154) that can be used in the vehicle 10 (see FIG. 1) is provided. The combined sealing members 12 may be configured as various weatherstrip seals, including those coupled to the perimeter of the door, such as a secondary door seal 122 (see FIG. 6A) and a primary door seal 126 (see FIG. 6B). The dynamic sealing member 12 may also be in the form of a rocker seal 130 (see FIG. 6C) used to seal an underbody with a foot well of the vehicle 10 (see FIG. 1). Further, a liftgate seal 146 (see FIG. 6D) may be configured to provide a functional seal used to couple a back hatch with a flip glass seal 150 (see FIG. 6E) positioned against a liftable rear glass window. Similarly, pillar margin seal 154 (see FIG. 6F) may be configured to seal another pillar of the vehicle 10.

Figure 5:
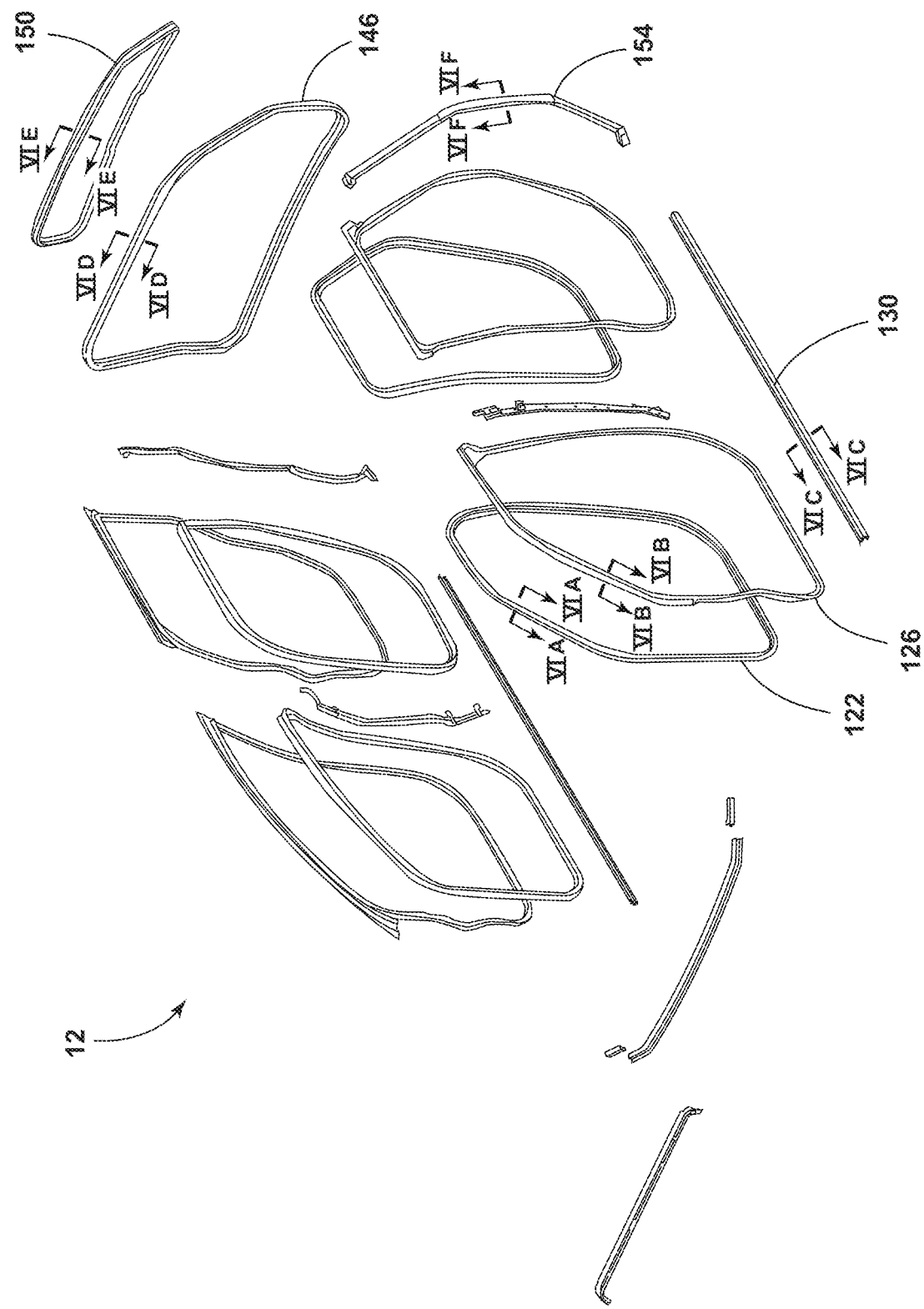
FIG. 5 is a schematic perspective view of a plurality of combined seals used in the vehicle presented in FIG. 1 according to aspects of the disclosure.

Referring now to FIGS. 6A-6F, a variety of cross-sectional views of the combined sealing members 12 depicted in FIG. 5 are provided that include: the secondary door seal 122, the primary door seal 126, the rocker seal 130, the liftgate seal 146, the flip glass seal 150 and the pillar margin seal 154. The structures of each of the combined sealing members 12 may be varied based on the particular application, e.g., sealing a glass surface to a portion of the vehicle 10 (see FIG. 1). More particularly, the various combined sealing members 12, as shown in FIGS. 6A-6F, can include combinations of bodies, legs, lips, flanges, sections, gripping portions, and edges (as previously described in connection with FIG. 5), and further comprise two or more types of silane-crosslinked polyolefin elastomers (e.g., sponge (or dynamic), dense and micro-dense silane-crosslinked polyolefin elastomers). In some aspects, the combined sealing member 12 may be extruded around a piece of metal to provide greater structural stability as shown in outer belt dynamic seal 122, and first center pillar dynamic seal 146.

In some aspects, the combined sealing member 12 may have a flock material coupled to a surface of the member 12. The term "flock", as used herein, is defined to mean a light powder, comprised of ground wood or cotton fiber, used as a coating, extender, and/or filler with the dynamic, dense and/or micro-dense silane-crosslinked polyolefin elastomers of the member 12 to provide a surface having a lower surface energy and/or lower friction surface.

Figure 6A:
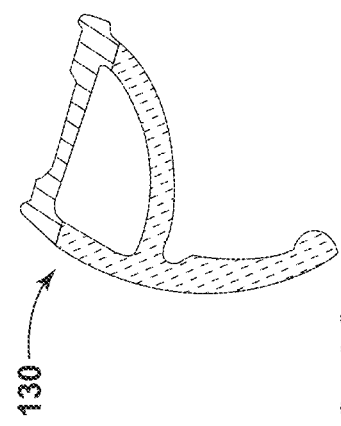
FIGS. 6A-6F are a variety of cross-sectional views of the representative combined seals provided in FIG. 5 according to some aspects of the present disclosure.
Figure 6B:
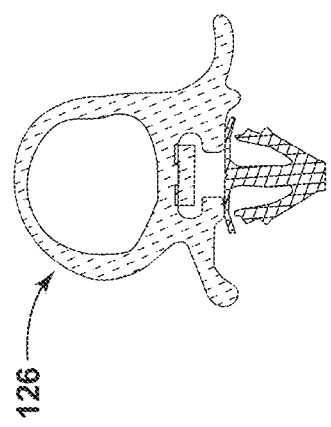
Figure 6C:
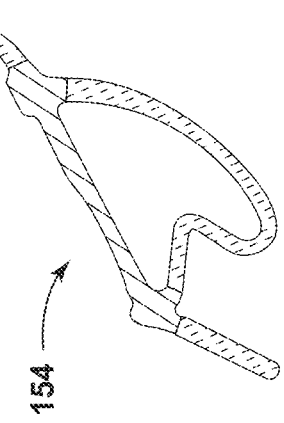
Figure 6D:
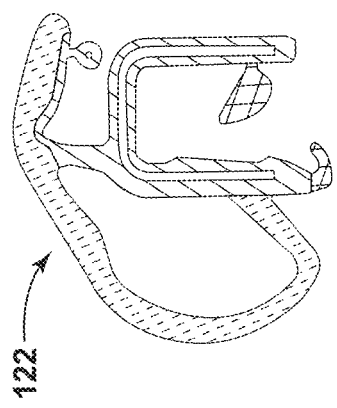
Figure 6E:
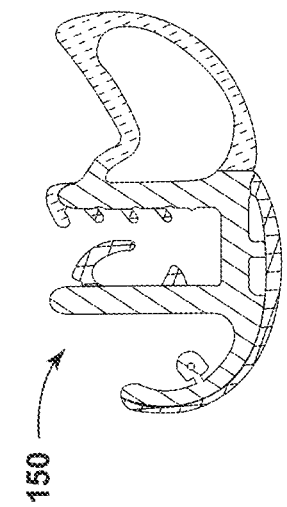
Figure 6F:
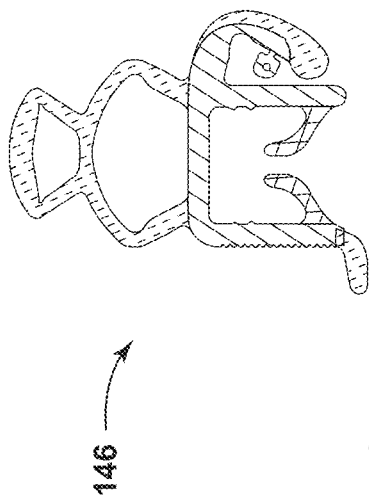
Figure 6G:
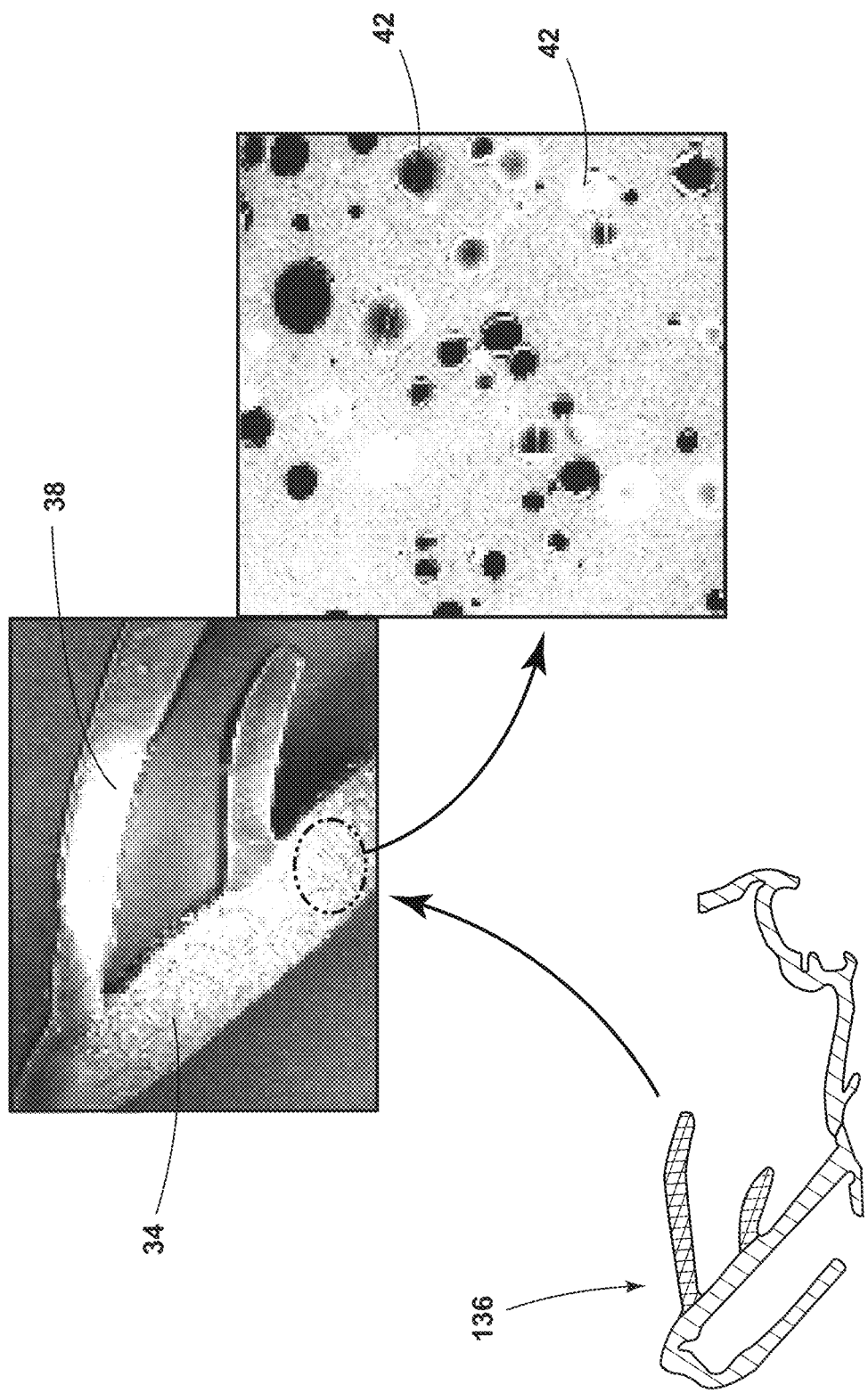
FIG. 6G is a schematic cross-sectional view of a combined seal accompanied with cross-sectional and enlarged views of an actual combined seal for illustration, according to aspects of the disclosure.

Referring now to FIG. 6G, a schematic cross-sectional view of a microdense sealing member 136 (i.e., as exemplary of the combined sealing members 12 shown in FIGS. 1 and 2) is provided, and accompanied with cross-sectional micrographs of an actual combined sealing member. As is evident from the micrograph, the microdense sealing member 136 includes a microdense seal portion 34 that comprises a microdense silane-crosslinked polyolefin elastomer and a dense seal portion 38 that comprises a dense silane-crosslinked polyolefin elastomer. Notably, the enlarged micrograph demonstrates that the microdense seal portion 34 includes porosity 42 that can be developed through the incorporation of foaming agents in the elastomer during processing, as discussed in greater detail below. As also outlined below, and as evident in FIG. 3, the pore size of the microdense portion can be adjusted or varied by the choice of foaming agent and/or processing conditions.

Thus, the disclosure focuses on the composition, method of making the composition, and the corresponding material properties for three types of silane-crosslinked polyolefin elastomers (dynamic, dense and micro-dense) used to make combined seals, e.g., combined sealing members 12. The combined sealing member 12 is formed from a silane-grafted polyolefin where the silane-grafted polyolefin may have a catalyst added to form a silane-crosslinkable polyolefin elastomer. This silane-crosslinkable polyolefin may then be crosslinked upon exposure to moisture and/or heat to form the final silane-crosslinked polyolefin elastomers or blend. In aspects, the dense silane-crosslinked polyolefin elastomer or blend includes a first polyolefin having a density less than 0.90 g/cm$^3$, a second polyolefin having a crystallinity of less than 40%, a silane crosslinker, a graft initiator, and a condensation catalyst. As such, the silane-crosslinked polyolefin elastomer or blend can include a dense elastomer produced from a blend including a first polyolefin having a density less than 0.86 g/cm$^3$, a second polyolefin having a crystallinity less than 40%, a silane crosslinker, a grafting initiator, and a condensation catalyst. The polyolefin elastomer can also be a dynamic or sponge blend including a first polyolefin having a density less than 0.86 g/cm$^3$, a second polyolefin having a crystallinity less than 60%, a silane crosslinker, a grafting initiator, a condensation catalyst, and a foaming agent. The polyolefin elastomer can also be a micro-dense blend including a first polyolefin having a density less than 0.86 g/cm$^3$, a second polyolefin having a crystallinity less than 60%, a silane crosslinker, a grafting initiator, a condensation catalyst, and a microencapsulated foaming agent.

First Polyolefin

The first polyolefin can be a polyolefin elastomer including an olefin block copolymer, an ethylene/α-olefin copolymer, a propylene/α-olefin copolymer, EPDM, EPM, or a mixture of two or more of any of these materials. Exemplary block copolymers include those sold under the trade names INFUSE™, an olefin block co-polymer (the Dow Chemical Company) and SEPTON™ V-SERIES, a styrene-ethylene-butylene-styrene block copolymer (Kura ray Co., LTD.). Exemplary ethylene/α-olefin copolymers include those sold under the trade names TAFMER™ (e.g., TAFMER DF710)

(Mitsui Chemicals, Inc.), and ENGAGE™ (e.g., ENGAGE 8150) (the Dow Chemical Company). Exemplary propylene/α-olefin copolymers include those sold under the trade name VISTAMAXX 6102 grades (Exxon Mobil Chemical Company), TAFMER™ XM (Mitsui Chemical Company), and Versify (Dow Chemical Company). The EPDM may have a diene content of from about 0.5 to about 10 wt %. The EPM may have an ethylene content of 45 wt % to 75 wt %.

The term "comonomer" refers to olefin comonomers which are suitable for being polymerized with olefin monomers, such as ethylene or propylene monomers. Comonomers may comprise but are not limited to aliphatic $C_2$-$C_{20}$ α-olefins. Examples of suitable aliphatic $C_2$-$C_{20}$ α-olefins include ethylene, propylene, 1-butene, 4-methyl-1-pentene, 1-hexene, 1-octene, 1-decene, 1-dodecene, 1-tetradecene, 1-hexadecene, 1-octadecene and 1-eicosene. In an embodiment, the comonomer is vinyl acetate. The term "copolymer" refers to a polymer, which is made by linking more than one type of monomer in the same polymer chain. The term "homopolymer" refers to a polymer which is made by linking olefin monomers, in the absence of comonomers. The amount of comonomer can, in some embodiments, be from greater than 0 to about 12 wt % based on the weight of the polyolefin, including from greater than 0 to about 9 wt % and from greater than 0 to about 7 wt %. In some embodiments, the comonomer content is greater than about 2 mol % of the final polymer, including greater than about 3 mol % and greater than about 6 mol %. The comonomer content may be less than or equal to about 30 mol %. A copolymer can be a random or block (heterophasic) copolymer. In some embodiments, the polyolefin is a random copolymer of propylene and ethylene.

In some aspects, the first polyolefin is selected from the group consisting of: an olefin homopolymer, a blend of homopolymers, a copolymer made using two or more olefins, a blend of copolymers each made using two or more olefins, and a combination of olefin homopolymers blended with copolymers made using two or more olefins. The olefin may be selected from ethylene, propylene, 1-butene, 1-propene, 1-hexene, 1-octene, and other higher 1-olefin. The first polyolefin may be synthesized using many different processes (e.g., using gas phase and solution based using metallocene catalysis and Ziegler-Natta catalysis) and optionally using a catalyst suitable for polymerizing ethylene and/or α-olefins. In some aspects, a metallocene catalyst may be used to produce low density ethylene/α-olefin polymers.

In some aspects, the polyethylene used for the first polyolefin can be classified into several types including, but not limited to, LDPE (Low Density Polyethylene), LLDPE (Linear Low Density Polyethylene), and HDPE (High Density Polyethylene). In other aspects, the polyethylene can be classified as Ultra High Molecular Weight (UHMW), High Molecular Weight (HMW), Medium Molecular Weight (MMW) and Low Molecular Weight (LMW). In still other aspects, the polyethylene may be an ultra-low density ethylene elastomer.

In some aspects, the first polyolefin may include a LDPE/silane copolymer or blend. In other aspects, the first polyolefin may be polyethylene that can be produced using any catalyst known in the art including, but not limited to, chromium catalysts, Ziegler-Natta catalysts, metallocene catalysts or post-metallocene catalysts.

In some aspects, the first polyolefin may have a molecular weight distribution $M_w/M_n$ of less than or equal to about 5, less than or equal to about 4, from about 1 to about 3.5, or from about 1 to about 3.

The first polyolefin may be present in an amount of from greater than 0 to about 100 wt % of the composition. In some embodiments, the amount of polyolefin elastomer is from about 30 to about 70 wt %. In some aspects, the first polyolefin fed to an extruder can include from about 50 wt % to about 80 wt % of an ethylene/α-olefin copolymer, including from about 60 wt % to about 75 wt % and from about 62 wt % to about 72 wt %.

The first polyolefin may have a melt viscosity in the range of from about 2,000 cP to about 50,000 cP as measured using a Brookfield viscometer at a temperature of about 177° C. In some embodiments, the melt viscosity is from about 4,000 cP to about 40,000 cP, including from about 5,000 cP to about 30,000 cP and from about 6,000 cP to about 18,000 cP.

The first polyolefin may have a melt index (T2), measured at 190° C. under a 2.16 kg load, of from about 20.0 g/10 min to about 3,500 g/10 min, including from about 250 g/10 min to about 1,900 g/10 min and from about 300 g/10 min to about 1,500 g/10 min. In some aspects, the first polyolefin has a fractional melt index of from 0.5 g/10 min to about 3,500 g/10 min.

In some aspects, the density of the first polyolefin is less than 0.90 g/cm$^3$, less than about 0.89 g/cm$^3$, less than about 0.88 g/cm$^3$, less than about 0.87 g/cm$^3$, less than about 0.86 g/cm$^3$, less than about 0.85 g/cm$^3$, less than about 0.84 g/cm$^3$, less than about 0.83 g/cm$^3$, less than about 0.82 g/cm$^3$, less than about 0.81 g/cm$^3$, or less than about 0.80 g/cm$^3$. In other aspects, the density of the first polyolefin may be from about 0.85 g/cm$^3$ to about 0.89 g/cm$^3$, from about 0.85 g/cm$^3$ to about 0.88 g/cm$^3$, from about 0.84 g/cm$^3$ to about 0.88 g/cm$^3$, or from about 0.83 g/cm$^3$ to about 0.87 g/cm$^3$. In still other aspects, the density is at about 0.84 g/cm$^3$, about 0.85 g/cm$^3$, about 0.86 g/cm$^3$, about 0.87 g/cm$^3$, about 0.88 g/cm$^3$, or about 0.89 g/cm$^3$.

The percent crystallinity of the first polyolefin may be less than about 60%, less than about 50%, less than about 40%, less than about 35%, less than about 30%, less than about 25%, or less than about 20%. The percent crystallinity may be at least about 10%. In some aspects, the crystallinity is in the range of from about 2% to about 60%.

Second Polyolefin

The second polyolefin can be a polyolefin elastomer including an olefin block copolymer, an ethylene/α-olefin copolymer, a propylene/α-olefin copolymer, EPDM, EPM, or a mixture of two or more of any of these materials. Exemplary block copolymers include those sold under the trade names INFUSE™ (the Dow Chemical Company) and SEPTON™ V-SERIES (Kuraray Co., LTD.). Exemplary ethylene/α-olefin copolymers include those sold under the trade names TAFMER™ (e.g., TAFMER DF710) (Mitsui Chemicals, Inc.) and ENGAGE™ (e.g., ENGAGE 8150) (the Dow Chemical Company). Exemplary propylene/α-olefin copolymers include those sold under the trade name TAFMER™ XM grades (Mitsui Chemical Company) and VISTAMAXX™ (e.g., VISTAMAXX 6102) (Exxon Mobil Chemical Company). The EPDM may have a diene content of from about 0.5 to about 10 wt %. The EPM may have an ethylene content of 45 wt % to 75 wt %.

In some aspects, the second polyolefin is selected from the group consisting of: an olefin homopolymer, a blend of homopolymers, a copolymer made using two or more olefins, a blend of copolymers each made using two or more olefins, and a blend of olefin homopolymers with copolymers made using two or more olefins. The olefin may be selected from ethylene, propylene, 1-butene, 1-propene, 1-hexene, 1-octene, and other higher 1-olefin. The first polyolefin may be synthesized using many different processes (e.g., using gas phase and solution based using metallocene catalysis and Ziegler-Natta catalysis) and optionally using a catalyst suitable for polymerizing ethylene and/or α-olefins. In some aspects, a metallocene catalyst may be used to produce low density ethylene/α-olefin polymers.

In some aspects, the second polyolefin may include a polypropylene homopolymer, a polypropylene copolymer, a polyethylene-co-propylene copolymer, or a mixture thereof. Suitable polypropylenes include but are not limited to polypropylene obtained by homopolymerization of propylene or copolymerization of propylene and an alpha-olefin comonomer. In some aspects, the second polyolefin may have a higher molecular weight and/or a higher density than the first polyolefin.

In some embodiments, the second polyolefin may have a molecular weight distribution $M_w/M_n$ of less than or equal to about 5, less than or equal to about 4, from about 1 to about 3.5, or from about 1 to about 3.

The second polyolefin may be present in an amount of from greater than 0 wt % to about 100 wt % of the composition. In some embodiments, the amount of polyolefin elastomer is from about 30 wt % to about 70 wt %. In some embodiments, the second polyolefin fed to the extruder can include from about 10 wt % to about 50 wt % polypropylene, from about 20 wt % to about 40 wt % polypropylene, or from about 25 wt % to about 35 wt % polypropylene. The polypropylene may be a homopolymer or a copolymer.

The second polyolefin may have a melt viscosity in the range of from about 2,000 cP to about 50,000 cP as measured using a Brookfield viscometer at a temperature of about 177° C. In some embodiments, the melt viscosity is from about 4,000 cP to about 40,000 cP, including from about 5,000 cP to about 30,000 cP and from about 6,000 cP to about 18,000 cP.

The second polyolefin may have a melt index (T2), measured at 190° C. under a 2.16 kg load, of from about 20.0 g/10 min to about 3,500 g/10 min, including from about 250 g/10 min to about 1,900 g/10 min and from about 300 g/10 min to about 1,500 g/10 min. In some embodiments, the polyolefin has a fractional melt index of from 0.5 g/10 min to about 3,500 g/10 min.

In some aspects, the density of the second polyolefin is less than 0.90 g/cm$^3$, less than about 0.89 g/cm$^3$, less than about 0.88 g/cm$^3$, less than about 0.87 g/cm$^3$, less than about 0.86 g/cm$^3$, less than about 0.85 g/cm$^3$, less than about 0.84 g/cm$^3$, less than about 0.83 g/cm$^3$, less than about 0.82 g/cm$^3$, less than about 0.81 g/cm$^3$, or less than about 0.80 g/cm$^3$. In other aspects, the density of the first polyolefin may be from about 0.85 g/cm$^3$ to about 0.89 g/cm$^3$, from about 0.85 g/cm$^3$ to about 0.88 g/cm$^3$, from about 0.84 g/cm$^3$ to about 0.88 g/cm$^3$, or from about 0.83 g/cm$^3$ to about 0.87 g/cm$^3$. In still other aspects, the density is at about 0.84 g/cm$^3$, about 0.85 g/cm$^3$, about 0.86 g/cm$^3$, about 0.87 g/cm$^3$, about 0.88 g/cm$^3$, or about 0.89 g/cm$^3$.

The percent crystallinity of the second polyolefin may be less than about 60%, less than about 50%, less than about 40%, less than about 35%, less than about 30%, less than about 25%, or less than about 20%. The percent crystallinity may be at least about 10%. In some aspects, the crystallinity is in the range of from about 2% to about 60%.

As noted, the silane-crosslinked polyolefin elastomer or blend, e.g., as employed in combined sealing members 12 (see FIGS. 1, 2, 4 and 5), includes both the first polyolefin and the second polyolefin. The second polyolefin is generally used to modify the hardness and/or processability of the first polyolefin having a density less than 0.90 g/cm$^3$. In some aspects, more than just the first and second polyolefins may be used to form the silane-crosslinked polyolefin elastomer or blend. For example, in some aspects, one, two, three, four, or more different polyolefins having a density less than 0.90 g/cm$^3$, less than 0.89 g/cm$^3$, less than 0.88 g/cm$^3$, less than 0.87 g/cm$^3$, less than 0.86 g/cm$^3$, or less than 0.85 g/cm$^3$ may be substituted and/or used for the first polyolefin. In some aspects, one, two, three, four, or more different polyolefins, polyethylene-co-propylene copolymers may be substituted and/or used for the second polyolefin.

The blend of the first polyolefin having a density less than 0.90 g/cm$^3$ and the second polyolefin having a crystallinity less than 40% is used because the subsequent silane grafting and crosslinking of these first and second polyolefin materials together are what form the core resin structure in the final silane-crosslinked polyolefin elastomer. Although additional polyolefins may be added to the blend of the silane-grafted, silane-crosslinkable, and/or silane-crosslinked polyolefin elastomer as fillers to improve and/or modify the Young's modulus as desired for the final product, any polyolefins added to the blend having a crystallinity equal to or greater than 40% are not chemically or covalently incorporated into the crosslinked structure of the final silane-crosslinked polyolefin elastomer.

In some aspects, the first and second polyolefins may further include one or more TPVs and/or EPDM with or without silane graft moieties where the TPV and/or EPDM polymers are present in an amount of up to 20 wt % of the silane-crosslinked polyolefin elastomer/blend.

Grafting Initiator

A grafting initiator (also referred to as "a radical initiator" in the disclosure) can be utilized in the grafting process of at least the first and second polyolefins by reacting with the respective polyolefins to form a reactive species that can react and/or couple with the silane crosslinker molecule. The grafting initiator can include halogen molecules, azo compounds (e.g., azobisisobutyl), carboxylic peroxyacids, peroxyesters, peroxyketals, and peroxides (e.g., alkyl hydroperoxides, dialkyl peroxides, and diacyl peroxides). In some embodiments, the grafting initiator is an organic peroxide selected from di-t-butyl peroxide, t-butyl cumyl peroxide, dicumyl peroxide, 2,5-dimethyl-2,5-di(t-butyl-peroxy) hexyne-3,1,3-bis(t-butyl-peroxy-isopropyl)benzene, n-butyl-4,4-bis(t-butyl-peroxy)valerate, benzoyl peroxide, t-butylperoxybenzoate, t-butylperoxy isopropyl carbonate, and t-butylperbenzoate, as well as bis(2-methylbenzoyl) peroxide, bis(4-methylbenzoyl)peroxide, t-butyl peroctoate, cumene hydroperoxide, methyl ethyl ketone peroxide, lauryl peroxide, tert-butyl peracetate, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylpexoxy)-1,4-diisopropylbenzene, 2,5-bis(t-butylperoxy)-2,5-dimethylhexane, and 2,5-bis(t-butylperoxy)-2,5-dimethyl-3-hexyne and 2,4-dichlorobenzoyl peroxide. Exemplary peroxides include those sold under the tradename LUPEROX™ (available from Arkema, Inc.).

In some aspects, the grafting initiator is present in an amount of from greater than 0 wt % to about 2 wt % of the composition, including from about 0.15 wt % to about 1.2 wt % of the composition. The amount of initiator and silane employed may affect the final structure of the silane grafted polymer (e.g., the degree of grafting in the grafted polymer and the degree of crosslinking in the cured polymer). In some aspects, the reactive composition contains at least 100 ppm of initiator, or at least 300 ppm of initiator. The initiator may be present in an amount from 300 ppm to 1500 ppm, or from 300 ppm to 2000 ppm. The silane:initiator weight ratio may be from about 20:1 to 400:1, including from about 30:1 to about 400:1, from about 48:1 to about 350:1, and from about 55:1 to about 333:1.

The grafting reaction can be performed under conditions that optimize grafts onto the interpolymer backbone while minimizing side reactions (e.g., the homopolymerization of the grafting agent). The grafting reaction may be performed in a melt, in solution, in a solid-state, and/or in a swollen-state. The silanation may be performed in a wide-variety of equipment (e.g., twin screw extruders, single screw extruders, Brabenders, internal mixers such as Banbury mixers, and batch reactors). In some embodiments, the polyolefin, silane, and initiator are mixed in the first stage of an extruder. The melt temperature (i.e., the temperature at which the polymer starts melting and starts to flow) may be from about 120° C. to about 260° C., including from about 130° C. to about 250° C.

Silane Crosslinker

A silane crosslinker can be used to covalently graft silane moieties onto the first and second polyolefins and the silane crosslinker may include alkoxysilanes, silazanes, siloxanes, or a combination thereof. The grafting and/or coupling of the various potential silane crosslinkers or silane crosslinker molecules is facilitated by the reactive species formed by the grafting initiator reacting with the respective silane crosslinker.

In some aspects, the silane crosslinker is a silazane where the silazane may include, for example, hexamethyldisilazane (HMDS) or Bis(trimethylsilyl)amine. In some aspects, the silane crosslinker is a siloxane where the siloxane may include, for example, polydimethylsiloxane (PDMS) and octamethylcyclotetrasiloxane.

In some aspects, the silane crosslinker is an alkoxysilane. As used herein, the term "alkoxysilane" refers to a compound that comprises a silicon atom, at least one alkoxy group and at least one other organic group, wherein the silicon atom is bonded with the organic group by a covalent bond. Preferably, the alkoxysilane is selected from alkylsilanes; acryl-based silanes; vinyl-based silanes; aromatic silanes; epoxy-based silanes; amino-based silanes and amines that possess —NH$_2$, —NHCH$_3$ or —N(CH$_3$)$_2$; ureide-based silanes; mercapto-based silanes; and alkoxysilanes which have a hydroxyl group (i.e., —OH). An acryl-based silane may be selected from the group comprising beta-acryloxyethyl trimethoxysilane; beta-acryloxy propyl trimethoxysilane; gamma-acryloxyethyl trimethoxysilane; gamma-acryloxypropyl trimethoxysilane; beta-acryloxyethyl triethoxysilane; beta-acryloxypropyl triethoxysilane; gamma-acryloxyethyl triethoxysilane; gamma-acryloxypropyl triethoxysilane; beta-methacryloxyethyl trimethoxysilane; beta-methacryloxypropyl trimethoxysilane; gamma-methacryloxyethyl trimethoxysilane; gamma-methacryloxypropyl trimethoxysilane; beta-methacryloxyethyl triethoxysilane; beta-methacryloxypropyl triethoxysilane; gamma-methacryloxyethyl triethoxysilane; gamma-methacryloxypropyl triethoxysilane; 3-methacryloxypropylmethyl diethoxysilane. A vinyl-based silane may be selected from the group comprising vinyl trimethoxysilane; vinyl triethoxysilane; p-styryl trimethoxysilane; methylvinyldimethoxysilane; vinyldimethylmethoxysilane; divinyldimethoxysilane; vinyltris(2-methoxyethoxy)silane; and vinylbenzylethylenediaminopropyltrimethoxysilane. An aromatic silane may be selected from phenyltrimethoxysilane and phenyltriethoxysilane. An epoxy-based silane may be selected from the group comprising 3-glycydoxypropyl trimethoxysilane; 3-glycydoxypropylmethyl diethoxysilane; 3-glycydoxypropyl triethoxysilane; 2-(3,4-epoxycyclohexyl)ethyl trimethoxysilane, and glycidyloxypropylmethyldimethoxysilane. An amino-based silane may be selected from the group comprising 3-aminopropyl triethoxysilane; 3-aminopropyl trimethoxysilane; 3-aminopropyldimethyl ethoxysilane; 3-aminopropylmethyldiethoxysilane; 4-aminobutyltriethoxysilane; 3-aminopropyldiisopropyl ethoxysilane; 1-amino-2-(dimethylethoxysilyl)propane; (aminoethylamino)-3-isobutyldimethyl methoxysilane; N-(2-aminoethyl)-3-aminoisobutylmethyl dimethoxysilane; (aminoethylaminomethyl)phenetyl trimethoxysilane; N-(2-aminoethyl)-3-aminopropylmethyl dimethoxysilane; N-(2-aminoethyl)-3-aminopropyl trimethoxysilane; N-(2-aminoethyl)-3-aminopropyl triethoxysilane; N-(6-aminohexyl) aminomethyl trimethoxysilane; N-(6-aminohexyl) aminomethyl trimethoxysilane; N-(6-aminohexyl) aminopropyl trimethoxysilane; N-(2-aminoethyl)-1,1-aminoundecyl trimethoxysilane; 1,1-aminoundecyl triethoxysilane; 3-(m-aminophenoxy)propyl trimethoxysilane; m-aminophenyl trimethoxysilane; p-aminophenyl trimethoxysilane; (3-trimethoxysilylpropyl)diethylenetriamine; N-methylaminopropylmethyl dimethoxysilane; N-methylaminopropyl trimethoxysilane; dimethylaminomethyl ethoxysilane; (N,N-dimethylaminopropyl)trimethoxysilane; (N-acetylglycysil)-3-aminopropyl trimethoxysilane, N-phenyl-3-aminopropyltrimethoxysilane, N-phenyl-3-aminopropyltriethoxysilane, phenylaminopropyltrimethoxysilane, aminoethylaminopropyltrimethoxysilane, and aminoethylaminopropylmethyldimethoxysilane. A ureide-based silane may be 3-ureidepropyl triethoxysilane. A mercapto-based silane may be selected from the group comprising 3-mercaptopropylmethyl dimethoxysilane, 3-mercaptopropyl trimethoxysilane, and 3-mercaptopropyl triethoxysilane. An alkoxysilane having a hydroxyl group may be selected from the group comprising hydroxymethyl triethoxysilane; N-(hydroxyethyl)-N-methylaminopropyl trimethoxysilane; bis(2-hydroxyethyl)-3-aminopropyl triethoxysilane; N-(3-triethoxysilylpropyl)-4-hydroxy butylamide; 1,1-(triethoxysilyl)undecanol; triethoxysilyl undecanol; ethylene glycol acetal; and N-(3-ethoxysilylpropyl)gluconamide.

In some aspects, the alkylsilane may be expressed with a general formula: $R_nSi(OR')_{4-n}$ wherein: n is 1, 2 or 3; R is a $C_{1-20}$ alkyl or a $C_{2-20}$ alkenyl; and R' is an $C_{1-20}$ alkyl. The term "alkyl" by itself or as part of another substituent, refers to a straight, branched or cyclic saturated hydrocarbon group joined by single carbon-carbon bonds having 1 to 20 carbon atoms, for example 1 to 10 carbon atoms, for example 1 to 8 carbon atoms, preferably 1 to 6 carbon atoms. When a subscript is used herein following a carbon atom, the subscript refers to the number of carbon atoms that the named group may contain. Thus, for example, $C_{1-6}$ alkyl means an alkyl of one to six carbon atoms. Examples of alkyl groups are methyl, ethyl, propyl, isopropyl, butyl, isobutyl, sec-butyl, f-butyl, 2-methylbutyl, pentyl, iso-amyl and its isomers, hexyl and its isomers, heptyl and its isomers, octyl and its isomer, decyl and its isomer, dodecyl and its isomers. The term "$C_{2-20}$alkenyl" by itself or as part of another substituent, refers to an unsaturated hydrocarbyl group, which may be linear, or branched, comprising one or more carbon-carbon double bonds having 2 to 20 carbon atoms. Examples of $C_{2-6}$ alkenyl groups are ethenyl, 2-propenyl, 2-butenyl, 3-butenyl, 2-pentenyl and its isomers, 2-hexenyl and its isomers, 2,4-pentadienyl and the like.

In some aspects, the alkylsilane may be selected from the group comprising methyltrimethoxysilane; methyltriethoxysilane; ethyltrimethoxysilane; ethyltriethoxysilane; propyltrimethoxysilane; propyltriethoxysilane; hexyltrimethoxysilane; hexyltriethoxysilane; octyltrimethoxysilane; octyltriethoxysilane; decyltrimethoxysilane; decyltriethoxysilane; dodecyltrimethoxysilane: dodecyltriethoxysilane; tridecyltrimethoxysilane; dodecyltriethoxysilane; hexadecyltrimethoxysilane; hexadecyltriethoxysilane; octadecyltrimethoxysilane; octadecyltriethoxysilane, trimethylmethoxysilane, methylhydrodimethoxysilane, dimethyldimethoxysilane, diisopropyldimethoxysilane, diisobutyldimethoxysilane, isobutyltrimethoxysilane, n-butyltrimethoxysilane, n-butylmethyldimethoxysilane, phenyltrimethoxysilane, phenyltrimethoxysilane, phenylmethyldimethoxysilane, triphenylsilanol, n-hexyltrimethoxysilane, n-octyltrimethoxysilane, isooctyltrimethoxysilane, decyltrimethoxysilane, hexadecyltrimethoxysilane, cyclohexylmethyldimethoxysilane, cyclohexylethyldimethoxysilane, dicyclopentyldimethoxysilane, tert-butylethyldimethoxysilane, tert-butylpropyldimethoxysilane, dicyclohexyldimethoxysilane, and a combination thereof.

In some aspects, the alkylsilane compound may be selected from triethoxyoctylsilane, trimethoxyoctylsilane, and a combination thereof.

Additional examples of silanes that can be used as silane crosslinkers include, but are not limited to, those of the general formula $CH_2=CR-(COO)_x(C_nH_{2n})_ySiR'_3$, wherein R is a hydrogen atom or methyl group; x is 0 or 1; y is 0 or 1; n is an integer from 1 to 12; each R' can be an organic group and may be independently selected from an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (e.g., alkylamino, arylamino), or a lower alkyl group having 1 to 6 carbon atoms. x and y may both equal 1. In some aspects, no more than one of the three R' groups is an alkyl. In other aspects, not more than two of the three R' groups is an alkyl.

Any silane or mixture of silanes known in the art that can effectively graft to and crosslink an olefin polymer can be used in the practice of the present disclosure. In some aspects, the silane crosslinker can include, but is not limited to, unsaturated silanes which include an ethylenically unsaturated hydrocarbyl group (e.g., a vinyl, allyl, isopropenyl, butenyl, cyclohexenyl or a gamma-(meth)acryloxy allyl group) and a hydrolyzable group (e.g., a hydrocarbyloxy, hydrocarbonyloxy, or hydrocarbylamino group). Non-limiting examples of hydrolyzable groups include, but are not limited to, methoxy, ethoxy, formyloxy, acetoxy, proprionyloxy, and alkyl, or arylamino groups. In other aspects, the silane crosslinkers are unsaturated alkoxy silanes which can be grafted onto the polymer. In still other aspects, additional exemplary silane crosslinkers include vinyltrimethoxysilane, vinyltriethoxysilane, 3-(trimethoxysilyl) propyl methacrylate gamma-(meth)acryloxypropyl trimethoxysilane), and mixtures thereof.

The silane crosslinker may be present in the silane-grafted polyolefin elastomer in an amount of from greater than 0 wt % to about 10 wt %, including from about 0.5 wt % to about 5 wt %. The amount of silane crosslinker may be varied based on the nature of the olefin polymer, the silane itself, the processing conditions, the grafting efficiency, the application, and other factors. The amount of silane crosslinker may be at least 2 wt %, including at least 4 wt % or at least 5 wt %, based on the weight of the reactive composition. In other aspects, the amount of silane crosslinker may be at least 10 wt %, based on the weight of the reactive composition. In still other aspects, the silane crosslinker content is at least 1% based on the weight of the reactive composition. In some embodiments, the silane crosslinker fed to the extruder may include from about 0.5 wt % to about 10 wt % of silane monomer, from about 1 wt % to about 5 wt % silane monomer, or from about 2 wt % to about 4 wt % silane monomer.

Condensation Catalyst

A condensation catalyst can facilitate both the hydrolysis and subsequent condensation of the silane grafts on the silane-grafted polyolefin elastomer to form crosslinks. In some aspects, the crosslinking can be aided by the use of an electron beam radiation. In some aspects, the condensation catalyst can include, for example, organic bases, carboxylic acids, and organometallic compounds (e.g., organic titanates and complexes or carboxylates of lead, cobalt, iron, nickel, zinc, and tin). In other aspects, the condensation catalyst can include fatty acids and metal complex compounds such as metal carboxylates; aluminum triacetyl acetonate, iron triacetyl acetonate, manganese tetraacetyl acetonate, nickel tetraacetyl acetonate, chromium hexaacetyl acetonate, titanium tetraacetyl acetonate and cobalt tetraacetyl acetonate; metal alkoxides such as aluminum ethoxide, aluminum propoxide, aluminum butoxide, titanium ethoxide, titanium propoxide and titanium butoxide; metal salt compounds such as sodium acetate, tin octylate, lead octylate, cobalt octylate, zinc octylate, calcium octylate, lead naphthenate, cobalt naphthenate, dibutyltin dioctoate, dibutyltin dilaurate, dibutyltin maleate and dibutyltin di(2-ethylhexanoate); acidic compounds such as formic acid, acetic acid, propionic acid, p-toluenesulfonic acid, trichloroacetic acid, phosphoric acid, monoalkylphosphoric acid, dialkylphosphoric acid, phosphate ester of p-hydroxyethyl (meth)acrylate, monoalkylphosphorous acid and dialkylphosphorous acid; acids such as p-toluenesulfonic acid, phthalic anhydride, benzoic acid, benzenesulfonic acid, dodecylbenzenesulfonic acid, formic acid, acetic acid, itaconic acid, oxalic acid and maleic acid, ammonium salts, lower amine salts or polyvalent metal salts of these acids, sodium hydroxide, lithium chloride; organometal compounds such as diethyl zinc and tetra(n-butoxy)titanium; and amines such as dicyclohexylamine, triethylamine, N,N-dimethylbenzylamine, N,N,N',N'-tetramethyl-1,3-butanediamine, diethanolamine, triethanolamine and cyclohexylethylamine. In still other aspects, the condensation catalyst can include ibutyltindilaurate, dioctyltinmaleate, dibutyltindiacetate, dibutyltindioctoate, stannous acetate, stannous octoate, lead naphthenate, zinc caprylate, and cobalt naphthenate. Depending on the desired final material properties of the silane-crosslinked polyolefin elastomer or blend, a single condensation catalyst or a mixture of condensation catalysts may be utilized. The condensation catalyst(s) may be present in an amount of from about 0.01 wt % to about 1.0 wt5, including from about 0.25 wt % to about 8 wt %, based on the total weight of the silane-grafted polyolefin elastomer/blend composition.

In some aspects, a crosslinking system can include and use one or all of a combination of radiation, heat, moisture, and additional condensation catalyst. In some aspects, the condensation catalyst may be present in an amount of from 0.25 wt % to 8 wt %. In other aspects, the condensation catalyst may be included in an amount of from about 1 wt % to about 10 wt %, or from about 2 wt % to about 5 wt %.

Foaming Agent

According to some embodiments, the foaming agent can be a chemical foaming agent (e.g., organic or inorganic foaming agent) and/or a physical foaming (e.g., gases and volatile low weight molecules) that is added to the silane-grafted polyolefin elastomer and condensation catalyst blend during the extrusion and/or molding process to produce a foamed (sponge or dynamic) silane-crosslinked polyolefin elastomer.

In some aspects, an endothermic blowing (foaming) agent may be used that can include, for example, sodium bicarbonate and/or citric acid and its salts or derivatives. Exemplary citric acid foaming agents include those sold under the trade name HYDROCEROL® that includes a mixture of zinc stearate, polyethylene glycol, and a citric acid or citric acid derivative. The desired decomposition temperature for the endothermic blowing (foaming) agent may be from about 160° C. to about 200° C., or about 175° C., about 180° C., about 185° C., about 190° C., or about 195° C.

Organic foaming agents that may be used can include, for example, azo compounds, such as azodicarbonamide (ADCA), barium azodicarboxylate, azobisisobutyronitrile (AIBN), azocyclohexylnitrile, and azodiaminobenzene, N-nitroso compounds, such as N,N'-dinitrosopentamethylenetetramine (DPT), N,N'-dimethyl-N,N'-dinitrosoterephthalamide, and trinitrosotrimethyltriamine, hydrazide compounds, such as 4,4'-oxybis(benzenesulfonylhydrazide) (OBSH), paratoluene sulfonylhydrazide, diphenylsulfone-3,3'-disulfonylhydrazide, 2,4-toluenedisulfonylhydrazide, p,p-bis(benzenesulfonylhydrazide)ether, benzene-1,3-disulfonylhydrazide, and allylbis(sulfonylhydrazide), semicarbazide compounds, such as p-toluilenesulfonylsemicarbazide, and 4,4'-oxybis(benzenesulfonylsemicarbazide), alkane fluorides, such as trichloromonofluoromethane, and dichloromonofluoromethane, and triazole compounds, such as 5-morpholyl-1,2,3,4-thiatriazole, and other known organic foaming agents. Preferably, azo compounds and N-nitroso compounds are used. Further preferably, azodicarbonamide (ADCA) and N,N'-dinitrosopentamethylenetetramine (DPT) are used. The organic foaming agents listed above may be used alone or in any combination of two or more.

The decomposition temperature and amount of organic foaming agent used can have important consequences on the density and material properties of the foamed silane-crosslinked polyolefin elastomer. In some aspects, the organic foaming agent has a decomposition temperature of from about 150° C. to about 210° C. The organic foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based on the total weight of the polymer blend. If the organic foaming agent has a decomposition temperature lower than 150° C., early foaming may occur during compounding. Meanwhile, if the organic foaming agent has a decomposition temperature higher than 210° C., it may take longer, e.g., greater than 15 minutes, to mold the foam, resulting in low productivity. Additional foaming agents may include any compound whose decomposition temperature is within the range defined above.

The inorganic foaming agents that may be used include, for example, hydrogen carbonate, such as sodium hydrogen carbonate, and ammonium hydrogen carbonate, carbonate, such as sodium carbonate, and ammonium carbonate, nitrite, such as sodium nitrite, and ammonium nitrite, borohydride, such as sodium borohydride, and other known inorganic foaming agents, such as azides. In some aspect, hydrogen carbonate may be used. In other aspects, sodium hydrogen carbonate may be used. The inorganic foaming agents listed above may be used alone or in any combination of two or more. The inorganic foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based on the total weight of the polymer blend.

Physical blowing agents that may be used include, for example, supercritical carbon dioxide, supercritical nitrogen, butane, pentane, isopentane, cyclopentane. In some aspects, various minerals or inorganic compounds (e.g., talc) may be used as a nucleating agent for the supercritical fluid. The physical foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based the total weight of the polymer blend.

Blowing Agent

According to some embodiments, the foaming agent can be a chemical foaming agent (e.g., organic or inorganic foaming agent) and/or a physical foaming (e.g., gases and volatile low weight molecules) that is added to the silane-grafted polyolefin elastomer and condensation catalyst blend during the extrusion and/or molding process to produce a foamed (micro-dense) silane-crosslinked polyolefin elastomer.

In some aspects, the foaming agent may a physical foaming agent including a microencapsulated foaming agent, otherwise referred to in the art as a microencapsulated blowing agent (MEBA). MEBAs include a family of physical foaming agents that are defined as a thermo expandable microsphere which is formed by the encapsulation of a volatile hydrocarbon into an acrylic copolymer shell. When the acrylic copolymer shell expands, the volatile hydrocarbon (e.g., butane) creates a foam in the silane-crosslinkable polyolefin elastomer and reduces its weight. In some aspects, the MEBAs have an average particle size of from about 20 μm to about 30 μm. Exemplary MEBAs include those sold under the trade name MATSUMOTO F-AC170D. In some aspects, MEBA's may be used in combination with other foaming agents including organic and inorganic foaming agents.

Organic foaming agents that may be used can include, for example, azo compounds, such as azodicarbonamide (ADCA), barium azodicarboxylate, azobisisobutyronitrile (AIBN), azocyclohexylnitrile, and azodiaminobenzene, N-nitroso compounds, such as N,N'-dinitrosopentamethylenetetramine (DPT), N,N'-dimethyl-N,N'-dinitrosoterephthalamide, and trinitrosotrimethyltriamine, hydrazide compounds, such as 4,4'-oxybis(benzenesulfonylhydrazide) (OBSH), paratoluene sulfonylhydrazide, diphenylsulfone-3,3'-disulfonylhydrazide, 2,4-toluenedisulfonylhydrazide, p,p-bis(benzenesulfonylhydrazide)ether, benzene-1,3-disulfonylhydrazide, and allylbis(sulfonylhydrazide), semicarbazide compounds, such as p-toluilenesulfonylsemicarbazide, and 4,4'-oxybis(benzenesulfonylsemicarbazide), alkane fluorides, such as trichloromonofluoromethane, and dichloromonofluoromethane, and triazole compounds, such as 5-morpholyl-1,2,3,4-thiatriazole, and other known organic foaming agents. Preferably, azo compounds and N-nitroso compounds are used. Further preferably, azodicarbonamide (ADCA) and N,N'-dinitrosopentamethylenetetramine (DPT) are used. The organic foaming agents listed above may be used alone or in any combination of two or more.

The decomposition temperature and amount of organic foaming agent used can have important consequences on the density and material properties of the foamed silane-crosslinker polyolefin elastomer. In some aspects, the organic foaming agent has a decomposition temperature of from about 150° C. to about 210° C. The organic foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based on the total weight of the polymer blend. If the organic foaming agent has a decomposition temperature lower than 150° C., early foaming may occur during compounding. Meanwhile, if the organic foaming agent has a decomposition temperature higher than 210° C., it may take longer, e.g., greater than 15 minutes, to mold the foam, resulting in low productivity. Additional foaming agents may include any compound whose decomposition temperature is within the range defined above.

The inorganic foaming agents that may be used include, for example, hydrogen carbonate, such as sodium hydrogen carbonate, and ammonium hydrogen carbonate, carbonate, such as sodium carbonate, and ammonium carbonate, nitrite, such as sodium nitrite, and ammonium nitrite, borohydride, such as sodium borohydride, and other known inorganic foaming agents, such as azides. In some aspect, hydrogen carbonate may be used. In other aspects, sodium hydrogen carbonate may be used. The inorganic foaming agents listed above may be used alone or in any combination of two or more. The inorganic foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based on the total weight of the polymer blend.

Physical blowing agents that may be used include, for example, supercritical carbon dioxide, supercritical nitrogen, butane, pentane, isopentane, cyclopentane. The physical foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based the total weight of the polymer blend.

Optional Additional Components

The silane-crosslinked polyolefin elastomer may optionally include one or more fillers. The filler(s) may be extruded with the silane-grafted polyolefin and in some aspects may include additional polyolefins having a crystallinity greater than 20%, greater than 30%, greater than 40%, or greater than 50%. In some aspects, the filler(s) may include metal oxides, metal hydroxides, metal carbonates, metal sulfates, metal silicates, clays, talcs, carbon black, and silicas. Depending on the application and/or desired properties, these materials may be fumed or calcined.

With further regard to the filler(s), the metal of the metal oxide, metal hydroxide, metal carbonate, metal sulfate, or metal silicate may be selected from alkali metals (e.g., lithium, sodium, potassium, rubidium, caesium, and francium); alkaline earth metals (e.g., beryllium, magnesium, calcium, strontium, barium, and radium); transition metals (e.g., zinc, molybdenum, cadmium, scandium, titanium, vanadium, chromium, manganese, iron, cobalt, nickel, copper, yttrium, zirconium, niobium, technetium, ruthenium, rhodium, palladium, silver, hafnium, taltalum, tungsten, rhenium, osmium, indium, platinum, gold, mercury, rutherfordium, dubnium, seaborgium, bohrium, hassium, and copernicium); post-transition metals (e.g., aluminum, gallium, indium, tin, thallium, lead, bismuth, and polonium); lanthanides (e.g., lanthanum, cerium, praseodymium, neodymium, promethium, samarium, europium, gadolinium, terbium, dysprosium, holmium, erbium, thulium, ytterbium, and lutetium); actinides (e.g., actinium, thorium, protactinium, uranium, *neptunium*, plutonium, americium, curium, berkelium, californium, einsteinium, fermium, mendelevium, nobelium, and lawrencium); germanium; arsenic; antimony; and astatine.

The filler(s) of the silane-crosslinked polyolefin elastomer or blend may be present in an amount of from greater than 0 wt % to about 50 wt %, including from about 1 wt % to about 20 wt % and from about 3 wt % to about 10 wt %.

The silane-crosslinked polyolefin elastomer and/or the respective articles formed (e.g., combined sealing members 12) may also include waxes (e.g., paraffin waxes, microcrystalline waxes, HDPE waxes, LDPE waxes, thermally degraded waxes, byproduct polyethylene waxes, optionally oxidized Fischer-Tropsch waxes, and functionalized waxes). In some embodiments, the wax(es) are present in an amount of from about 0 wt % to about 10 wt %.

Tackifying resins (e.g., aliphatic hydrocarbons, aromatic hydrocarbons, modified hydrocarbons, terpens, modified terpenes, hydrogenated terpenes, rosins, rosin derivatives, hydrogenated rosins, and mixtures thereof) may also be included in the silane-crosslinked polyolefin elastomer/ blend. The tackifying resins may have a ring and ball softening point in the range of from 70° C. to about 150° C. and a viscosity of less than about 3,000 cP at 177° C. In some aspects, the tackifying resin(s) are present in an amount of from about 0 wt % to about 10 wt %.

In some aspects, the silane-crosslinked polyolefin elastomer may include one or more oils. Non-limiting types of oils include white mineral oils and naphthenic oils. In some embodiments, the oil(s) are present in an amount of from about 0 wt % to about 10 wt %.

In some aspects, the silane-crosslinked polyolefin elastomer may include one or more filler polyolefins having a crystallinity greater than 20%, greater than 30%, greater than 40%, or greater than 50%. The filler polyolefin may include polypropylene, poly(ethylene-co-propylene), and/or other ethylene/α-olefin copolymers. In some aspects, the use of the filler polyolefin may be present in an amount of from about 5 wt % to about 60 wt %, from about 10 wt % to about 50 wt %, from about 20 wt % to about 40 wt %, or from about 5 wt % to about 20 wt %. The addition of the filler polyolefin may increase the Young's modulus by at least 10%, by at least 25%, or by at least 50% for the final silane-crosslinked polyolefin elastomer.

In some aspects, the silane-crosslinked polyolefin elastomer of the present disclosure may include one or more stabilizers (e.g., antioxidants). The silane-crosslinked polyolefin elastomer may be treated before grafting, after grafting, before crosslinking, and/or after crosslinking. Other additives may also be included. Non-limiting examples of additives include antistatic agents, dyes, pigments, UV light absorbers, nucleating agents, fillers, slip agents, plasticizers, fire retardants, lubricants, processing aides, smoke inhibitors, anti-blocking agents, and viscosity control agents. The antioxidant(s) may be present in an amount of less than 0.5 wt %, including less than 0.2 wt % of the composition.

Method for Making the Silane-Grafted Polyolefin Elastomer

The synthesis/production of the dense, micro-dense and dynamic silane-crosslinked polyolefin elastomers of the disclosure, e.g., as employed in the combined sealing members 12, may be performed by combining the respective components in one extruder using a single-step Monosil process or in two extruders using a two-step Sioplas process which eliminates the need for additional steps of mixing and shipping rubber compounds prior to extrusion.

Figure 7:
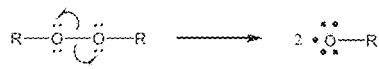
FIG. 7 is a schematic reaction pathway used to produce a silane-crosslinked polyolefin elastomer according to some aspects of the present disclosure.
Figure 7:
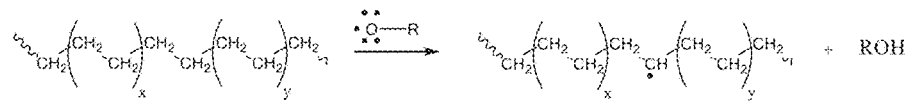
Figure 7:
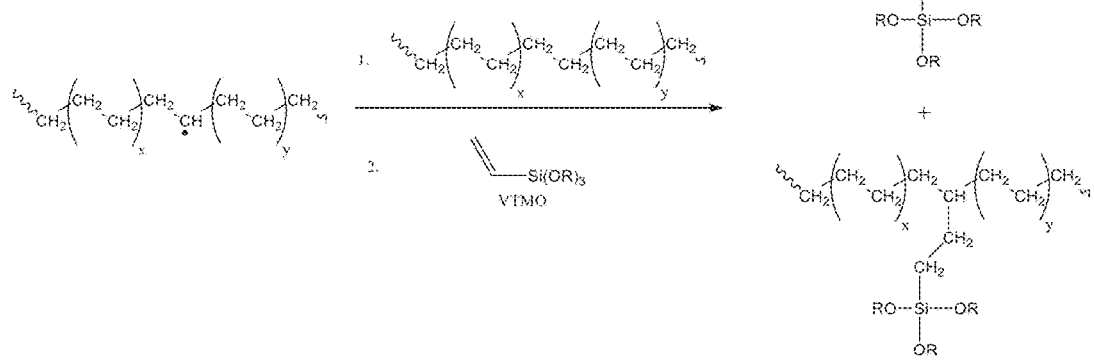
Figure 7:
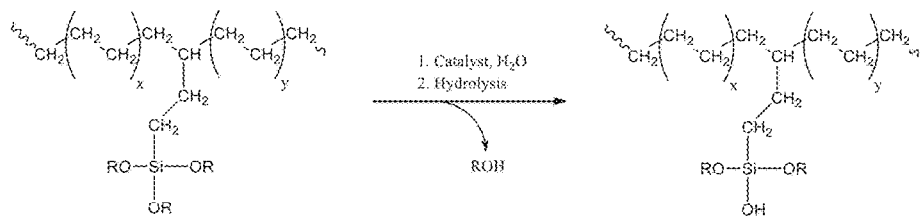
Figure 7:
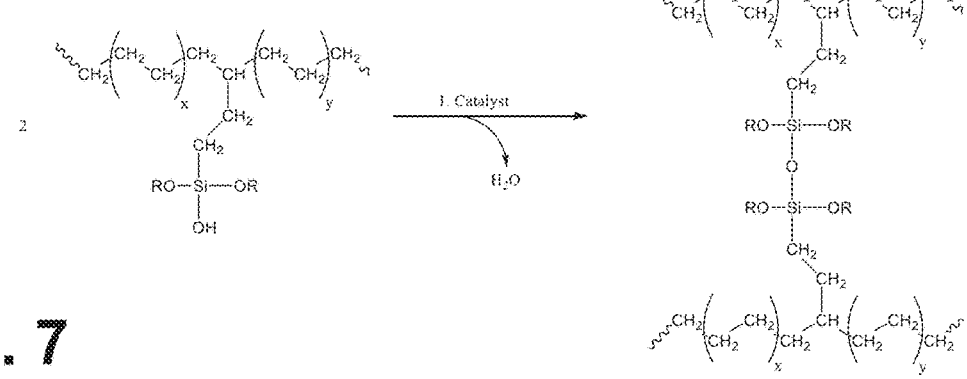

Referring now to FIG. 7, the general chemical process used during both the single-step Monosil process and two-step Sioplas process used to synthesize the silane-cross-linked polyolefin elastomers is provided. The process starts with a grafting step that includes initiation from a grafting initiator followed by propagation and chain transfer with the first and second polyolefins. The grafting initiator, in some aspects a peroxide or azo compound, homolytically cleaves to form two radical initiator fragments that transfer to one of the first and second polyolefins chains through a propagation step. The free radical, now positioned on the first or second polyolefin chain, can then transfer to a silane molecule and/or another polyolefin chain. Once the initiator and free radicals are consumed, the silane grafting reaction for the first and second polyolefins is complete.

Still referring to FIG. 7, once the silane grafting reaction is complete, a mixture of stable first and second silane-grafted polyolefins is produced. A crosslinking catalyst may then be added to the first and second silane-grafted polyolefins to form the silane-grafted polyolefin elastomer. The crosslinking catalyst may first facilitate the hydrolysis of the silyl group grafted onto the polyolefin backbones to form reactive silanol groups. The silanol groups may then react with other silanol groups on other polyolefin molecules to form a crosslinked network of elastomeric polyolefin polymer chains linked together through siloxane linkages. The density of silane crosslinks throughout the silane-grafted polyolefin elastomer can influence the material properties exhibited by the elastomer.

Figure 8:
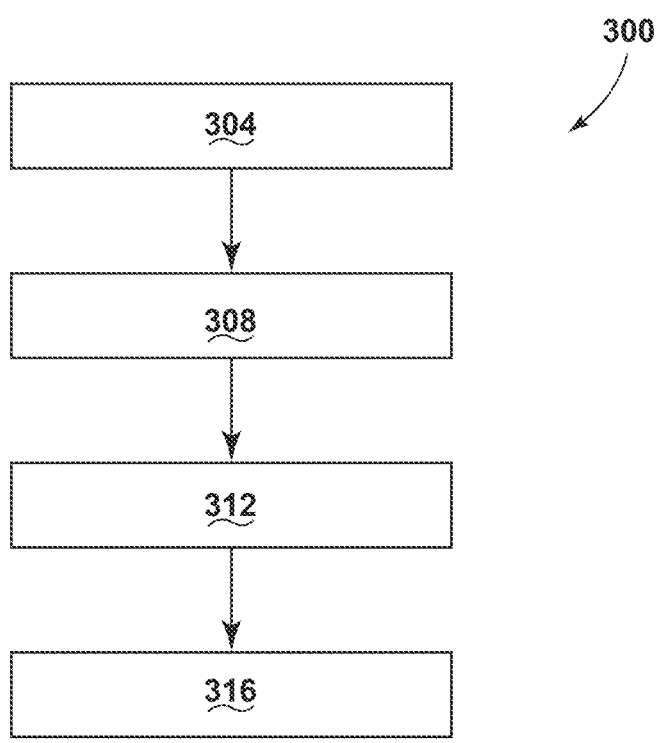
FIG. 8 is a flow diagram of a method for making a static seal with a silane-crosslinked polyolefin elastomer using a two-step Sioplas approach according to some aspects of the present disclosure.
Figure 9A:
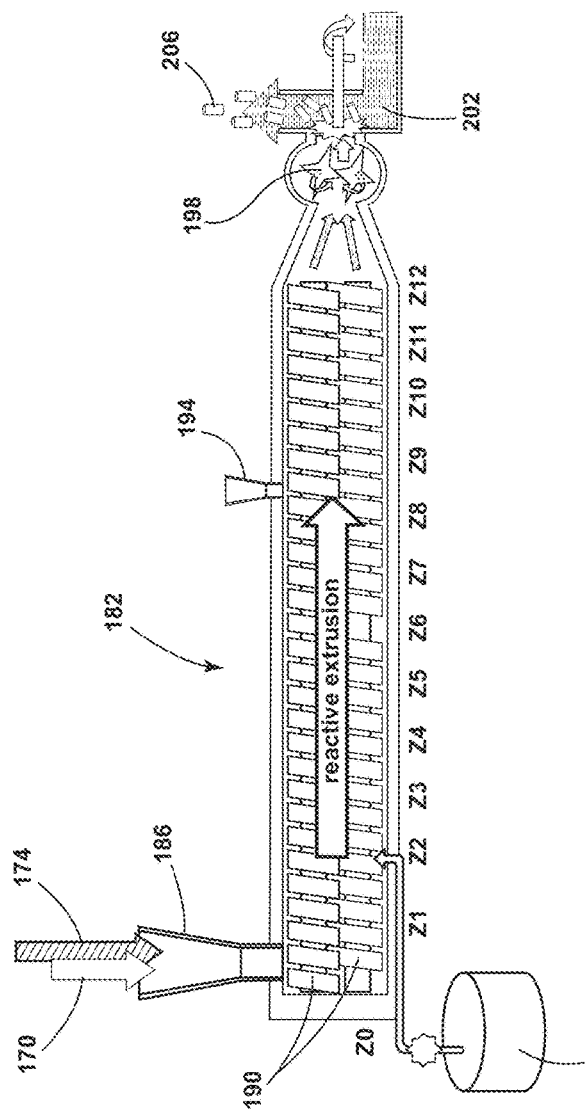
FIG. 9A is a schematic cross-sectional view of a reactive twin-screw extruder according to some aspects of the present disclosure.

Referring now to FIGS. 8 and 9A, a method 300 for making a combined seal, such as the combined sealing member 12, using the two-step Sioplas process is shown. The method 300 may begin with a step 304 that includes extruding (e.g., with a twin screw extruder 182) the first polyolefin 170 having a density less than 0.86 g/cm$^3$, the second polyolefin 174, and a silan cocktail 178 including the silane crosslinker (e.g., vinyltrimethoxy silane, VTMO) and the grafting initiator (e.g. dicumyl peroxide) together to form a silane-grafted polyolefin blend. The first polyolefin 170 and second polyolefin 174 may be added to a reactive twin screw extruder 182 using an addition hopper 186. The silan cocktail 178 may be added to the twin screws 190 further down the extrusion line to help promote better mixing with the first and second polyolefin 170, 174 blend. A forced volatile organic compound (VOC) vacuum 194 may be used on the reactive twin screw extruder 182 to help maintain a desired reaction pressure. The twin screw extruder 182 is considered reactive because the radical initiator and silane crosslinker are reacting with and forming new covalent bonds with both the first and second polyolefins 170, 174. The melted silane-grafted polyolefin blend can exit the reactive twin screw extruder 182 using a gear pump 198 that injects the molten silane-grafted polyolefin blend into a water pelletizer 202 that can form a pelletized silane-grafted polyolefin blend 206. In some aspects, the molten silane-grafted polyolefin blend may be extruded into pellets, pillows, or any other configuration prior to the incorporation of the condensation catalyst 210 (see FIG. 9B) and formation of the final article.

The reactive twin screw extruder 182 can be configured to have a plurality of different temperature zones (e.g., Z0-Z12 as shown in FIG. 9A) that extend for various lengths of the twin screw extruder 182. In some aspects, the respective temperature zones may have temperatures ranging from about room temperature to about 180° C., from about 120° C. to about 170° C., from about 120° C. to about 160° C., from about 120° C. to about 150° C., from about 120° C. to about 140° C., from about 120° C. to about 130° C., from about 130° C. to about 170° C., from about 130° C. to about 160° C., from about 130° C. to about 150° C., from about 130° C. to about 140° C., from about 140° C. to about 170° C., from about 140° C. to about 160° C., from about 140° C. to about 150° C., from about 150° C. to about 170° C., and from about 150° C. to about 160° C. In some aspects, Z0 may have a temperature from about 60° C. to about 110° C. or no cooling; Z1 may have a temperature from about 120° C. to about 130° C.; Z2 may have a temperature from about 140° C. to about 150° C.; Z3 may have a temperature from about 150° C. to about 160° C.; Z4 may have a temperature from about 150° C. to about 160° C.; Z5 may have a temperature from about 150° C. to about 160° C.; Z6 may have a temperature from about 150° C. to about 160° C.; and Z7-Z12 may have a temperature from about 150° C. to about 160° C.

In some aspects, the number average molecular weight of the silane-grafted polyolefin elastomers may be in the range of from about 4,000 g/mol to about 30,000 g/mol, including from about 5,000 g/mol to about 25,000 g/mol and from about 6,000 g/mol to about 14,000 g/mol. The weight average molecular weight of the grafted polymers may be from about 8,000 g/mol to about 60,000 g/mol, including from about 10,000 g/mol to about 30,000 g/mol.

Figure 9B:
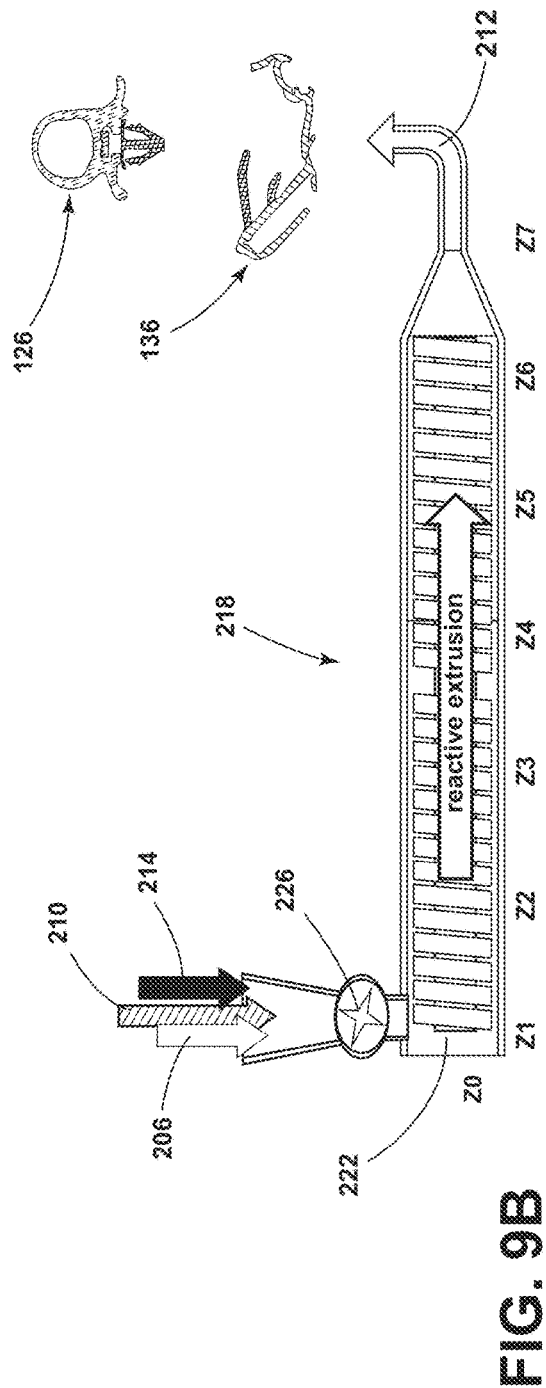
FIG. 9B is a schematic cross-sectional view of a single-screw extruder according to some aspects of the present disclosure.

Referring now to FIGS. 8 and 9B, the method 300 next includes a step 308 of extruding the silane-grafted polyolefin blend 206 and the condensation catalyst 210 together to form a silane-crosslinkable polyolefin blend 212. In some aspects, one or more optional additives 214 may be added with the silane-grafted polyolefin blend 206 and the condensation catalyst 210 to adjust the final material properties of the silane-crosslinked polyolefin olefin blend. In embodiments for forming dynamic and micro-dense silane-crosslinked polyolefin blends, the additives 214 can comprise foaming agents, as detailed above. In step 308, the silane-grafted polyolefin blend 206 is mixed with a silanol forming condensation catalyst 210 to form reactive silanol groups on the silane grafts that can subsequently crosslink when exposed to humidity and/or heat. In some aspects, the condensation catalyst is AMBICAT™ LE4472 and can include a mixture of sulfonic acid, antioxidant, process aide, and carbon black for coloring where the ambient moisture is sufficient for this condensation catalyst to crosslink the silane-crosslinkable polyolefin blend over a longer time period (e.g., about 48 hours). The silane-grafted polyolefin blend 206 and the condensation catalyst 210 may be added to a reactive single screw extruder 218 using an addition hopper and an addition gear pump 226. The combination of the silane-grafted polyolefin blend 206 and the condensation catalyst 210, and in some aspects one or more optional additives 214, may be added to a single screw 222 of the reactive single screw extruder 218. The single screw extruder 218 is considered reactive because crosslinking can begin as soon as the silane-grafted polyolefin blend 206 and the condensation catalyst 210 are melted and combined together to mix the condensation catalyst 210 thoroughly and evenly throughout the melted silane-grafted polyolefin blend 206. The melted silane-crosslinkable polyolefin blend 212 can exit the reactive single screw extruder 218 through a die that can inject the molten silane-crosslinkable polyolefin blend into an uncured combined sealing element.

During step 308, as the silane-grafted polyolefin blend 206 is extruded together with the condensation catalyst 210 to form the silane-crosslinkable polyolefin blend 212, a certain amount of crosslinking may occur. In some aspects, the silane-crosslinkable polyolefin blend 212 may be about 25% cured, about 30% cured, about 35% cured, about 40% cured, about 45% cured, about 50% cured, about 55% cured, about 60% cured, bout 65% cured, or about 70% cured where gel test (ASTM D2765) can be used to determine the amount of crosslinking in the final dense silane-crosslinked polyolefin elastomer.

Still referring to FIGS. 8 and 9B, the method 300 further includes a step 312 of molding the silane-crosslinkable polyolefin blend 212 into the uncured combined sealing element. The single screw extruder 218 melts and extrudes the silane-crosslinkable polyolefin through a die that can extrude the molten silane-crosslinkable polyolefin blend 212 into the uncured combined sealing element, for example, uncured or partially cured versions of the combined sealing members 12, such as the primary door seal 126, microdense sealing member 136, and others.

Referring again to FIG. 8, the method 300 can further include a step 316 of crosslinking the silane-crosslinkable polyolefin blend 212 or the combined sealing member 12 in an uncured form at an ambient temperature and/or an ambient humidity to form the combined sealing member 12 (see FIGS. 1 and 2) with dense portions having a density from about 0.85 g/cm$^3$ to about 0.89 g/cm$^3$, micro-dense portions having a density from about 0.60 g/cm$^3$ to about 0.69 g/cm$^3$, and dynamic portions having a density from about 0.50 g/cm$^3$ to about 0.59 g/cm$^3$. More particularly, in this crosslinking process, the water hydrolyzes the silane of the silane-crosslinkable polyolefin elastomer to produce a silanol. The silanol groups on various silane grafts can then be condensed to form intermolecular, irreversible Si—O—Si crosslink sites. The amount of crosslinked silane groups, and thus the final polymer properties, can be regulated by controlling the production process, including the amount of catalyst used.

The crosslinking/curing of step 316 of the method 300 may occur over a time period of from greater than 0 to about 20 hours. In some aspects, curing takes place over a time period of from about 1 hour to about 20 hours, 10 hours to about 20 hours, from about 15 hours to about 20 hours, from about 5 hours to about 15 hours, from about 1 hour to about 8 hours, or from about 3 hours to about 6 hours. The temperature during the crosslinking/curing may be about room temperature, from about 20° C. to about 25° C., from about 20° C. to about 150° C., from about 25° C. to about 100° C., or from about 20° C. to about 75° C. The humidity during curing may be from about 30% to about 100%, from about 40% to about 100%, or from about 50% to about 100%.

In some aspects, an extruder setting is used that is capable of extruding thermoplastic, with long L/D, 30 to 1, at an extruder heat setting close to TPV processing conditions wherein the extrudate crosslinks at ambient conditions becoming a thermoset in properties. In other aspects, this process may be accelerated by steam exposure. Immediately after extrusion, the gel content (also called the crosslink density) may be about 60%, but after 96 hrs at ambient conditions, the gel content may reach greater than about 95%.

In some aspects, one or more reactive single screw extruders 218 may be used to form the uncured combined sealing element and corresponding combined sealing member that have two or more types of silane-crosslinked polyolefin elastomers (i.e., dense, micro-dense and dynamic). For example, in some aspects, one reactive single screw extruder 218 may be used to produce and extrude the dense silane-crosslinked polyolefin elastomer while a second reactive single screw extruder 218 may be used to produce and extrude the dynamic or microdense silane-crosslinked polyolefin elastomer. The complexity and architecture of the final combined sealing member 12 will determine the number and types of reactive single screw extruder 218, along with the two or more types of silane-crosslinked polyolefin elastomers included in the member 12.

It is understood that the description outlining and teaching the various combined sealing members 12, and their respective components and compositions, can be used in any combination, and applies equally well to the method 300 for making the combined sealing member using the two-step Sioplas process as shown in FIGS. 8-9B.

Figure 10:
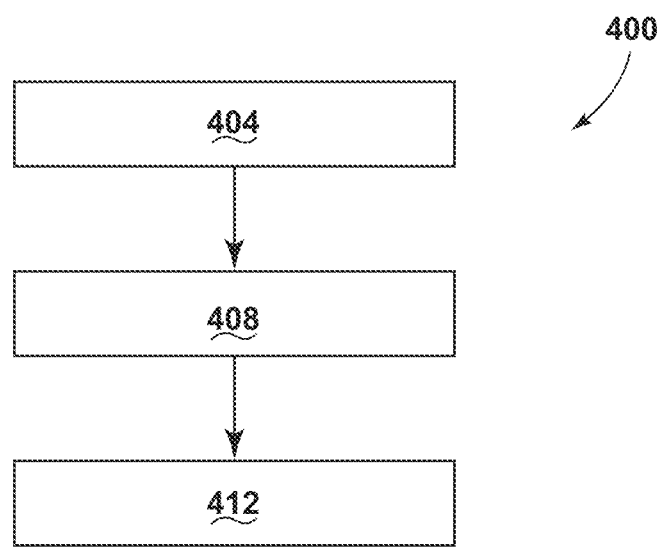
FIG. 10 is a flow diagram of a method for making a combined seal with a silane-crosslinked polyolefin elastomer using a one-step Monosil approach according to some aspects of the present disclosure.
Figure 11:
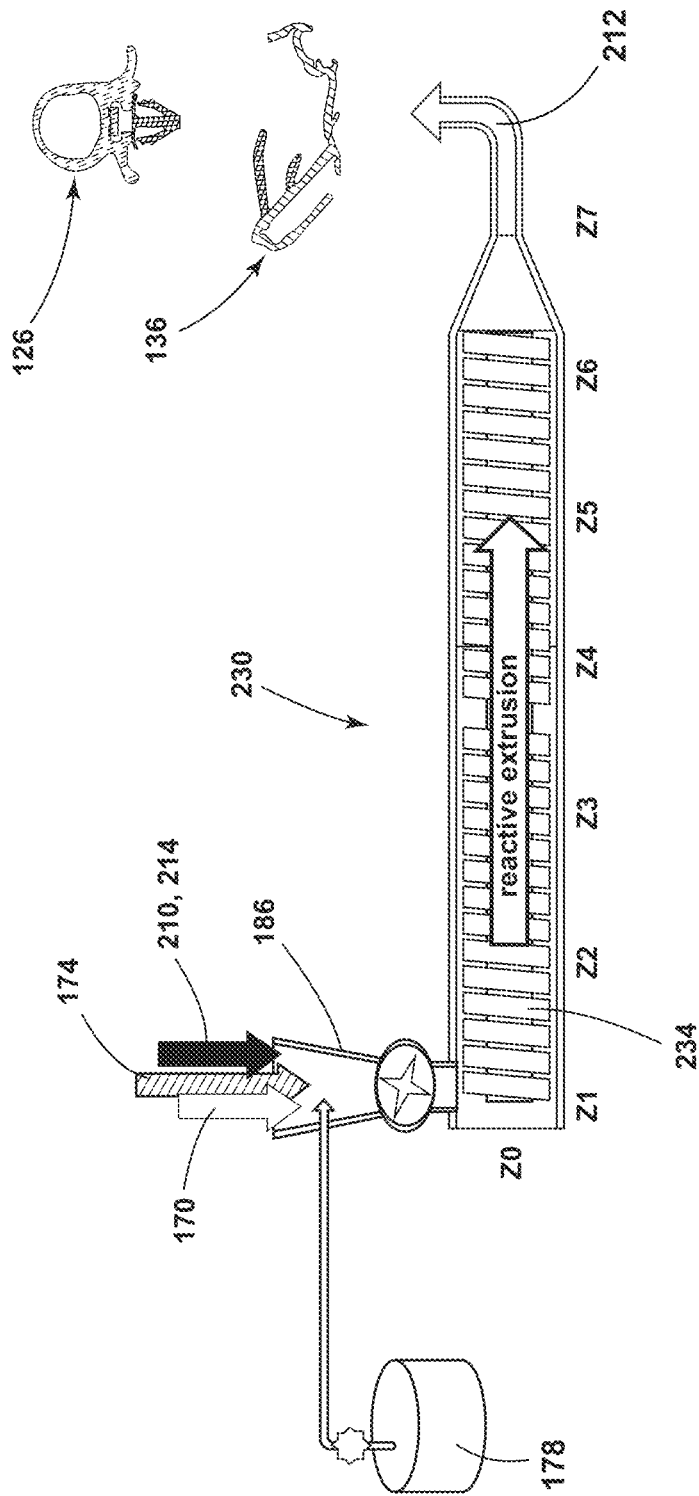
FIG. 11 is a schematic cross-sectional view of a reactive single-screw extruder according to some aspects of the present disclosure.

Referring now to FIGS. 10 and 11, a method 400 for making a combined seal, such as combined sealing member 12, using the one-step Monosil process is shown. The method 400 may begin with a step 404 that includes extruding (e.g., with a single screw extruder 230) the first polyolefin 170 having a density less than 0.86 g/cm$^3$, the second polyolefin 174, the silan cocktail 178 including the silane crosslinker (e.g., vinyltrimethoxy silane, VTMO) and grafting initiator (e.g. dicumyl peroxide), and the condensation catalyst 210 to form the crosslinkable silane-grafted polyolefin blend. The first polyolefin 170, second polyolefin 174, and silan cocktail 178 may be added to the reactive single screw extruder 230 using an addition hopper 186. In some aspects, the silan cocktail 178 may be added to a single screw 234 further down the extrusion line to help promote better mixing with the first and second polyolefin 170, 174 blend. In some aspects, one or more optional additives 214 (e.g., foaming agents for purposes of producing micro-dense and/or dynamic silane-crosslinked polyolefin elastomers) may be added with the first polyolefin 170, second polyolefin 174, and silan cocktail 178 to tweak the final material properties of the silane-crosslinkable polyolefin blend 212. The single screw extruder 182 is considered reactive because the radical initiator and silane crosslinker of the silan cocktail 178 are reacting with and forming new covalent bonds with both the first and second polyolefin blends 170, 174. In addition, the reactive single screw extruder 230 mixes the condensation catalyst 210 in together with the melted silane-grafted polyolefin blend. The melted silane-crosslinkable polyolefin blend 212 can exit the reactive single screw extruder 230 using a gear pump (not shown) and/or die that can inject, eject, and/or extrude the molten silane-crosslinkable polyolefin blend into the uncured combined sealing element.

During step 404, as the first polyolefin 170, second polyolefin 174, silan cocktail 178, and condensation catalyst 210 are extruded together, a certain amount of crosslinking may occur in the reactive single screw extruder 230 (see FIGS. 10 and 11). In some aspects, the silane-crosslinkable polyolefin blend 212 may be about 25% cured, about 30% cured, about 35% cured, about 40% cured, about 45% cured, about 50% cured, about 55% cured, about 60% cured, bout 65% cured, or about 70% as it leaves the reactive single screw extruder 230. The gel test (ASTM D2765) can be used to determine the amount of crosslinking in the final silane-crosslinked polyolefin elastomer, e.g., dense, micro-dense and/or dynamic poloyolefin elastomers.

The reactive single screw extruder 230 can be configured to have a plurality of different temperature zones (e.g., Z0-Z7 as shown in FIG. 11) that extend for various lengths along the extruder. In some aspects, the respective temperature zones may have temperatures ranging from about room temperature to about 180° C., from about 120° C. to about 170° C., from about 120° C. to about 160° C., from about 120° C. to about 150° C., from about 120° C. to about 140° C., from about 120° C. to about 130° C., from about 130° C. to about 170° C., from about 130° C. to about 160° C., from about 130° C. to about 150° C., from about 130° C. to about 140° C., from about 140° C. to about 170° C., from about 140° C. to about 160° C., from about 140° C. to about 150° C., from about 150° C. to about 170° C., and from about 150° C. to about 160° C. In some aspects, Z0 may have a temperature from about 60° C. to about 110° C. or no cooling; Z1 may have a temperature from about 120° C. to about 130° C.; Z2 may have a temperature from about 140° C. to about 150° C.; Z3 may have a temperature from about 150° C. to about 160° C.; Z4 may have a temperature from about 150° C. to about 160° C.; Z5 may have a temperature from about 150° C. to about 160° C.; Z6 may have a temperature from about 150° C. to about 160° C.; and Z7 may have a temperature from about 150° C. to about 160° C.

In some aspects, the number average molecular weight of the silane-grafted polyolefin elastomers may be in the range of from about 4,000 g/mol to about 30,000 g/mol, including from about 5,000 g/mol to about 25,000 g/mol and from about 6,000 g/mol to about 14,000 g/mol. The weight average molecular weight of the grafted polymers may be from about 8,000 g/mol to about 60,000 g/mol, including from about 10,000 g/mol to about 30,000 g/mol.

Still referring to FIGS. 10 and 11, the method 400 further includes a step 408 of molding the silane-crosslinkable polyolefin blend into the uncured combined sealing element. The reactive single screw extruder 230 can melt and extrude the silane-crosslinkable polyolefin through the die that can extrude the molten silane-crosslinkable polyolefin blend into the uncured combined sealing element to then be cured into the combined sealing member 12 (see FIGS. 1 and 2), such as the primary door seal 126, microdense sealing member 136, and others.

Still referring to FIG. 10, the method 400 can further include a step 412 of crosslinking the silane-crosslinkable polyolefin blend 212 of the uncured combined sealing element at an ambient temperature and an ambient humidity to form the element into the combined seal, such as combined sealing member 12 having a density from about 0.85 g/cm$^3$ to about 0.89 g/cm$^3$, for example. The amount of crosslinked silane groups, and thus the final polymer properties, can be regulated by controlling the production process, including the amount of catalyst used.

The step 412 of crosslinking the silane-crosslinkable polyolefin blend may occur over a time period of from greater than 0 to about 20 hours. In some aspects, curing takes place over a time period of from about 1 hour to about 20 hours, 10 hours to about 20 hours, from about 15 hours to about 20 hours, from about 5 hours to about 15 hours, from about 1 hour to about 8 hours, or from about 3 hours to about 6 hours. The temperature during the crosslinking and curing may be about room temperature, from about 20° C. to about 25° C., from about 20° C. to about 150° C., from about 25° C. to about 100° C., or from about 20° C. to about 75° C. The humidity during curing may be from about 30% to about 100%, from about 40% to about 100%, or from about 50% to about 100%.

In some aspects, an extruder setting is used that is capable of extruding thermoplastic, with long L/D, 30 to 1, at an extruder heat setting close to TPV processing conditions wherein the extrudate crosslinks at ambient conditions becoming a thermoset in properties. In other aspects, this process may be accelerated by steam exposure. Immediately after extrusion, the gel content (also called the crosslink density) may be about 60%, but after 96 hrs at ambient conditions, the gel content may reach greater than about 95%.

In some aspects, one or more reactive single screw extruders 230 (see FIG. 11) may be used to form the uncured sealing element and corresponding combined sealing member that have one or more types of silane-crosslinked polyolefin elastomers. For example, in some aspects, one reactive single screw extruder 230 may be used to produce and extrude a dense silane-crosslinked polyolefin elastomer while a second reactive single screw extruder 230 may be used to produce and extrude a dynamic or microdense silane-crosslinked polyolefin elastomer. Step 412 can then be used to cross-link these various types of polyolefins (e.g., in contact with one another in a mold) at the same to form a final, combined sealing element 12. As such, the complexity, architecture and technical specifications of the final combined sealing member 12 will determine the number and types of reactive single screw extruder 230.

It is understood that the description outlining and teaching the various combined sealing members 12, and their respective components and compositions, can be used in any combination, and applies equally well to the method 400 for making the combined sealing member using the one-step Monosil process as shown in FIGS. 10 and 11.

Non-limiting examples of articles incorporating combined sealing members that include two or more types of silane-crosslinked polyolefin elastomers of the disclosure include: seals such as weather seals (e.g., glass run channels including molded details/corners), sunroof seals, convertible top seals, mirror seals, body-panel interface seals, stationary window moldings, glass encapsulations, cut-line seals, greenhouse moldings, occupation detector system sensor switches, rocker seals, outer and inner belts, auxiliary and margin seals, edge protector/gimp seals, and below-belt brackets and channels; automotive hoses such as coolant hoses, air conditioning hoses, and vacuum hoses; anti-vibration system (AVS) components such as mounts (e.g., engine, body, accessory, component), dampers, bushings, strut mounts, and isolators; coatings such as coatings for brake lines, fuel lines, transmission oil cooler lines, brackets, cross members, frame components, body panels and components, suspension components, wheels, hubs, springs, and fasteners; air deflectors, spoilers, fascia, and trim; building, window, and door seals; boots, bellows, and grommets; gaskets (e.g., pneumatic and/or hydraulic gaskets); wire and cable sheathing; tires; windshield wipers and squeegees; floor mats; pedal covers; automotive belts; conveyor belts; shoe components; marine bumpers; O-rings; valves and seals; and springs (e.g., as substitutes for mechanical metal springs).

Dense, Dynamic and Micro-dense Silane-Crosslinked Polyolefin Elastomer Physical Properties A "thermoplastic", as used herein, is defined to mean a polymer that softens when exposed to heat and returns to its original condition when cooled to room temperature. A "thermoset", as used herein, is defined to mean a polymer that solidifies and irreversibly "sets" or "crosslinks" when cured. In either of the Monosil or Sioplas processes described above, it is important to understand the careful balance of thermoplastic and thermoset properties of the various different materials used to produce the final thermoset dense, dynamic and micro-dense silane-crosslinked polyolefin elastomers, as employed in the combined sealing members. Each of the intermediate polymer materials mixed and reacted using a reactive twin screw extruder, a reactive single screw extruder, and/or a reactive single screw extruder are thermosets. Accordingly, the silane-grafted polyolefin blend and the silane-crosslinkable polyolefin blend are thermoplastics and can be softened by heating so the respective materials can flow. Once the silane-crosslinkable polyolefin blend is extruded, molded, pressed, and/or shaped into the uncured sealing element or other respective article, the silane-crosslinkable polyolefin blend can begin to crosslink or cure at an ambient temperature and an ambient humidity to form the combined sealing member as comprising two or more of the dense, dynamic and micro-dense, silane-crosslinked polyolefin blends.

The thermoplastic/thermoset behavior of the silane-crosslinkable polyolefin blend and corresponding dense, dynamic and micro-dense silane-crosslinked polyolefin blends are important for the various compositions and articles disclosed herein (e.g., combined sealing members 12 shown in FIGS. 1 and 2) because of the potential energy savings provided using these materials. For example, a manufacturer can save considerable amounts of energy by being able to cure the silane-crosslinkable polyolefin blend at an ambient temperature and an ambient humidity. This curing process is typically performed in the industry by applying significant amounts of energy to heat or steam treat crosslinkable polyolefins. The ability to cure the inventive silane-crosslinkable polyolefin blend with ambient temperature and/or ambient humidity are not properties necessarily intrinsic to crosslinkable polyolefins, but rather is a property dependent on the relatively low density (i.e., as compared to EPDM and/or TPV) of the silane-crosslinkable polyolefin blend. In some aspects, no additional curing overs, heating ovens, steam ovens, or other forms of heat producing machinery other than what was provided in the extruders are used to form the dense, dynamic and micro-dense silane-crosslinked polyolefin elastomers.

The specific gravity of the dense silane-crosslinked polyolefin elastomers of the present disclosure may be lower than the specific gravities of existing TPV and EPDM formulations used in the art. The reduced specific gravity of these materials can lead to lower weight parts, thereby helping automakers meet increasing demands for improved fuel economy. For example, the specific gravity of the dense silane-crosslinked polyolefin elastomer of the present disclosure may be from about 0.80 $g/cm^3$ to about 0.89 $g/cm^3$, from about 0.85 $g/cm^3$ to about 0.89 $g/cm^3$, less than 0.90 $g/cm^3$, less than 0.89 $g/cm^3$, less than 0.88 $g/cm^3$, less than 0.87 $g/cm^3$, less than 0.86 $g/cm^3$, or less than 0.85 $g/cm^3$ as compared to existing TPV materials which may have a specific gravity of from 0.95 to 1.2 $g/cm^3$ and EPDM materials which may have a specific gravity of from 1.0 to 1.35 $g/cm^3$. The low specific gravity or density of the dense silane-crosslinked polyolefin elastomer is attributable to the low crystallinity of the elastomers found in Examples 1-7 described below. In some aspects, the percent crystallinity of the dense silane-crosslinked polyolefin elastomer is less than 10%, less than 20%, or less than 30%.

With regard to the dynamic silane-crosslinked polyolefin elastomers of the disclosure, the specific gravity of these elastomers may also be lower than the specific gravities of existing TPV and EPDM formulations used in the art. The reduced specific gravity of these materials can lead to lower weight parts, thereby helping automakers meet increasing demands for improved fuel economy. For example, the specific gravity of the dynamic silane-crosslinked polyolefin elastomer of the present disclosure may be from about 0.40 $g/cm^3$ to about 0.59 $g/cm^3$, from about 0.50 $g/cm^3$ to about 0.59 $g/cm^3$, from about 0.40 $g/cm^3$ to about 0.49 $g/cm^3$, less than 0.60 $g/cm^3$, less than 0.55 $g/cm^3$, less than 0.50 $g/cm^3$, or less than 0.45 $g/cm^3$ as compared to existing TPV materials which may have a specific gravity of from 0.95 to 1.2 $g/cm^3$ and EPDM materials which may have a specific gravity of from 1.0 to 1.35 $g/cm^3$. The low specific gravity or density of the dynamic silane-crosslinked polyolefin elastomer is attributable to the low crystallinity of the found in the Examples described below. In some aspects, the percent crystallinity of the dynamic silane-crosslinked polyolefin elastomer is less than 10%, less than 20%, or less than 30%.

The specific gravity of the microdense silane-crosslinked polyolefin elastomer of the present disclosure may be lower than the specific gravities of conventional TPV- and EPDM-based formulations used in the art. The reduced specific gravity of these materials can lead to lower weight parts, thereby helping automakers meet increasing demands for improved fuel economy. For example, the specific gravity of the microdense silane-crosslinked polyolefin elastomer of the present disclosure may be from about 0.40 $g/cm^3$ to about 0.59 $g/cm^3$, from about 0.50 $g/cm^3$ to about 0.59 $g/cm^3$, from about 0.40 $g/cm^3$ to about 0.49 $g/cm^3$, less than 0.60 $g/cm^3$, less than 0.55 $g/cm^3$, less than 0.50 $g/cm^3$, or less than 0.45 $g/cm^3$ as compared to existing TPV materials which may have a specific gravity of from 0.95 to 1.2 $g/cm^3$ and EPDM materials which may have a specific gravity of from 1.0 to 1.35 $g/cm^3$. The low specific gravity or density of the foamed (microdense) silane-crosslinked polyolefin elastomer is attributable to the low crystallinity of the polyolefin elastomers found in the Examples described below. In some aspects, the percent crystallinity of the foamed silane-crosslinked polyolefin elastomer is less than 10%, less than 20%, or less than 30%.

Figure 12:
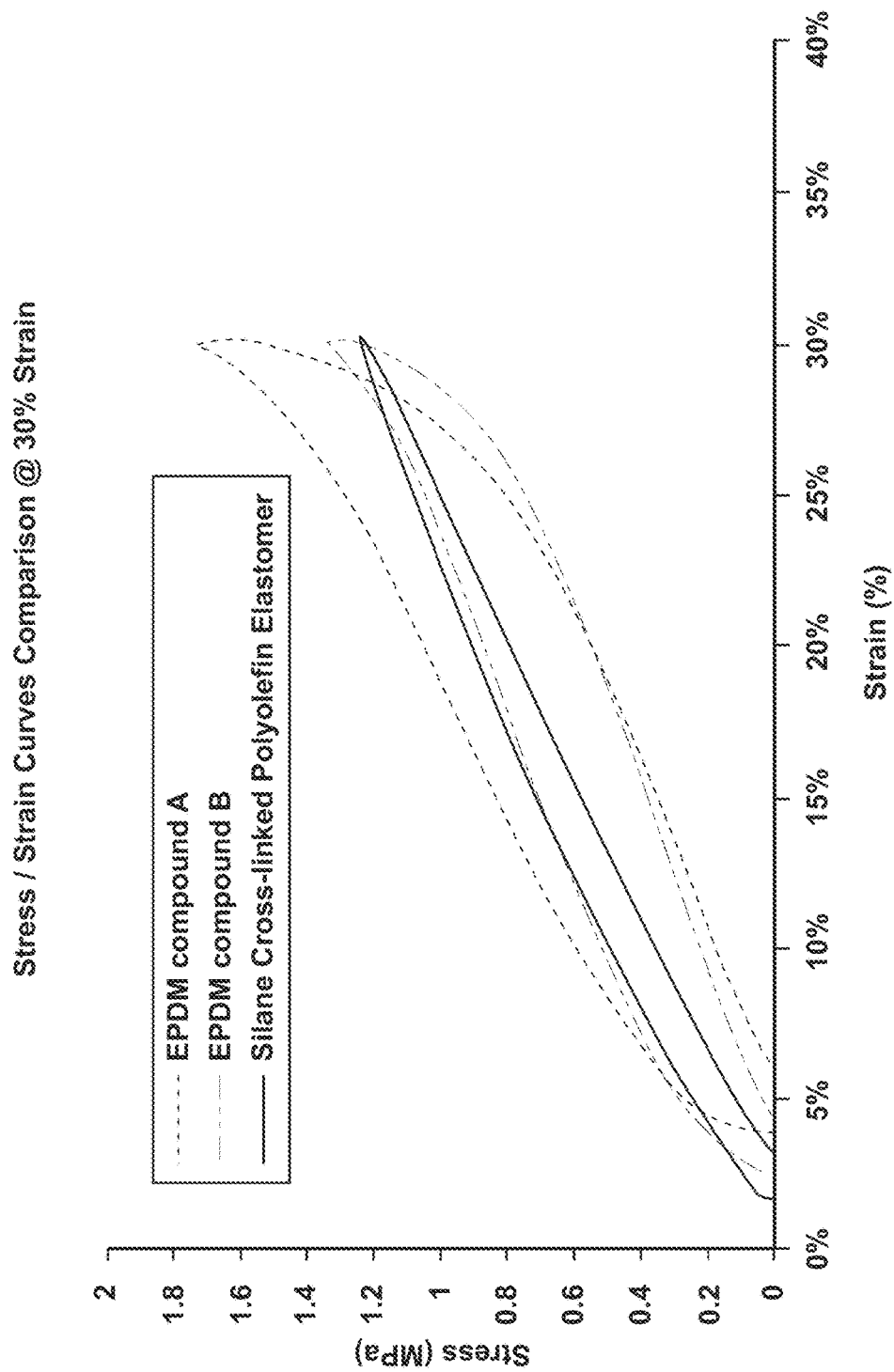
FIG. 12 is a graph illustrating the stress/strain behavior of a dense silane-crosslinked polyolefin elastomer compared to EPDM compounds.

Referring now to FIG. 12, the stress/strain behavior of an exemplary silane-crosslinked polyolefin elastomer of the present disclosure (i.e., the "Silane-Crosslinked Polyolefin Elastomer" in the legend) relative to two existing, comparative EPDM materials is provided. In particular, FIG. 12 displays a smaller area between the stress/strain curves for the silane-crosslinked polyolefin of the disclosure, versus the areas between the stress/strain curves for EPDM compound A and EPDM compound B. This smaller area between the stress/strain curves for the silane-crosslinked polyolefin elastomer can be desirable for seals and weatherstrips used with automotive glass applications. Elastomeric materials typically have non-linear stress-strain curves with a significant loss of energy when repeatedly stressed. The silane-crosslinked polyolefin elastomers of the present disclosure may exhibit greater elasticity and less viscoelasticity (e.g., have linear curves and exhibit very low energy loss). Embodiments of the silane-crosslinked polyolefin elastomers described herein do not have any filler or plasticizer incorporated into these materials so their corresponding stress/strain curves do not have or display any Mullins effect and/or Payne effect. The lack of Mullins effect for these silane-crosslinked polyolefin elastomers is due to the lack of any conventional reinforcing fillers (e.g., carbon black) or plasticizer added to the silane-crosslinked polyolefin blend so the stress-strain curve does not depend on the maximum loading previously encountered where there is no instantaneous and irreversible softening. The lack of Payne effect for these silane-crosslinked polyolefin elastomers is due to the lack of any filler or plasticizer added to the silane-crosslinked polyolefin blend so the stress-strain curve does not depend on the small strain amplitudes previously encountered where there is no change in the viscoelastic storage modulus based on the amplitude of the strain.

The silane-crosslinked polyolefin elastomers employed in the combined sealing members of the disclosure can exhibit a compression set of from about 5.0% to about 30.0%, from about 5.0% to about 25.0%, from about 5.0% to about 20.0%, from about 5.0% to about 15.0%, from about 5.0% to about 10.0%, from about 10.0% to about 25.0%, from about 10.0% to about 20.0%, from about 10.0% to about 15.0%, from about 15.0% to about 30.0%, from about 15.0% to about 25.0%, from about 15.0% to about 20.0%, from about 20.0% to about 30.0%, or from about 20.0% to about 25.0%, as measured according to ASTM D 395 (22 hrs @ 23° C., 70° C., 80° C., 90° C., 125° C., and/or 175° C.).

In other implementations, the silane-crosslinked polyolefin elastomer of the combined sealing members can exhibit a compression set of from about 5.0% to about 20.0%, from about 5.0% to about 15.0%, from about 5.0% to about 10.0%, from about 7.0% to about 20.0%, from about 7.0% to about 15.0%, from about 7.0% to about 10.0%, from about 9.0% to about 20.0%, from about 9.0% to about 15.0%, from about 9.0% to about 10.0%, from about 10.0% to about 20.0%, from about 10.0% to about 15.0%, from about 12.0% to about 20.0%, or from about 12.0% to about 15.0%, as measured according to ASTM D 395 (22 hrs @ 23° C., 70° C., 80° C., 90° C., 125° C., and/or 175° C.).

The silane-crosslinked polyolefin elastomers of the combined sealing members of the disclosure may exhibit a crystallinity of from about 5% to about 40%, from about 5% to about 25%, from about 5% to about 15%, from about 10% to about 20%, from about 10% to about 15%, or from about 11% to about 14% as determined using density measurements, differential scanning calorimetry (DSC), X-Ray Diffraction, infrared spectroscopy, and/or solid state nuclear magnetic spectroscopy. As disclosed herein, DSC was used to measure the enthalpy of melting in order to calculate the crystallinity of the respective samples.

The silane-crosslinked polyolefin elastomers of the combined sealing members of the disclosure may exhibit a glass transition temperature of from about −75° C. to about −25° C., from about −65° C. to about −40° C., from about −60° C. to about −50° C., from about −50° C. to about −25° C., from about −50° C. to about −30° C., or from about −45° C. to about −25° C. as measured according to differential scanning calorimetry (DSC) using a second heating run at a rate of 5° C./min or 10° C./min.

The silane-crosslinked polyolefin elastomers of the combined sealing members of the disclosure may exhibit a weathering color difference of from about 0.25 ΔE to about 2.0 ΔE, from about 0.25 ΔE to about 1.5 ΔE, from about 0.25 ΔE to about 1.0 ΔE, or from about 0.25 ΔE to about 0.5 ΔE, as measured according to ASTM D2244 after 3000 hrs exposure to exterior weathering conditions.

The silane-crosslinked polyolefin elastomers of the combined sealing members of the disclosure may exhibit exceptional stain resistance properties as compared to EPDM samples. Ex. 3, as disclosed below, showed no cracking, wrinkling, crazing, iridescence, bloom, milkiness, separation, loss of adhesion, or loss of embossment as measured according to ASTM D1566. In addition, Ex. 3 which is representative of all the silane-crosslinked polyolefin elastomers produced, showed no spotting or discoloration in pH 11, pH 12.5, and pH 13 NaOH solutions as measured according to SunSimulation and Spotting Test (PR231-2.2.15).

EXAMPLES

The following examples represent certain non-limiting examples of the compositions of the combined sealing members, and methods of making them, according to the disclosure.

Materials

All chemicals, precursors and other constituents were obtained from commercial suppliers and used as provided without further purification.

As detailed below, Examples 1-7 relate to dense silane-crosslinked polyolefin elastomers of the disclosure, Examples [TBD]

Example 1

Example 1 or ED4 was produced by extruding 77.36 wt % ENGAGE 8150 and 19.34 wt % VISTAMAX 6102 together with 3.3 wt % SILFIN 13 to form the silane-grafted polyolefin elastomer. The Example 1 silane-grafted polyolefin elastomer was then extruded with 3 wt % Ambicat LE4472 condensation catalyst to form a silane-crosslinkable polyolefin elastomer, which was then extruded into an uncured sealing member. The Example 1 silane-crosslinkable polyolefin elastomer of the uncured sealing member was cured at ambient temperature and humidity to form a silane-crosslinked polyolefins elastomer, consistent with the dense silane-crosslinked polyolefin elastomers of the disclosure. The composition of Example 1 is provided in Table 1 below.

Example 2

Example 2 or ED76-4A was produced by extruding 82.55 wt % ENGAGE 8842 and 14.45 wt % MOSTEN TB 003 together with 3.0 wt % SILAN RHS 14/032 or SILFIN 29 to form the silane-grafted polyolefin elastomer. The Example 2 silane-grafted polyolefin elastomer was then extruded with 3 wt % Ambicat LE4472 condensation catalyst to form a silane-crosslinkable polyolefin elastomer, which was then extruded into an uncured sealing member. The Example 2 silane-crosslinkable polyolefin elastomer of the uncured sealing member was cured at ambient temperature and humidity to form a silane-crosslinked polyolefins elastomer, consistent with the dense silane-crosslinked polyolefin elastomers of the disclosure. The composition of Example 2 is provided in Table 1 below and some of its material properties are provided in FIGS. 13-19.

Example 3

Example 3 or ED76-4E was produced by extruding 19.00 wt % ENGAGE 8150, 58.00 wt % ENGAGE 8842, and 20.00 wt % MOSTEN TB 003 together with 3.0 wt % SILAN RHS 14/032 or SILFIN 29 to form the silane-grafted polyolefin elastomer. The Example 3 silane-grafted polyolefin elastomer was then extruded with 3 wt % Ambicat LE4472 condensation catalyst to form the silane-crosslinkable polyolefin elastomer, which was then extruded into an uncured sealing member. The Example 3 silane-crosslinkable polyolefin elastomer of the uncured sealing member was cured at ambient temperature and humidity to form a silane-crosslinked polyolefin elastomer, consistent with the dense silane-crosslinked polyolefin elastomers of the disclosure. The composition of Example 3 is provided in Table 1 below.

Example 4

Example 4 or ED76-5 was produced by extruding 19.00 wt % ENGAGE 8150, 53.00 wt % ENGAGE 8842, and 25.00 wt % MOSTEN TB 003 together with 3.0 wt % SILAN RHS 14/032 or SILFIN 29 to form the silane-grafted polyolefin elastomer. The Example 4 silane-grafted polyolefin elastomer was then extruded with 3 wt % Ambicat LE4472 condensation catalyst to form the silane-crosslinkable polyolefin elastomer, which was then extruded into an uncured sealing member. The Example 4 silane-crosslinkable polyolefin elastomer of the uncured sealing member was cured at ambient temperature and humidity to form a silane-crosslinked polyolefins elastomer, consistent with the dense silane-crosslinked polyolefin elastomers of the disclosure. The composition of Example 4 is provided in Table 1 below.

Example 5

Example 5 or ED76-6 was produced by extruding 16.36 wt % ENGAGE 8150, 45.64 wt % ENGAGE 8842, and 35.00 wt % MOSTEN TB 003 together with 3.0 wt % SILAN RHS 14/032 or SILFIN 29 to form the silane-grafted polyolefin elastomer. The Example 5 silane-grafted polyolefin elastomer was then extruded with 3 wt % Ambicat LE4472 condensation catalyst to form the silane-crosslinkable polyolefin elastomer, which was then extruded into an uncured sealing member. The Example 5 silane-crosslinkable polyolefin elastomer of the uncured sealing member was cured at ambient temperature and humidity to form a silane-crosslinked polyolefins elastomer, consistent with the dense silane-crosslinked polyolefin elastomers of the disclosure. The composition of Example 5 is provided in Table 1 below.

Table 1 below sets forth the compositions of the dense silane-grafted polyolefin elastomers of Examples 1-5.

TABLE 1

| | Ex. 1 | Ex. 2 | Ex. 3 | Ex. 4 | Ex. 5 |
|---|---|---|---|---|---|
| ENGAGE 8150 | 77.36 | — | 19.00 | 19.00 | 16.36 |
| ENGAGE 8842 | — | 82.55 | 58.00 | 53.00 | 45.64 |
| MOSTEN TB 003 | — | 14.45 | 20.00 | 25.00 | 35.00 |
| VISTAMAXX 6102 | 19.34 | — | — | — | — |
| SILAN RHS 14/032 or SILFIN 29 | — | 3.00 | 3.00 | 3.00 | 3.00 |
| SILFIN 13 | 3.30 | — | — | — | — |
| TOTAL | 100 | 100 | 100 | 100 | 100 |

Example 6

Example 6 or ED108-2A was produced by extruding 48.7 wt % ENGAGE XLT8677 or XUS 38677.15 and 48.7 wt % ENGAGE 8842 together with 2.6 wt % SILAN RHS 14/032 or SILFIN 29 to form the silane-grafted polyolefin elastomer. The Example 6 silane-grafted polyolefin elastomer was then extruded with about 360 ppm dioctyltin dilaurate (DOTL) condensation catalyst to form a silane-crosslinkable polyolefin elastomer as an uncured sealing member. The Example 6 silane-crosslinkable polyolefin elastomer of the uncured sealing member was cured at ambient temperature and humidity to form a silane-crosslinked polyolefins elastomer, consistent with the dense silane-crosslinked polyolefin elastomers of the disclosure. The composition of Example 6 is provided in Table 2 below and some of its material properties are provided in FIGS. 13-19.

Example 7

Example 7 or ED92 was produced by extruding 41.4 wt % ENGAGE XLT8677 or XUS 38677.15 and 41.4 wt % ENGAGE 8842, and 14.4 wt % MOSTEN TB 003 together with 2.8 wt % SILAN RHS 14/032 or SILFIN 29 to form the silane-grafted polyolefin elastomer. The Example 7 silane-grafted polyolefin elastomer was then extruded with about 360 ppm dioctyltin dilaurate (DOTL) condensation catalyst to form a silane-crosslinkable polyolefin elastomer as an uncured sealing member. The Example 7 silane-crosslinkable polyolefin elastomer of the uncured sealing member was cured at ambient temperature and humidity to form a silane-crosslinked polyolefins elastomer, consistent with the dense silane-crosslinked polyolefin elastomers of the disclosure. The composition of Example 7 is provided in Table 2 below and some of its material properties are provided in FIGS. 13-19.

Table 2 below sets forth the compositions of the dense silane-grafted polyolefin elastomers of Examples 6-7.

TABLE 2

| Ingredients | Ex. 6 | Ex. 7 |
|---|---|---|
| ENGAGE XLT8677/XUS 38677.15 | 48.7 | 41.4 |
| ENGAGE 8842 | 48.7 | 41.4 |
| SILAN RHS 14/032 or SILFIN 29 | 2.6 | 2.8 |
| MOSTEN TB 003 | — | 14.4 |
| TOTAL | 100 | 100 |

Table 3 below sets forth several of the material properties of Example 1. In particular, plied compression set percentages are provided using ASTM D 395, method B for 22 hrs at 23° C., 70° C., 80° C., 90° C., 125° C., and 175° C. Example 1 is representative of the dense silane-crosslinked polyolefin elastomers disclosed herein in that the compression set percentage does not vary as much as standard EPDM or TPV materials do across a range of different temperatures. In some aspects, the percent difference in plied compression set percentage values for the dense silane-crosslinked polyolefin elastomer is less than 400%, less than 300%, less than 275%, less than 250%, less than 225%, or less than 210%.

TABLE 3

| Test | Ex. 1 |
|---|---|
| Durometer (Type A per ASTM D 2240) | 75 |
| Tensile MPa (ASTM D 412, die C) | 9.8 |
| Elongation % (ASTM D 412, die C) | 291 |
| Tear Resistance (ASTM D624, die C) | 19 |
| 22 hrs/23° C. Plied Compression Set % | 20.0 |
| 22 hrs/70° C. Plied Compression Set % | 12.6 |
| 22 hrs/80° C. Plied Compression Set | 16.5 |
| 22 hrs/90° C. Plied Compression Set % | 10.9 |
| 22 hrs/125° C. Plied Compression Set % | 7.6 |
| 22 hrs/175° C. Plied Compression Set % | 9.6 |
| Gel % | 90 |

Table 4 below sets forth density, hardness, low and high temperature performance, compression set, and weathering material properties for Examples 2-4.

TABLE 4

| Property | Test | Method | Units/Output | Ex. 2 | Ex. 3 | Ex. 4 |
|---|---|---|---|---|---|---|
| Originals | Density | ASTM D297 | g/cc | 0.88 | 0.89 | 0.89 |
| | Hardness | ASTM D412 Die C | Shore A | 76 | 84 | 88 |
| | Tensile | ASTM D412 Die C | MPa | 10.4 | 13.2 | 14.5 |
| | Elongation | ASTM D412 Die C | % | 300 | 306 | 314 |
| | Tear C | ASTM D624 Die C | N/mm | 24 | 37 | 48 |
| | Hardness | JIS K 6253 | IRHD | 72 | 82 | 87 |
| | Tensile | JIS K 6251 | MPa | 8.3 | 13.3 | 16.1 |
| | Elongation | JIS K 6251 | % | 260 | 255 | 334 |
| | Tear C | JIS K 6252 | N/cm | 249 | 401 | 564 |
| Low & High Temperature Performance | Hardness Heat Age (70 h/100° C.) | ASTM D573 | Change (Shore A) | −2 | −2 | 1 |
| | Tensile Heat Age (70 h/100° C.) | ASTM D573 | % Change | −3.1 | −6 | 9.1 |
| | Elongation Heat Age (70 h/100° C.) | ASTM D573 | % Change | −10.4 | −8.7 | −2.6 |
| | Hardness Heat Age (168 h/100° C.) | JIS K 6251/7 | Change (IRHD) | 0 | 2 | −5 |
| | Tensile Heat Age (168 h/100° C.) | JIS K 6251/7 | % Change | 0 | −15.1 | −9.9 |
| | Elongation Heat Age (168 h/100° C.) | JIS K 6251/7 | % Change | −18 | −22.7 | −21 |
| | Tear Heat Age (168 h/100° C.) | JIS K 6251/7 | % Change | −11.2 | −8.7 | −10 |
| | Tensile Heat Age (1000 h/125° C.) | ASTM D573 | Change (Shore A) | −2 | −1 | 0 |
| | Elongation Heat Age (1000 h/125° C.) | ASTM D573 | % Change | −4.4 | 18.7 | 1.4 |
| | Tear Heat Age (1000 h/125° C.) | ASTM D573 | % Change | −6.1 | −11 | −8.8 |
| | −40° C. Tensile | ASTM D412 Die C | % Change | 38.5 | — | — |
| | −40° C. Elongation | ASTM D412 Die C | % Change | 17.6 | — | — |
| | Low Temperature (−40° C.) | ASTM D2137 Method A | — | Nonbrittle | Nonbrittle | Nonbrittle |
| | 80° C. Tensile | ASTM D412 Die C | % Change | −10.8 | — | — |
| | 80° C. Elongation | ASTM D412 Die C | % Change | −1.5 | — | — |
| Compression Set | Plied C/S (22 h/70° C.) | ASTM D395 Method B | % | 20.7 | 25 | 30 |
| | Plied C/S (22 h/80° C.) | ASTM D395 Method B | % | 20.2 | 30.5 | — |
| | Plied C/S (72 h/80° C.) | ASTM D395 Method B | % | 22.5 | 32.6 | — |
| | Plied C/S (100 h/80° C.) | ASTM D395 Method B | % | 39.2 | 44.3 | 54.7 |
| | Plied C/S (168 h/80° C.) | ASTM D395 Method B | % | 29 | 39 | — |
| | Plied C/S (500 h/80° C.) | ASTM D395 Method B | % | 41.2 | 53.8 | — |
| | Plied C/S (1000 h/80° C.) | ASTM D395 Method B | % | 43.8 | 55.4 | — |
| | Plied C/S (22 h/90° C.) | ASTM D395 Method B | % | 22.5 | 32.8 | — |
| | Plied C/S (22 h/100° C.) | ASTM D395 Method B | % | 25.4 | 35 | 42.5 |
| | Plied C/S (70 h/125° C.) | ASTM D395 Method B | % | 29 | 37.9 | 46.6 |
| | Plied C/S (22 h/135° C.) | ASTM D395 Method B | % | 38.5 | 46.6 | — |
| | Plied C/S (22 h/150° C.) | ASTM D395 Method B | % | 44.3 | 61 | — |
| | Plied C/S (22 h/175° C.) | ASTM D395 Method B | % | 23.3 | 38.1 | — |
| | Permanent Compressive Distortion (22 h/100° C.) | JIS K 6257 | % | 30 | 41 | 43 |
| Miscellaneous | Volume Resistivity | IEC 60093 | Ω cm | $2.1 \times 10^{16}$ | $2.2 \times 10^{16}$ | $2.2 \times 10^{16}$ |
| | Weathering (3000 hrs.) | SAE J2527 | AATCC | 4-5 | 4-5 | 4-5 |
| | Arizona Natural Weathering (2 yrs.) | SAE J1976, Procedure A | ΔE | 1.6 | 1.2 | 1.7 |
| | Florida Natural Weathering (2 yrs.) | SAE J1976, Procedure A | ΔE | 1.6 | 1.0 | 1.2 |

TABLE 4-continued

| Property | Test | Method | Units/Output | Ex. 2 | Ex. 3 | Ex. 4 |
|---|---|---|---|---|---|---|
| | Fogging | SAE J1756 | % | 97 | 96 | 97 |
| | Ozone Resistance | ASTM D1171 Method B | Retention Rating (%) | 100 | 100 | 100 |
| | Flammability | ISO 3795 | Burn Rate (mm/min) | 19 | 22 | 17 |
| | Odor | SAE J1351 | No Disagreeable Odor Wet or Dry | Pass | Pass | Pass |
| | Paint Staining (24 h/70° C.) | ASTM D925 Method A | — | No Staining | No Staining | No Staining |

Table 5 below sets forth the chemical resistance material properties for Example 2, which is representative of all of the disclosed dense silane-crosslinked polyolefin elastomers. Method B (see Table 5) includes reporting any evidence of softening, staining, blistering, flaking, chipping, checking, chalking, cracks, spills, sinks, bulges, tackiness, peeling, or delamination. The fairness grade is 5 for a CELAB difference of 0 and a Tolerance of 0.2 and the fairness grade is 4 for a CELAB difference of 1.7 and a Tolerance of ±0.3.

Figure 14:
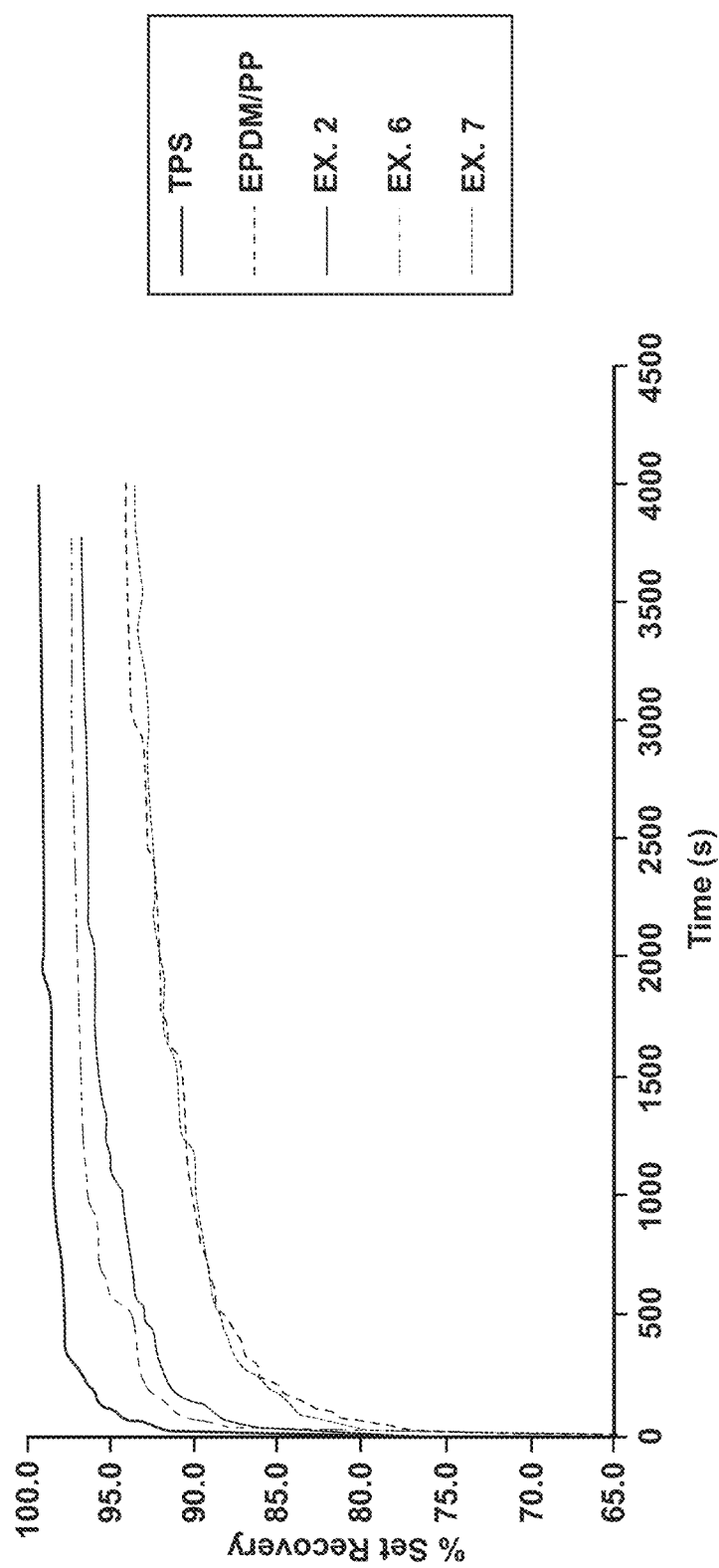
FIG. 14 is a graph illustrating the lip set recovery of inventive dense silane-crosslinked polyolefin elastomers and comparative polyolefin elastomers.

Referring now to FIG. 14, the lip set recovery percentage is given by $LSR=[(L_0')/(L_0)]\times100\%$ where $L_0$ is the original lip thickness before compression and $L_0'$ is the lip thickness after testing. As provided in FIG. 14, each of Examples 2, 6, and 7 made from the dense silane-crosslinked polyolefin elastomers exhibited a higher lip set recovery after one hour (97%, 97.5%, and 99.2%, respectively) and a higher speed of lip set recovery as compared to TPS (93%) or EPDM/PP copolymer (94%). Again, the lip set recovery percentages provided by each of the dense silane-crosslinked polyolefin

TABLE 5

| Test | Chemical | Method | Units/Output | Ex. 2 |
|---|---|---|---|---|
| Solvent Resistance (72 h/RT) | 7:3 (Kerosene:Mineral Spirits) | TSM1720G | % Change in Volume | 170 |
| Fluid Resistance | Gasoline 87 Octane, Lead Free, 20% Ethanol | FLTM BI 168-01, Method B | Rating (see above) | Pass, 4 |
| | Diesel, Grade 2, 20% Biodiesel | FLTM BI 168-01, Method B | Rating (see above) | Pass, 4 |
| | Coolant, Ethylene glycol/Water 50/50 | FLTM BI 168-01, Method B | Rating (see above) | Pass, 5 |
| | Engine Oil, Meets API-ILSAC Requirements | FLTM BI 168-01, Method B | Rating (see above) | Pass, 5 |
| | Deionized Water | FLTM BI 168-01, Method B | Rating (see above) | Pass, 5 |
| | Multipurpose Cleaner (Formula 409, Fantastic, or Armor All) | FLTM BI 168-01, Method B | Rating (see above) | Pass, 5 |
| | Windshield Wash Fluid, Methanol Based, 1 Part Motorcraft Fluid to 1.5 Parts Water | FLTM BI 168-01, Method B | Rating (see above) | Pass, 5 |
| | Motorcraft Bug and Tar Remover | FLTM BI 168-01, Method B | Rating (see above) | Pass, 5 |
| | Glass Cleaner | FLTM BI 168-01, Method B | Rating (see above) | Pass, 5 |
| | Isopropyl Alcohol 1:1 with Water | FLTM BI 168-01, Method B | Rating (see above) | Pass, 5 |

Figure 13:
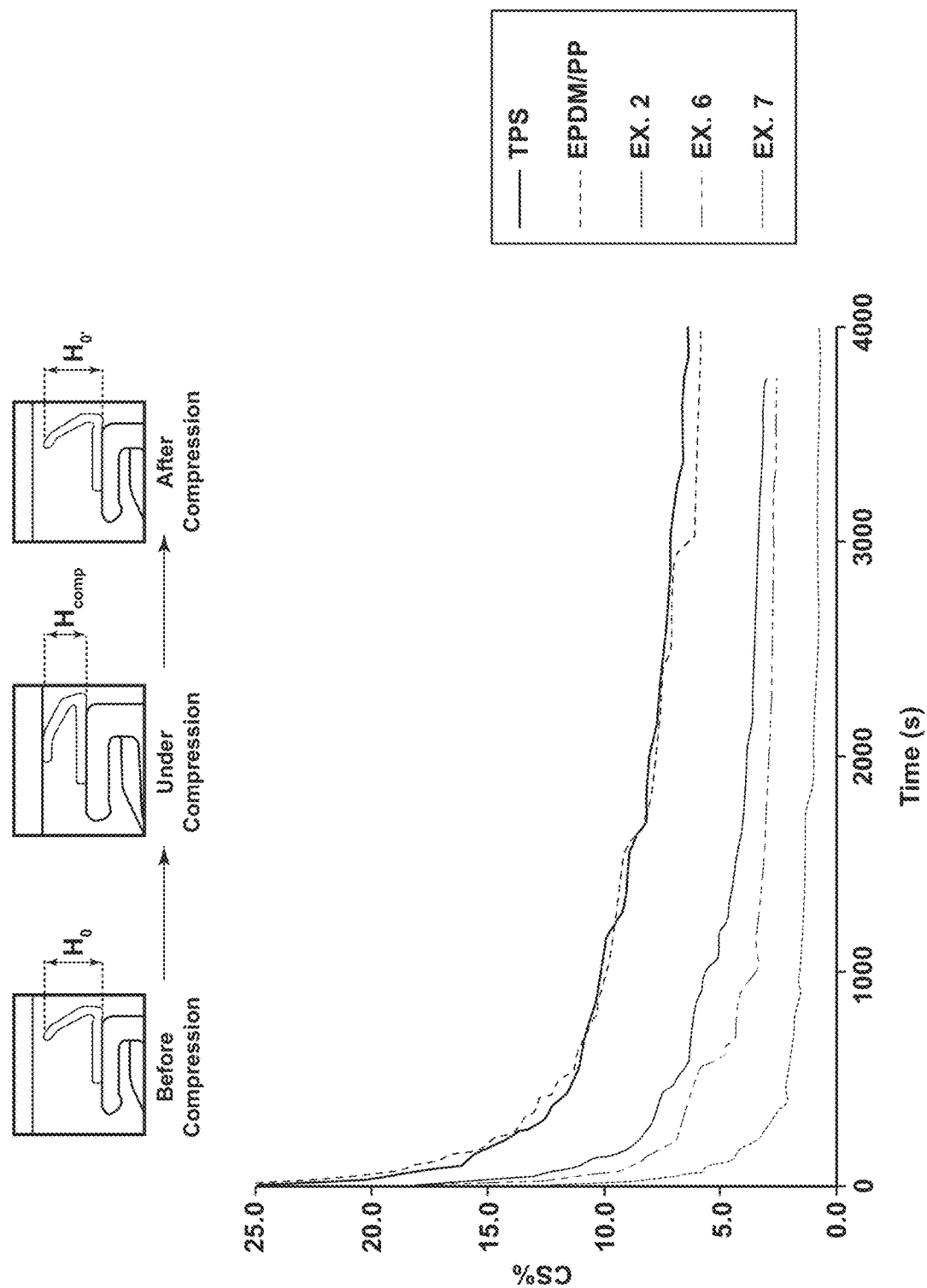
FIG. 13 is a graph illustrating the lip compression set of inventive dense silane-crosslinked polyolefin elastomers and comparative polyolefin elastomers.

Referring now to FIG. 13, the compression set percentage is given by $C_B=[(H_0-H_0')/(H_0-H_{comp})]\times100\%$ where $H_0$ is the original specimen thickness before compression, $H_0'$ is the specimen thickness after testing, and $H_{comp}$ is the specimen thickness during the test. As provided in FIG. 13, each of Examples 2, 6, and 7 ("Exs. 2, 6 and 7" in FIG. 13) made from the dense silane-crosslinked polyolefin elastomers exhibited a lower compression set after one hour and a higher speed of set recovery as compared to TOSE 539 70 ("TPS" in FIG. 13), a styrenic TPV or TPS, and SANTO-PRENE 12167W175 ("EPDM/PP" in FIG. 13), a EPDM/PP copolymer. The compression set percentages provided by each of the dense silane-crosslinked polyolefin elastomers (Exs. 2, 6 and 7) relative to the comparative TPV and EPDM materials demonstrate the improved high elastic properties exhibited by these materials.

elastomers relative to TPV and EPDM materials demonstrate the improved elastic properties exhibited by these materials.

Figure 15:
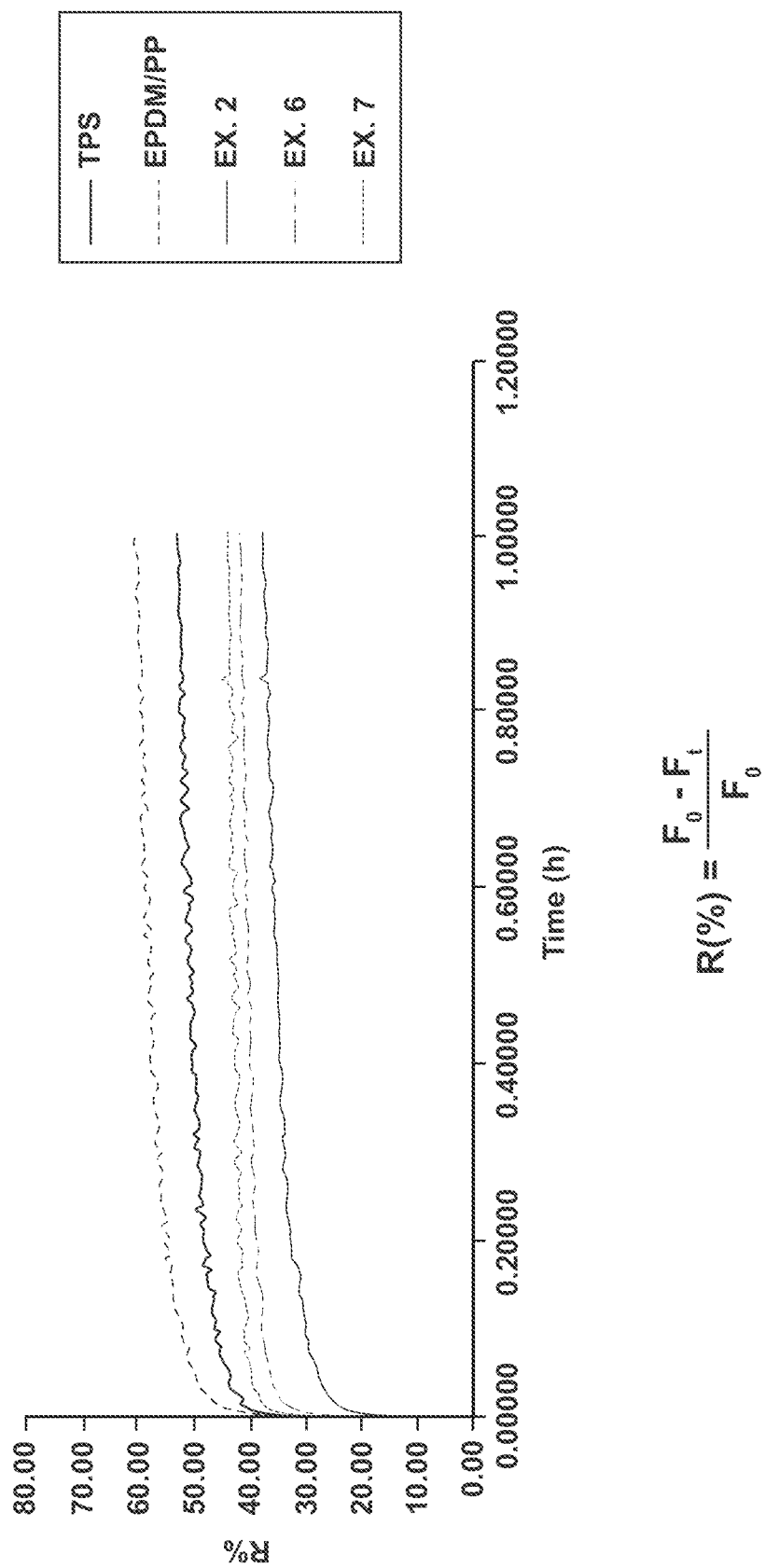
FIG. 15 is a graph illustrating the relaxation rate of several dense silane-crosslinked polyolefin elastomers and comparative polyolefin elastomers.

Referring now to FIG. 15, the lip relaxation rate percentage for 1 hr at 23° C. is given by $R\ (\%)=(F_0-F_t)/(F_0)$ where $F_0$ is the initial force required for the first compression and $F_t$ is the final force required for compression for the testing period. As provided in FIG. 15, each of Examples 2, 6, and 7 made from the dense silane-crosslinked polyolefin elastomers exhibited an improved relaxation rate as compared to TPS or EPDM/PP copolymer.

Figure 16:
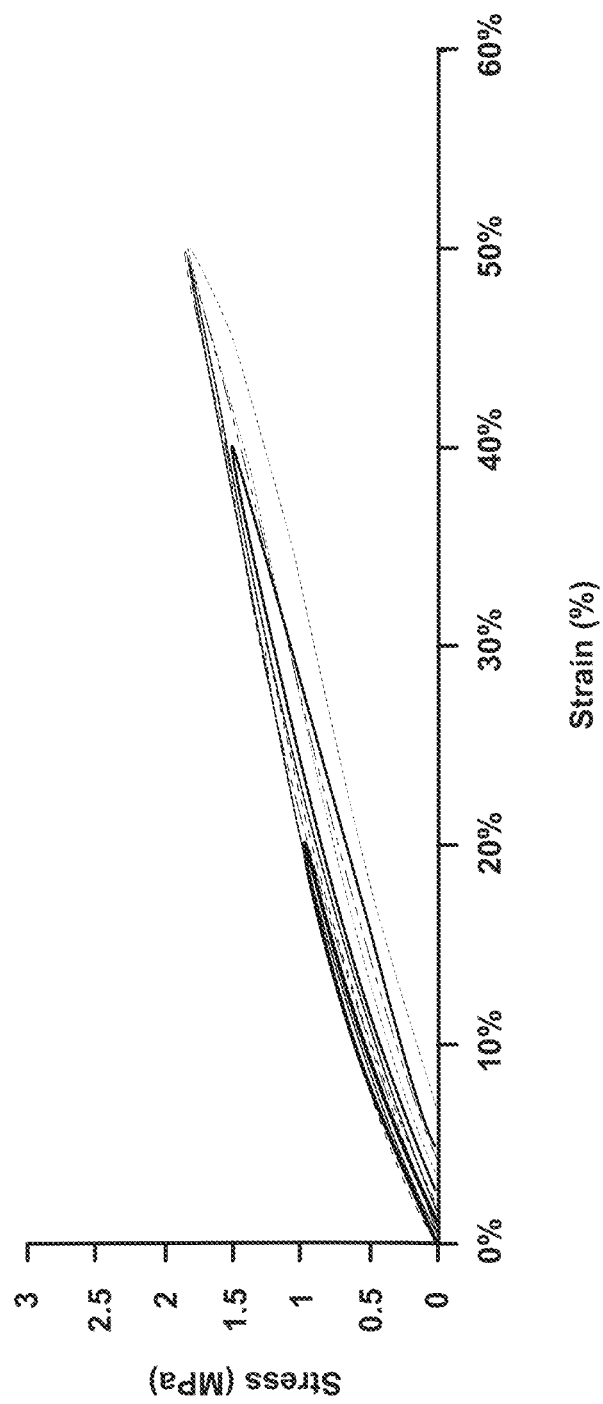
FIG. 16 is a graph illustrating the stress/strain behavior of an inventive dense silane-crosslinked polyolefin elastomer.

Referring now to FIG. 16, the stress/strain behavior of an exemplary dense silane-crosslinked polyolefin elastomer of the present disclosure is provided. The traces in FIG. 16 demonstrate the particularly small areas that can be achieved between the stress/strain curves for the silane-crosslinked polyolefin of the disclosure. Elastomeric materials typically have non-linear stress-strain curves with a significant loss of energy when repeatedly stressed. The silane-crosslinked polyolefin elastomers of the present disclosure exhibit greater elasticity and less viscoelasticity (e.g., have linear curves and exhibit very low energy loss). The lack of any filler or plasticizer in these materials lead to no demonstration of any Mullins and/or Payne effect.

Figure 17:
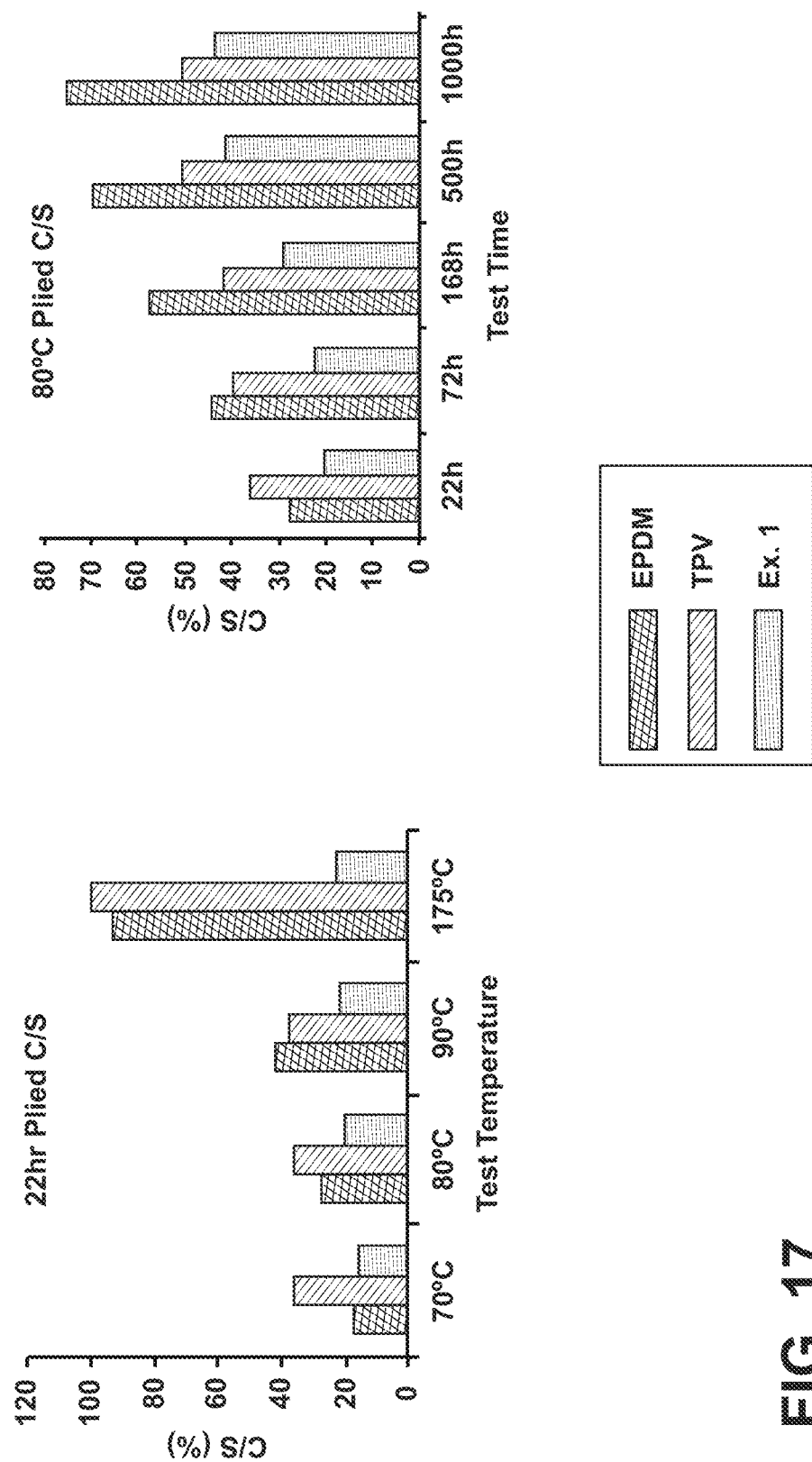
FIG. 17 is a graph illustrating the compression set of EPDM, TPV, and a dense silane-crosslinked polyolefin elastomer as plotted with respect to various test temperatures and time conditions.

Referring now to FIG. 17, compression set performance is provided across a range of elevated temperatures and increasing periods of time for Example 1 ("Ex. 1" in FIG. 17), a comparative TPV material ("TPV" in FIG. 17), and a comparative EPDM material ("EPDM" in FIG. 17). As shown in the graph, the compression set % of the dense silane-crosslinked polyolefin elastomer (Ex. 1) increases slightly over the provided increasing temperatures (70° C.-175° C.) and test times (22 h-1000 h) relative to the comparative TPV and EPDM materials.

Figure 18:
FIG. 18 is a graph illustrating the compression set of EPDM, TPV, and a dense silane-crosslinked polyolefin elastomer as plotted with respect to temperatures ranging from 23° C. to 175° C.

Referring now to FIG. 18, compression set performance is provided across a range of elevated temperatures and increasing periods of time for Example 1, a comparative TPV material, and a comparative EPDM material. As shown in the graph, the compression set % of the dense silane-crosslinked polyolefin elastomer (Ex. 1) increases slightly over the provided increasing temperatures (23° C.-175° C.) for a test time of 22 h relative to the comparative TPV and EPDM materials. The compression set % of the Ex. 1 dense silane-crosslinked polyolefin elastomer stays surprisingly even across the provided temperature range as compared to the dramatic increase in compression set % demonstrated for the TPV and EPDM materials.

Figure 19:
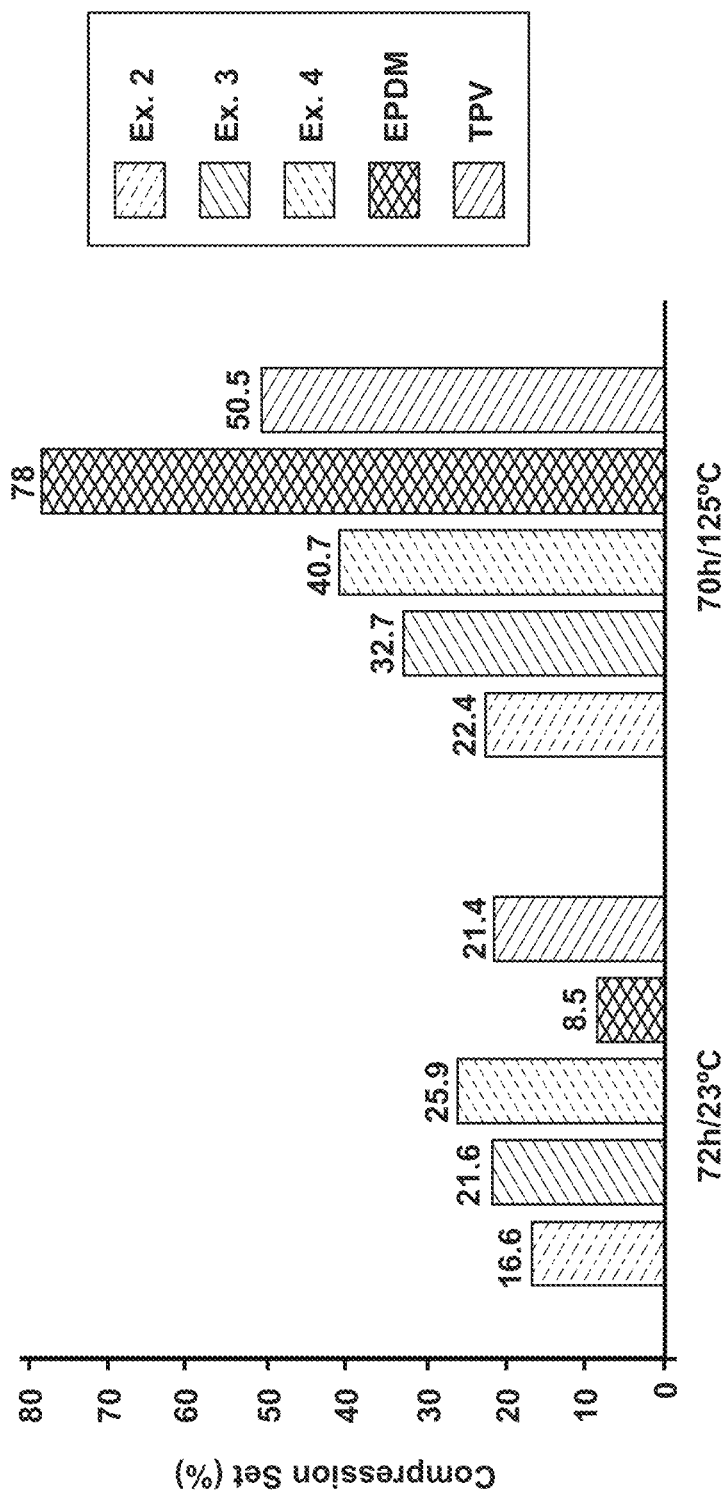
FIG. 19 is a graph illustrating the compression set of TPV and several dense silane-crosslinked polyolefin elastomers as plotted with respect to 23° C. and 125° C. temperatures.

FIG. 19 and Table 6 below provide additional data regarding the compression set performance of Examples 2-4 relative to EPDM 9724 and TPV 121-67. Table 6 provides compression set data performed in triplicate for Examples 2-4 relative to EPDM 9724 ("EPDM") and TPV 121-67 ("TPV"). FIG. 19 plots the average compression set values for these samples performed at 72 hrs at 23° C. and 70 hrs at 125° C.

TABLE 6

| Compound | 72 h/23° C. | 70 h/125° C. |
|---|---|---|
| Ex. 2 | 13.8 | 22.1 |
| Ex. 2 | 15.7 | 22.3 |
| Ex. 2 | 20.4 | 22.9 |
| Avg. | 16.6 | 22.4 |
| Ex. 3 | 19.9 | 31.0 |
| Ex. 3 | 21.4 | 33.6 |
| Ex. 3 | 23.6 | 33.6 |
| Avg. | 21.6 | 32.7 |
| Ex. 4 | 24.8 | 41.9 |
| Ex. 4 | 24.6 | 40.2 |
| Ex. 4 | 28.4 | 40.0 |
| Avg. | 25.9 | 40.7 |
| EPDM | 5.6 | 75.4 |
| EPDM | 8.3 | 76.3 |
| EPDM | 11.5 | 82.3 |
| Avg. | 8.5 | 78.0 |
| TPV | 21.2 | 51.2 |

TABLE 6-continued

| Compound | 72 h/23° C. | 70 h/125° C. |
|---|---|---|
| TPV | 21.4 | 52.4 |
| TPV | 21.5 | 47.8 |
| Avg. | 21.4 | 50.5 |

Example 8

Example 8 (Ex. 8) or ED108-2A was produced by extruding 48.70 wt % ENGAGE 8842 and 48.70 wt % XUS38677.15 together with 2.6 wt % SI LAN RHS 14/032 or SILFIN 13 to form a silane-grafted polyolefin elastomer. The Example 8 silane-grafted polyolefin elastomer was then extruded with 1.7 wt % Hydrocerol 1170 foaming agent, 2 wt % Ambicat LE4472 condensation catalyst, and 360 ppm dioctyltin dilaurate (DOTL) condensation catalyst to form a silane-crosslinkable polyolefin elastomer, which was then extruded into an uncured sealing member. The Example 8 silane-crosslinkable polyolefin elastomer of the uncured sealing member was then cured at ambient temperature and humidity to form a dynamic silane-crosslinked polyolefin elastomer, consistent with the elastomers of the disclosure. The composition of Example 8 is provided in Table 7 below and its material properties are provided in Table 8 below.

Example 9

Example 9 (Ex. 9) or ED108-2B was produced by extruding 48.70 wt % ENGAGE 8842 and 48.70 wt % XUS38677.15 and 2.6 wt % SILAN RHS 14/032 or SILFIN 13 together with Exact 9061/SpectraSyn 10 (70/30) to form the silane-grafted polyolefin elastomer. The Example 9 silane-grafted polyolefin elastomer was then extruded with 1.7 wt % Hydrocerol 1170 foaming agent, 2 wt % Ambicat LE4472 condensation catalyst, and 360 ppm dioctyltin dilaurate (DOTL) condensation catalyst to form a silane-crosslinkable polyolefin elastomer, which was then extruded into an uncured sealing member. The Example 9 silane-crosslinkable polyolefin elastomer of the uncured sealing member was then cured at ambient temperature and humidity to form a dynamic silane-crosslinked polyolefin elastomer, consistent with the elastomers of the disclosure. The composition of Example 9 is provided in Table 7 below and its material properties are provided in Table 8 below. Also provided below in Table 7 are properties associated with a comparative EPDM material ("EPDM").

TABLE 7

| Ingredients | Ex. 8 | Ex. 9 |
|---|---|---|
| ENGAGE XLT8677/XUS 38677.15 | 48.7 | 46.25 |
| ENGAGE 8842 | 48.7 | 46.25 |
| SILAN RHS 14/032 or SILFIN 29 | 2.6 | 2.5 |
| Exact 9061/SpectraSyn 10 (70/30) | — | 5 |
| TOTAL | 100 | 100 |

TABLE 8

| Property | Test | Method | Units/Output | Ex. 8 | Ex. 9 | EPDM |
|---|---|---|---|---|---|---|
| Structural | Density | ASTM D297 | g/cc | 0.52 | 0.55 | 0.66 |
| | Tensile | ASTM D412 Die C | MPa | 2.6 | 2.0 | 2.9 |
| | Elongation | ASTM D412 Die C | % | 230 | 209 | 354 |
| | 100% Modulus | ASTM D412 Die C | MPa | 1.5 | 1.4 | 0.80 |

TABLE 8-continued

| Property | Test | Method | Units/Output | Ex. 8 | Ex. 9 | EPDM |
|---|---|---|---|---|---|---|
| | Tear C | ASTM D624 Die C | N/mm | 8.0 | 9.6 | 8.8 |
| Compression Set (50% compression) | Plied C/S (22 h/ 80° C.) | ASTM D395 Method B | % | 29.4 | 35.4 | 47.4 |
| | Plied C/S (96 h/ 80° C.) | ASTM D395 Method B | % | 37.6 | 58.9 | 56.4 |
| | Plied C/S (168 h/ 80° C.) | ASTM D395 Method B | % | 67.0 | 69.6 | 67.8 |
| | Plied C/S (500 h/ 80° C.) | ASTM D395 Method B | % | 76.4 | — | 73.5 |
| | Plied C/S (1000 h/ 80° C.) | ASTM D395 Method B | % | 78.6 | — | 97.3 |
| Miscellaneous | Water Absorption | GM9888P | % | 0.16 | — | 0.21 |

Figure 20:
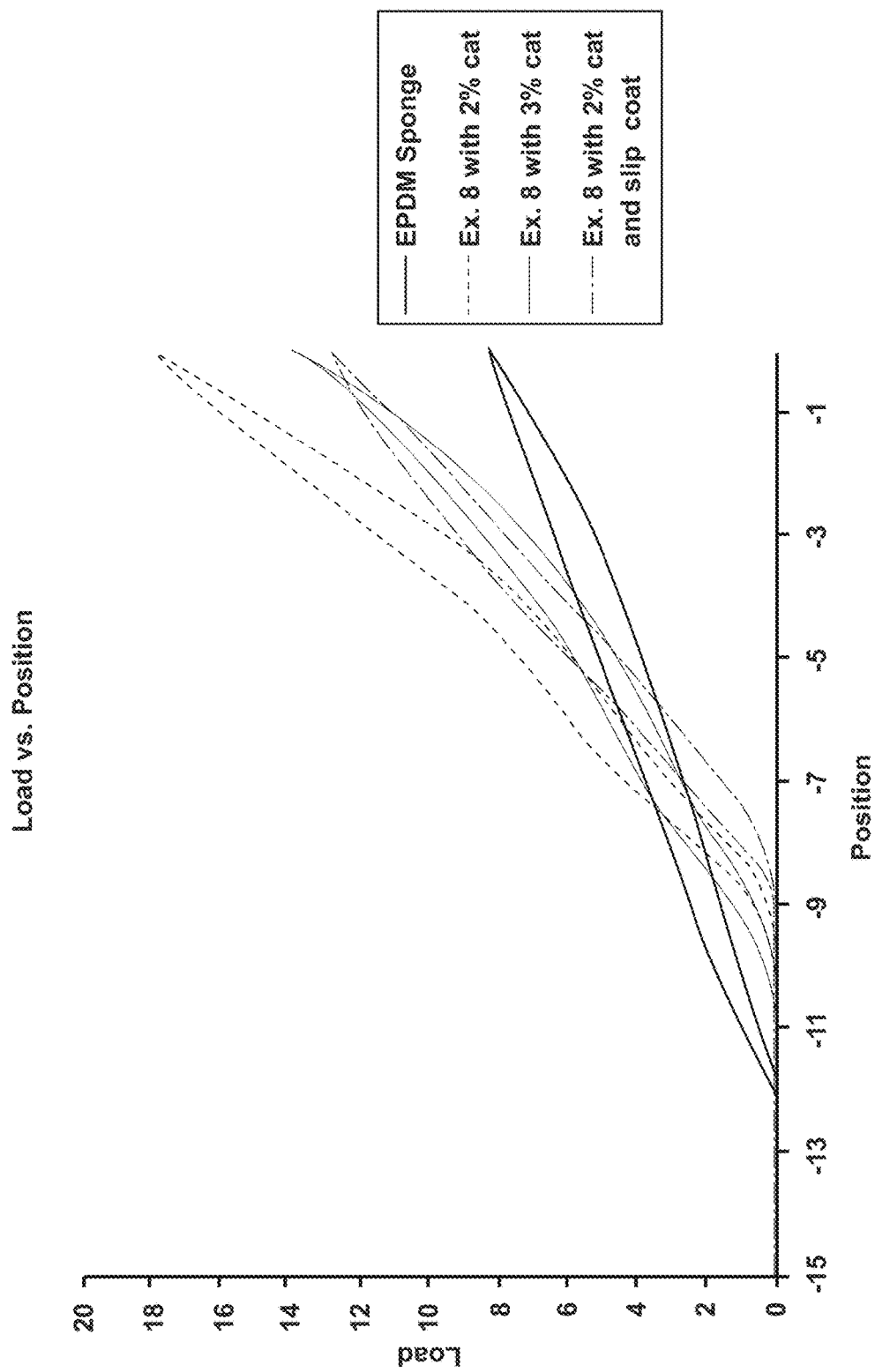
FIG. 20 is a graph illustrating the load versus position behavior of a dynamic silane-crosslinked polyolefin elastomer, as compared to load versus position behavior of comparative EPDM compounds.

Referring now to FIG. 20, a load vs. position plot is provided for the Ex. 8 ED108-2A resin (i.e., as prepared above in Example 8), as crosslinked with 2% catalyst ("Ex. 8 with 2% cat"), 3% catalyst (Ex. 8 with 3% cat"), and 2% catalyst with a slip coat ("Ex. 8 with 2% cat and slip coat"). A comparative example load v. position plot is provided for a traditional EPDM sponge material ("EPDM"). The Ex. 8 materials (i.e., dynamic silane-crosslinked polyolefin elastomers according to the disclosure) display a smaller area between the load/position curves as compared to the areas between the load/position curves for the comparative EPDM compound. This smaller area between the load/position curves for the dynamic silane-crosslinked polyolefin elastomers can be desirable for combined sealing members, e.g., weatherstrips, that can be used for various sealing applications. Further, the Ex. 8 polyolefin blends do not contain any filler or plasticizer incorporated so each of corresponding load/position curves for these blends do not have or display any Mullins effect and/or Payne effect.

The selection of the condensation catalyst may have an influence on the final material properties for a sample. For example, the Example 9 ED108-2B silane-grafted polyolefin elastomer was produced by extruding 48.70 wt % ENGAGE 8842 and 48.70 wt % XUS38677.15 and 2.6 wt % SILAN RHS 14/032 or SILFIN 13 together with Exact 9061/SpectraSyn 10 (70/30) to form the silane-grafted polyolefin elastomer. These Example 9 silane-grafted polyolefin elastomers were then extruded with two different condensation catalysts: (a) with 1.7 wt % Hydrocerol 1170 foaming agent, 2 wt % Ambicat LE4472 condensation catalyst, and 360 ppm dioctyltin dilaurate (DOTL) condensation catalyst; and (b) with 1.7 wt % Hydrocerol 1170 foaming agent, 2 wt % Ambicat LE4472 condensation catalyst, and 360 ppm dibutyltin dilaurate (DBTDL) condensation catalyst. Accordingly, two dynamic silane-crosslinkable polyolefin elastomers were formed (identified as "DOTL" and "DBTDL"), which were then extruded into an uncured sealing member. The difference in material properties of these crosslinkable elastomers are given below in Tables 9 and 10.

TABLE 9

| Elastomer Group | 22 h/80 C. Tube C/S (%) | 96 h/80 C. Tube C/S (%) | 168 h/80 C. Tube C/S (%) |
|---|---|---|---|
| DOTL | 38.9 | 42.1 | 52.3 |
| DBTDL | 25.9 | 27.9 | 34.0 |

TABLE 10

| Group | Duro | Tensile MPa | Elongation (%) | 100% Modulus (Mpa) | Auburn Density (g/cc) | TC (N/mm) |
|---|---|---|---|---|---|---|
| DOTL | 43 | 2.8 | 294 | 1.3 | 0.52 | 9.3 |
| DBTDL | 39 | 2.9 | 170 | 1.9 | 0.51 | 7.6 |

Figure 21:
FIG. 21 is a set of micrographs of dynamic silane-crosslinked elastomers, as processed with a supercritical gas-injected fluid or a chemical foaming agent, according to aspects of the disclosure.
Figure 21:
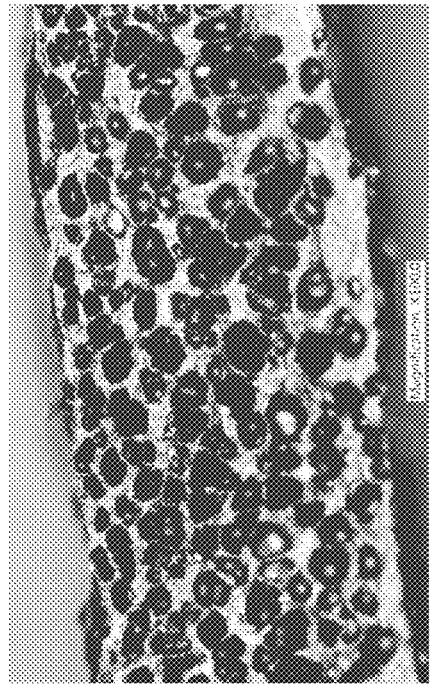
Figure 21:
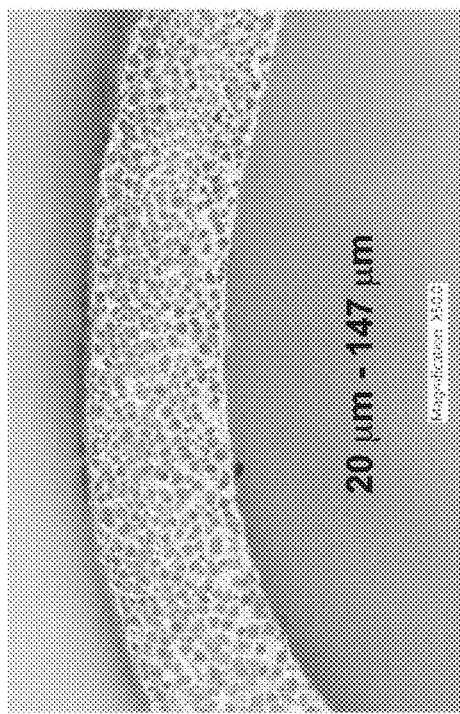
Figure 21:
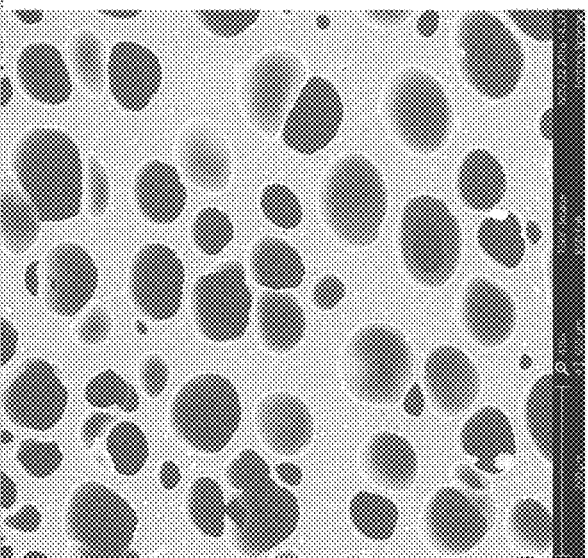

Referring now to FIG. 21, cross-sectional views are provided for a dynamic silane-crosslinked polyolefin elastomer, as foamed using supercritical gas injection and chemical foaming agents. As provided by the images, the pore size resulting from the chemical foaming agent is from 20 μm to 147 μm while the pore size resulting from the supercritical gas injection is from 46 μm to 274 μm. Depending on the type of foaming agent selected to foam each of the respective silane-crosslinkable polyolefin elastomer disclosed herein, a variety of different pore sizes can be obtained which will affect the final density of the foamed (dynamic) silane-crosslinked polyolefin elastomer. In some aspects, the pore size may be from 20 μm to 200 μm, from 25 μm to 400 μm, or from 25 μm to 300 μm.

Example 10

Example 10 (Ex. 10) or ED76-4A was produced by extruding 82.55 wt % ENGAGE 8842 and 14.45 wt % MOSTEN TB 003 together with 3.0 wt % SILAN RHS 14/032 or SILFIN 29 to form a silane-grafted polyolefin elastomer. The Example 10 silane-grafted polyolefin elastomer was then extruded with 2.0 wt % MBF-AC170EVA microencapsulated blowing agent, 3 wt % Ambicat LE4472 condensation catalyst, and 0.7 wt % AD-2 process aide to form a foamed silane-crosslinkable polyolefin elastomer, which was then extruded into the form of an uncured sealing member. The Example 10 foamed silane-crosslinkable polyolefin elastomer of the uncured sealing member was then cured at ambient temperature and humidity to form a foamed (micro-dense) silane-crosslinked polyolefin elastomer, consistent with the elastomers of the disclosure. The composition of Example 10 is provided in Table 11 below and the material properties associated with its foamed (micro-dense) silane-crosslinked polyolefin blend are provided in Table 12 below.

Example 11

Example 11 (Ex. 11) or ED76-4E was produced by extruding 19.00 wt % ENGAGE 8150, 58.00 wt % ENGAGE 8842, and 20.00 wt % MOSTEN TB 003 together with 3.0 wt % SILAN RHS 14/032 or SILFIN 29 to form a silane-grafted polyolefin elastomer. The Example 11 silane-grafted polyolefin elastomer was then extruded with 2.0 wt % MBF-AC170EVA microencapsulated blowing agent, 3 wt % Ambicat LE4472 condensation catalyst, and 0.7 wt % AD-2 process aide to form a foamed silane-crosslinkable polyolefin elastomer, which was then extruded into an uncured sealing member. The Example 11 foamed silane-crosslinkable polyolefin elastomer of the uncured sealing member was then cured at ambient temperature and humidity to form a foamed (micro-dense) silane-crosslinked polyolefin elastomer, consistent with the elastomers of the disclosure. The composition of Example 11 is provided in Table 11 below and the material properties associated with its foamed (micro-dense) silane-crosslinked polyolefin blend are provided in Table 12 below.

Example 12

Example 12 (Ex. 12) or ED76-5 was produced by extruding 19.00 wt % ENGAGE 8150, 53.00 wt % ENGAGE 8842, and 25.00 wt % MOSTEN TB 003 together with 3.0 wt % SILAN RHS 14/032 or SILFIN 29 to form the silane-grafted polyolefin elastomer. The Example 12 silane-grafted polyolefin elastomer was then extruded with 2.0 wt % MBF-AC170EVA microencapsulated blowing agent, 3 wt % Ambicat LE4472 condensation catalyst, and 0.7 wt % AD-2 process aide to form a foamed silane-crosslinkable polyolefin elastomer, which was then extruded into an uncured sealing member. The Example 12 foamed silane-crosslinkable polyolefin elastomer of the uncured sealing member was then cured at ambient temperature and humidity to form a foamed silane-crosslinked polyolefin elastomer, consistent with the elastomers of the disclosure. The composition of Example 12 is provided in Table 11 below and the material properties associated with its foamed (micro-dense) silane-crosslinked polyolefin blend are provided in Table 12 below.

Example 13

Example 13 (Ex. 13) or ED76-6 was produced by extruding 16.36 wt % ENGAGE 8150, 45.64 wt % ENGAGE 8842, and 35.00 wt % MOSTEN TB 003 together with 3.0 wt % SILAN RHS 14/032 or SILFIN 29 to form the silane-grafted polyolefin elastomer. The Example 4 silane-grafted polyolefin elastomer was then extruded with 2.0 wt % MBF-AC170EVA microencapsulated blowing agent, 3 wt % Ambicat LE4472 condensation catalyst, and 0.7 wt % AD-2 process aide to form a foamed silane-crosslinkable polyolefin elastomer, which was then extruded into an uncured sealing member. The Example 13 foamed silane-crosslinkable polyolefin elastomer of the uncured sealing member was then cured at ambient temperature and humidity to form a foamed (micro-dense) silane-crosslinked polyolefin elastomer, consistent with the elastomers of the disclosure. The composition of Example 13 is provided in Table 11 below and the material properties associated with its foamed (micro-dense) silane-crosslinked polyolefin blend are provided in Table 12 below.

TABLE 11

| Ingredients | Ex. 10 | Ex. 11 | Ex. 12 | Ex. 13 |
| --- | --- | --- | --- | --- |
| ENGAGE 8150 | — | 19.00 | 19.00 | 16.36 |
| ENGAGE 8842 | 82.55 | 58.00 | 53.00 | 45.64 |
| MOSTEN TB 003 | 14.45 | 20.00 | 25.00 | 35.00 |
| SILAN RHS 14/032 or SILFIN 29 | 3.00 | 3.00 | 3.00 | 3.00 |
| TOTAL | 100 | 100 | 100 | 100 |

TABLE 12

| Property | Test | Method | Units/Output | Ex. 1 | Ex. 2 | Ex. 3 | Ex. 4 |
| --- | --- | --- | --- | --- | --- | --- | --- |
| Physical Properties | Density | ASTM D297 | g/cc | 0.67 | 0.66 | 0.67 | 0.69 |
| | Hardness | ASTM D412 Die C | Shore A | 60 | 67 | 69 | 87 |
| | Tensile | ASTM D412 Die C | MPa | 5.0 | 7.2 | 8.7 | 7.6 |
| | Elongation | ASTM D412 Die C | % | 160 | 174 | 203 | 293 |
| | Tear C | ASTM D624 Die C | N/mm | 12.6 | 22.8 | 22.5 | 46.8 |
| Aged Properties | Hardness Heat Age (70 h/70° C.) | ASTM D573 | Change (Shore A) | 2 | 0 | 1 | 1 |
| | Tensile Heat Age (70 h/70° C.) | ASTM D573 | % Change | 12.6 | 5.5 | −0.8 | 7 |
| | Elongation Heat Age (70 h/70° C.) | ASTM D573 | % Change | −0.6 | −7.2 | −13.5 | −12.8 |
| Compression Set | Plied C/S (22 h/70° C.) | ASTM D395 Method B | % | 40 | 41 | 61 | 78 |
| Miscellaneous | Water Absorption | MS-AK-92 | % | 0.5 | 0.2 | 0.7 | 0.5 |
| | Ozone Resistance (168 h/40% Elongation) | ASTM D1149 | — | No Cracks | No Cracks | No Cracks | No Cracks |
| | Odor | SAE J1351 | No odor wet or dry | Pass | Pass | Pass | Pass |
| | Paint Staining (24 h/70° C.) | ASTM D925 Method A | — | No Staining | No Staining | No Staining | No Staining |

For purposes of this disclosure, the term "coupled" (in all of its forms, couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the articles, processes and compositions, which are defined by the following claims as interpreted according to the principles of patent law, including the Doctrine of Equivalents.

LISTING OF NON-LIMITING EMBODIMENTS

Embodiment A is a combined sealing member comprising: a composition comprising two or more polyolefin elastomers selected from the group consisting of a dense, a micro-dense and a dynamic silane-crosslinked polyolefin elastomer having a respective density of less than 0.90 g/cm$^3$, less than 0.70 g/cm$^3$, and less than 0.60 g/cm$^3$, wherein the combined sealing member exhibits a compression set of from about 5.0% to about 35.0%, as measured according to ASTM D 395 (22 hrs @ 70° C.).

The combined sealing member of Embodiment A wherein the dense silane-crosslinked polyolefin elastomer comprises a first polyolefin having a density less than 0.86 g/cm$^3$, a second polyolefin having a percent crystallinity less than 40%, a silane crosslinker, a grafting initiator, and a non-metal condensation catalyst, wherein the microdense silane-crosslinked polyolefin elastomer comprises a first polyolefin having a density less than 0.86 g/cm$^3$, a second polyolefin having a percent crystallinity less than 40%, a silane crosslinker, a grafting initiator, a condensation catalyst and a microencapsulated foaming agent, and further wherein the dynamic silane-crosslinked polyolefin elastomer comprises a first polyolefin having a density less than 0.86 g/cm$^3$, a second polyolefin having a percent crystallinity less than 40%, a silane crosslinker, a grafting initiator, a condensation catalyst and a foaming agent.

The combined sealing member of Embodiment A or Embodiment A with any of the intervening features wherein the compression set is from about 15.0% to about 35.0%, as measured according to ASTM D 395 (22 hrs @ 70° C.).

The combined sealing member of Embodiment A or Embodiment A with any of the intervening features wherein the density is from about 0.50 g/cm$^3$ to about 0.89 g/cm$^3$.

The combined sealing member of Embodiment A or Embodiment A with any of the intervening features wherein the silane-crosslinked polyolefin elastomer exhibits a crystallinity of from about 5% to about 25%.

The combined sealing member of Embodiment A or Embodiment A with any of the intervening features wherein the silane-crosslinked polyolefin elastomer exhibits a glass transition temperature of from about −75° C. to about −25° C.

The combined sealing member of Embodiment A or Embodiment A with any of the intervening features wherein the composition is a thermoset, but exhibits thermoplastic properties during processing.

The combined sealing member of Embodiment A or Embodiment A with any of the intervening features wherein the sealing member exhibits a weathering color difference of from about 0.25 ΔE to about 2.0 ΔE, as measured according to ASTM D2244.

The combined sealing member of Embodiment A or Embodiment A with any of the intervening features further comprising: a coloring agent.

Embodiment B is a combined sealing member comprising: a composition comprising a first and a second polyolefin elastomer, wherein the first elastomer comprises a microdense silane-crosslinked polyolefin elastomer having a density of less than 0.70 g/cm$^3$, wherein the second elastomer comprises a dense silane-crosslinked polyolefin elastomer having a density of less than 0.90 g/cm$^3$ or a dynamic silane-crosslinked polyolefin elastomer having a density of less than 0.60 g/cm$^3$, and further wherein the combined sealing member exhibits a compression set of from about 5.0% to about 35.0%, as measured according to ASTM D 395 (22 hrs @ 70° C.).

The combined sealing member of Embodiment B wherein wherein the compression set is from about 15.0% to about 35.0%, as measured according to ASTM D 395 (22 hrs @ 70° C.).

The combined sealing member of Embodiment B or Embodiment B with any of the intervening features wherein the density is from about 0.50 g/cm$^3$ to about 0.89 g/cm$^3$.

The combined sealing member of Embodiment B or Embodiment B with any of the intervening features wherein the silane-crosslinked polyolefin elastomer exhibits a crystallinity of from about 5% to about 25%.

The combined sealing member of Embodiment B or Embodiment B with any of the intervening features wherein the silane-crosslinked polyolefin elastomer exhibits a glass transition temperature of from about −75° C. to about −25° C.

Embodiment C is a combined sealing member comprising: a composition comprising a first and a second polyolefin elastomer, wherein the first elastomer comprises a dense silane-crosslinked polyolefin elastomer having a density of less than 0.90 g/cm³, wherein the second elastomer comprises a dynamic silane-crosslinked polyolefin elastomer having a density of less than 0.60 g/cm³, and further wherein the combined sealing member exhibits a compression set of from about 5.0% to about 35.0%, as measured according to ASTM D 395 (22 hrs @ 70° C.).

The combined sealing member of Embodiment C wherein the compression set is from about 15.0% to about 35.0%, as measured according to ASTM D 395 (22 hrs @ 70° C.).

The combined sealing member of Embodiment C or Embodiment C with any of the intervening features wherein the density is from about 0.50 g/cm³ to about 0.89 g/cm³.

The combined sealing member of Embodiment C or Embodiment C with any of the intervening features wherein the silane-crosslinked polyolefin elastomer exhibits a crystallinity of from about 5% to about 25%.

The combined sealing member of Embodiment C or Embodiment C with any of the intervening features wherein the silane-crosslinked polyolefin elastomer exhibits a glass transition temperature of from about −75° C. to about −25° C.

The combined sealing member of Embodiment C or Embodiment C with any of the intervening features further comprising: a coloring agent.

What is claimed is:

1. A combined sealing member comprising: a composition comprising two or more polyolefin elastomers selected from the group consisting of
   a dense silane-crosslinked polyolefin elastomer having a density of less than 0.90 g/cm³, a tensile strength ranging from 10.4 to about 14.5 MPa as measured according to ASTM D412, a Shore A hardness ranging from about 76 to about 88 as measured according to ASTM D412, and a crystallinity of from about 5% to about 15%, wherein from about 1 wt % to about 20 wt % of the dense silane-crosslinked polyolefin elastomer is a polypropylene filler having a crystallinity greater than 40%,
   a microdense silane-crosslinked polyolefin elastomer having a density of less than 0.70 g/cm³, a tensile strength ranging from about 5.0 to about 8.7 MPa as measured according to ASTM D412, a Shore A hardness ranging from 60 to 87 as measured according to ASTM D412, and a crystallinity of from about 5% to about 15%, wherein from about 1 wt % to about 20 wt % of the microdense silane-crosslinked polyolefin elastomer is a polypropylene filler having a crystallinity greater than 40%, and
   a dynamic silane-crosslinked polyolefin elastomer having a density of less than 0.60 g/cm³, a tensile strength ranging from about 2.0 to about 2.9 MPa as measured according to ASTM D412 and a crystallinity of from about 5% to about 15%,
   wherein the polyolefin elastomers do not display a Mullins effect or a Payne effect,
   wherein the combined sealing member and the foamed silane-crosslinked polyolefin elastomers are thermosets, and
   wherein the combined sealing member exhibits a compression set of from about 5.0% to about 35.0%, as measured according to ASTM D 395 (22 hrs @ 70° C.).

2. The combined sealing member of claim 1, wherein the compression set is from about 15.0% to about 35.0%, as measured according to ASTM D 395 (22 hrs @ 70° C.).

3. The combined sealing member of claim 1, wherein the two or more polyolefin elastomers are selected from the group consisting of
   a dense silane-crosslinked polyolefin elastomer having a density of about 0.80 g/cm³ to about 0.89 g/cm³,
   a microdense silane-crosslinked polyolefin elastomer having a density of about 0.40 g/cm³ to about 0.59 g/cm³, and
   a dynamic silane-crosslinked polyolefin elastomer having a density of about 0.40 g/cm³ to about 0.59 g/cm³.

4. The combined sealing member of claim 1, wherein the silane-crosslinked polyolefin elastomers exhibit crystallinities of from about 5% to about 10%.

5. The combined sealing member of claim 1, wherein the silane-crosslinked polyolefin elastomers exhibit glass transition temperatures of from about −75° C. to about −25° C.

6. The combined sealing member of claim 1, wherein the sealing member exhibits a weathering color difference of from about 0.25 ΔE to about 2.0 ΔE, as measured according to ASTM D2244.

7. The combined sealing member of claim 1, further comprising:
   a coloring agent.

8. A combined sealing member comprising:
   comprising a first and a second polyolefin elastomer,
   wherein the first elastomer comprises a microdense silane-crosslinked polyolefin elastomer having a density of less than 0.70 g/cm³, a tensile strength ranging from about 5.0 to about 8.7 MPa as measured according to ASTM D412, and a Shore A hardness ranging from 60 to 87 as measured according to ASTM D412, and a crystallinity of from about 5% to about 15%, wherein from about 1 wt % to about 20 wt % of the microdense silane-crosslinked polyolefin elastomer is a polypropylene filler having a crystallinity greater than 40%, and
   wherein the second elastomer comprises
   a dense silane-crosslinked polyolefin elastomer having a density of less than 0.90 g/cm³, a tensile strength ranging from 10.4 to about 14.5 MPa as measured according to ASTM D412, a Shore A hardness ranging from about 76 to about 88 as measured according to ASTM D412, and a crystallinity of from about 5% to about 15%, wherein from about 1 wt % to about 20 wt % of the dense silane-crosslinked polyolefin elastomer is a polypropylene filler having a crystallinity greater than 40%, or
   a dynamic silane-crosslinked polyolefin elastomer having a density of less than 0.60 g/cm³, a tensile strength ranging from about 2.0 to about 2.9 MPa as measured according to ASTM D412, and a crystallinity of from about 5% to about 15%,
   wherein the polyolefin elastomers do not display a Mullins effect or a Payne effect,
   wherein the combined sealing member and the foamed silane-crosslinked polyolefin elastomers are thermosets, and
   wherein the combined sealing member exhibits a compression set of from about 5.0% to about 35.0%, as measured according to ASTM D 395 (22 hrs @ 70° C.).

9. The combined sealing member of claim 8, wherein the compression set is from about 15.0% to about 35.0%, as measured according to ASTM D 395 (22 hrs @ 70° C.).

10. The combined sealing member of claim 8, wherein the first polyolefin elastomer is a microdense silane-crosslinked polyolefin elastomer having a density of about 0.40 g/cm³ to about 0.59 g/cm³ and the second polyolefin elastomer comprises a dense silane-crosslinked polyolefin elastomer having a density of about 0.80 g/cm$^3$ to about 0.89 g/cm$^3$, or a dynamic silane-crosslinked polyolefin elastomer having a density of about 0.40 g/cm$^3$ to about 0.59 g/cm$^3$.

11. The combined sealing member of claim 8, wherein the silane-crosslinked polyolefin elastomers exhibit crystallinities of from about 5% to about 10%.

12. The combined sealing member of claim 8, wherein the silane-crosslinked polyolefin elastomers exhibit glass transition temperatures of from about −75° C. to about −25° C.

13. A combined sealing member comprising:
   a dense silane-crosslinked polyolefin elastomer having a density of less than 0.90 g/cm$^3$, a tensile strength ranging from 10.4 to about 14.5 MPa as measured according to ASTM D412, a Shore A hardness ranging from about 76 to about 88 as measured according to ASTM D412, and a crystallinity of from about 5% to about 15%, wherein from about 1 wt % to about 20 wt % of the dense silane-crosslinked polyolefin elastomer is a polypropylene filler having a crystallinity greater than 40%, and
   a dynamic silane-crosslinked polyolefin elastomer having a density of less than 0.60 g/cm$^3$, a tensile strength ranging from about 2.0 to about 2.9 MPa as measured according to ASTM D412 and a crystallinity of from about 5% to about 15%,
   wherein the polyolefin elastomers do not display a Mullins effect or a Payne effect,
   wherein the combined sealing member and the foamed silane-crosslinked polyolefin elastomers are thermosets, and
   wherein the combined sealing member exhibits a compression set of from about 5.0% to about 35.0%, as measured according to ASTM D 395 (22 hrs @ 70° C.).

14. The combined sealing member of claim 13, wherein the compression set is from about 15.0% to about 35.0%, as measured according to ASTM D 395 (22 hrs @ 70° C.).

15. The combined sealing member of claim 13, wherein the dense silane-crosslinked polyolefin elastomer has a density of about 0.80 g/cm$^3$ to about 0.89 g/cm$^3$, and the dynamic silane-crosslinked polyolefin elastomer has a density of about 0.40 g/cm$^3$ to about 0.59 g/cm$^3$.

16. The combined sealing member of claim 13, wherein the silane-crosslinked polyolefin elastomers exhibit crystallinities of from about 5% to about 10%.

17. The combined sealing member of claim 13, wherein the silane-crosslinked polyolefin elastomers exhibit glass transition temperatures of from about −75° C. to about −25° C.

18. The combined sealing member of claim 13, further comprising:
   a coloring agent.

* * * * *